United States Patent

Koyama et al.

[11] Patent Number: 5,829,983
[45] Date of Patent: Nov. 3, 1998

[54] SYSTEM FOR CARRYING OUT EDUCATIONAL MANAGEMENT

[75] Inventors: Kozaburo Koyama; Isao Honda; Takayuki Hiraga; Tatsuo Kato; Takasi Ishikawa, all of Kawasaki, Japan

[73] Assignee: Fujitsu Limited, Kawasaki, Japan

[21] Appl. No.: 433,531

[22] Filed: May 2, 1995

[30] Foreign Application Priority Data

Sep. 2, 1994 [JP] Japan .................................. 6-210284

[51] Int. Cl.⁶ .................................................. G09B 19/00
[52] U.S. Cl. ........................ 434/118; 434/362; 434/350; 707/102; 706/927
[58] Field of Search ...................................... 434/118, 169, 434/307 R, 308, 322, 323, 336, 350, 362, 365; 395/500, 502, 506, 561, 752–760; 345/501, 502, 506, 507; 704/2–10; 707/100–104; 706/927

[56] References Cited

U.S. PATENT DOCUMENTS

| | | | |
|---|---|---|---|
| 4,772,206 | 9/1988 | Kerr et al. ............................ | 434/118 |
| 4,895,518 | 1/1990 | Arnold et al. ....................... | 434/350 X |
| 5,259,766 | 11/1993 | Sack et al. ........................... | 434/362 |
| 5,306,154 | 4/1994 | Ujita et al. .......................... | 434/362 X |
| 5,321,611 | 6/1994 | Clark et al. ......................... | 434/362 X |
| 5,326,270 | 7/1994 | Ostby et al. ........................ | 434/118 X |
| 5,385,475 | 1/1995 | Sudman et al. ..................... | 434/350 X |
| 5,421,730 | 6/1995 | Lasker, III et al. ................. | 434/323 X |
| 5,449,293 | 9/1995 | Chang et al. ....................... | 434/323 X |
| 5,590,360 | 12/1996 | Edwards ............................. | 434/350 X |
| 5,597,312 | 1/1997 | Bloom et al. ...................... | 434/118 X |

*Primary Examiner*—Joe Cheng
*Attorney, Agent, or Firm*—Staas & Halsey

[57] ABSTRACT

The system for carrying out educational management for a plurality of students according to the present invention comprises a first processing device for managing a plurality of students and a plurality of second processing devices as a processing device for the student. The first processing device includes an objective reference defining unit for defining an objective reference list by inputting the reference of objectives of achievement of a plurality of educational items; and a communication unit for delivering the objective reference list defined by the objective reference defining unit and an educational item list consisting of a plurality of educational items, to the second processing devices. Each of the second processing devices includes an educational plan list defining unit for defining an educational plan list by displaying the objective reference list and the educational item list and inputting the objective of achievement of each educational list to obtain the educational plan list comprising each educational item and the objective of achievement corresponding to the former.

12 Claims, 54 Drawing Sheets

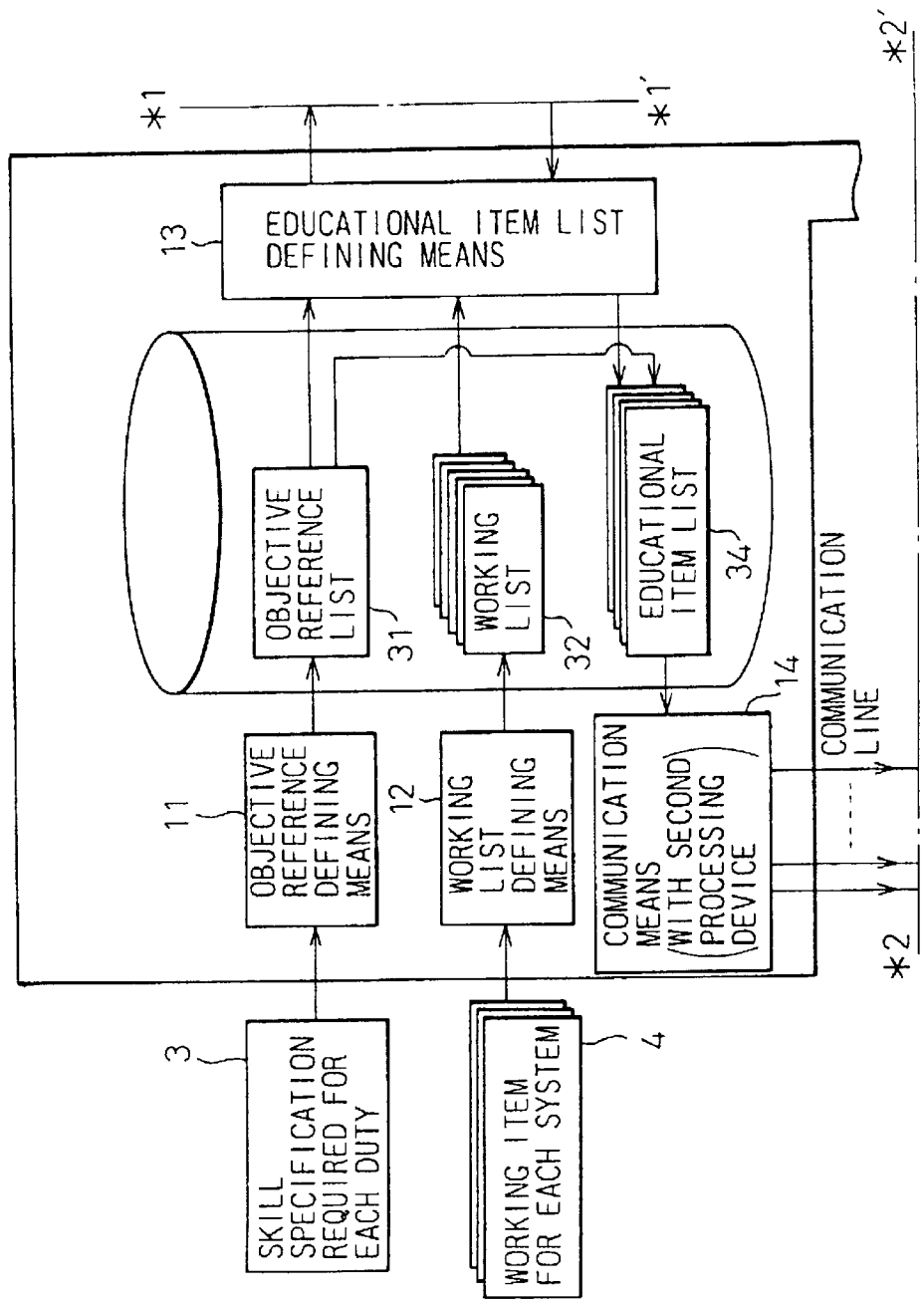

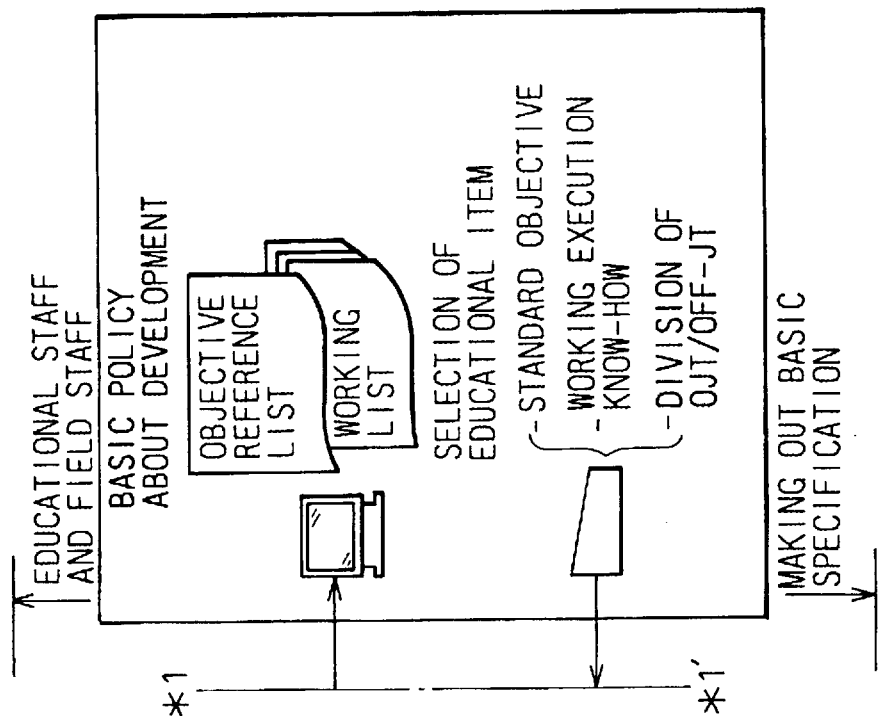

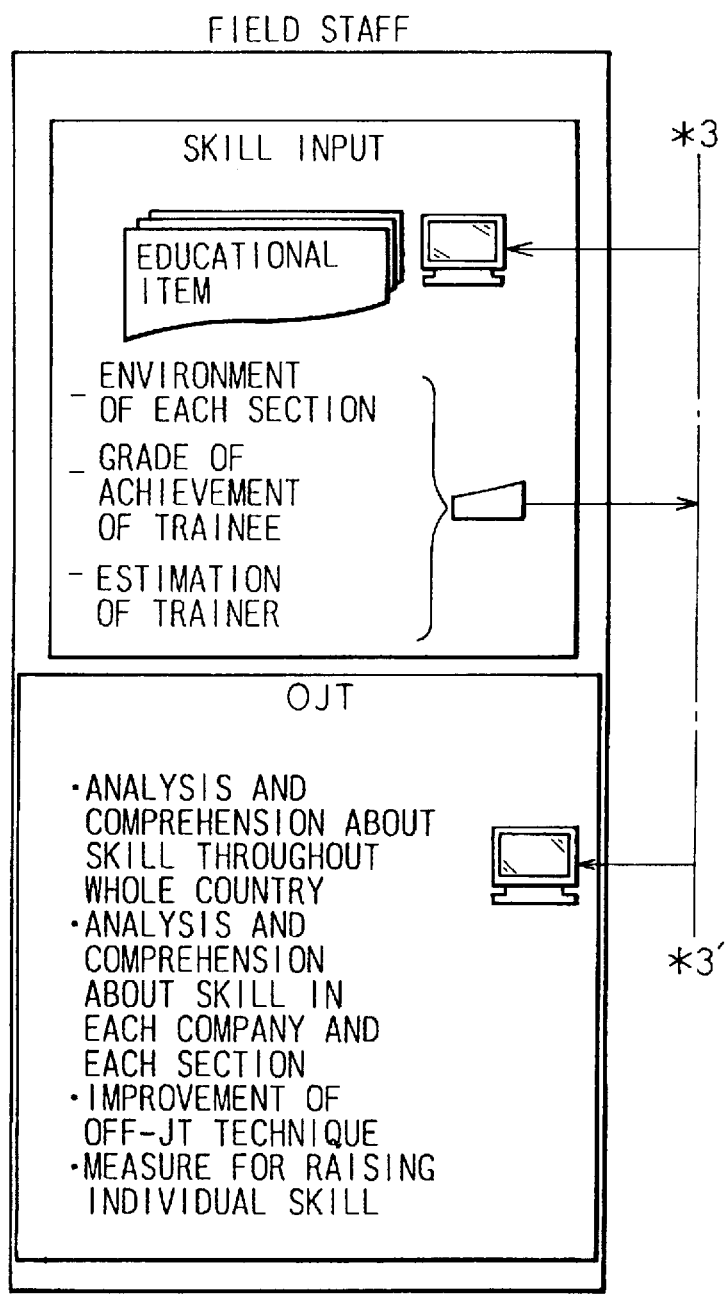

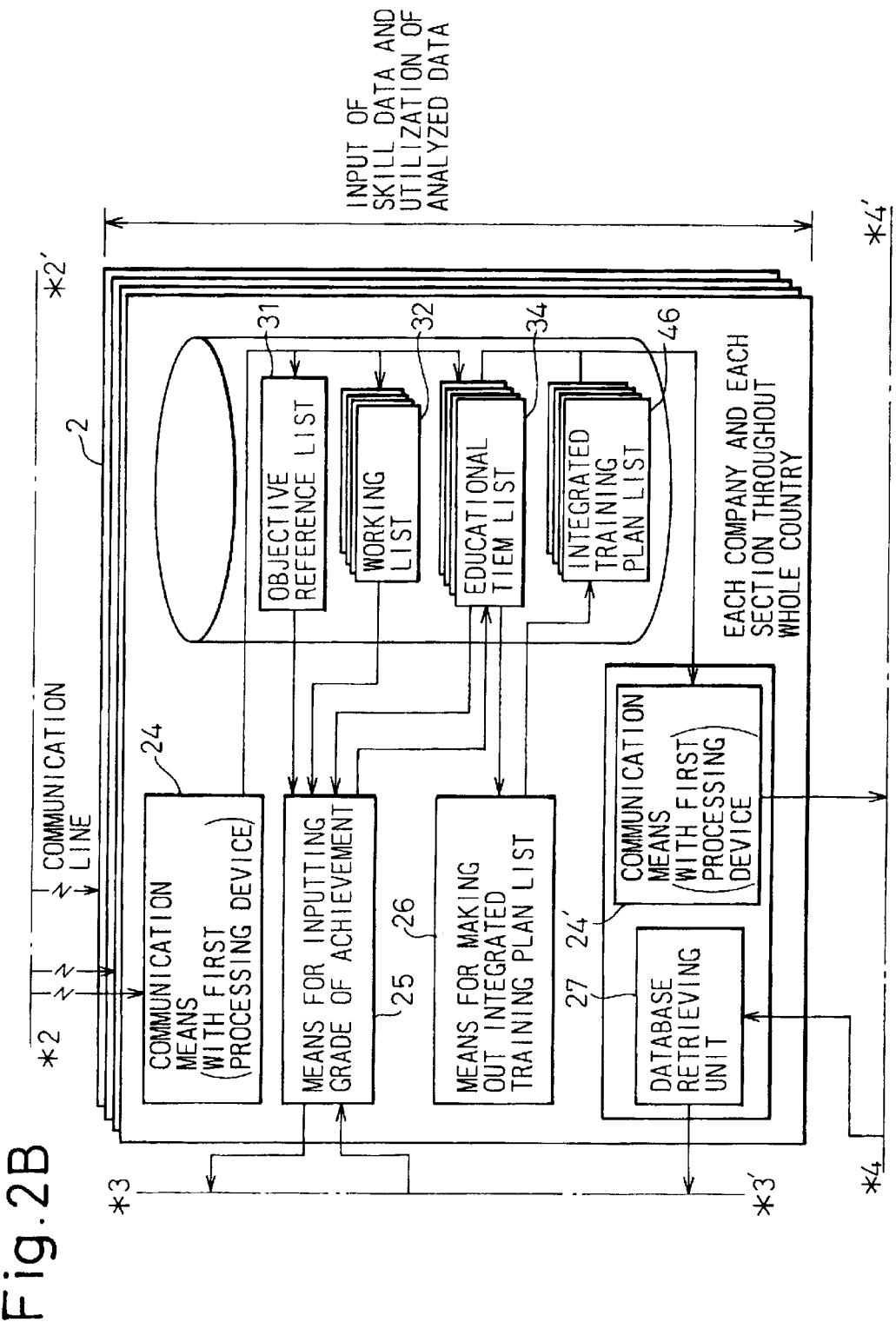

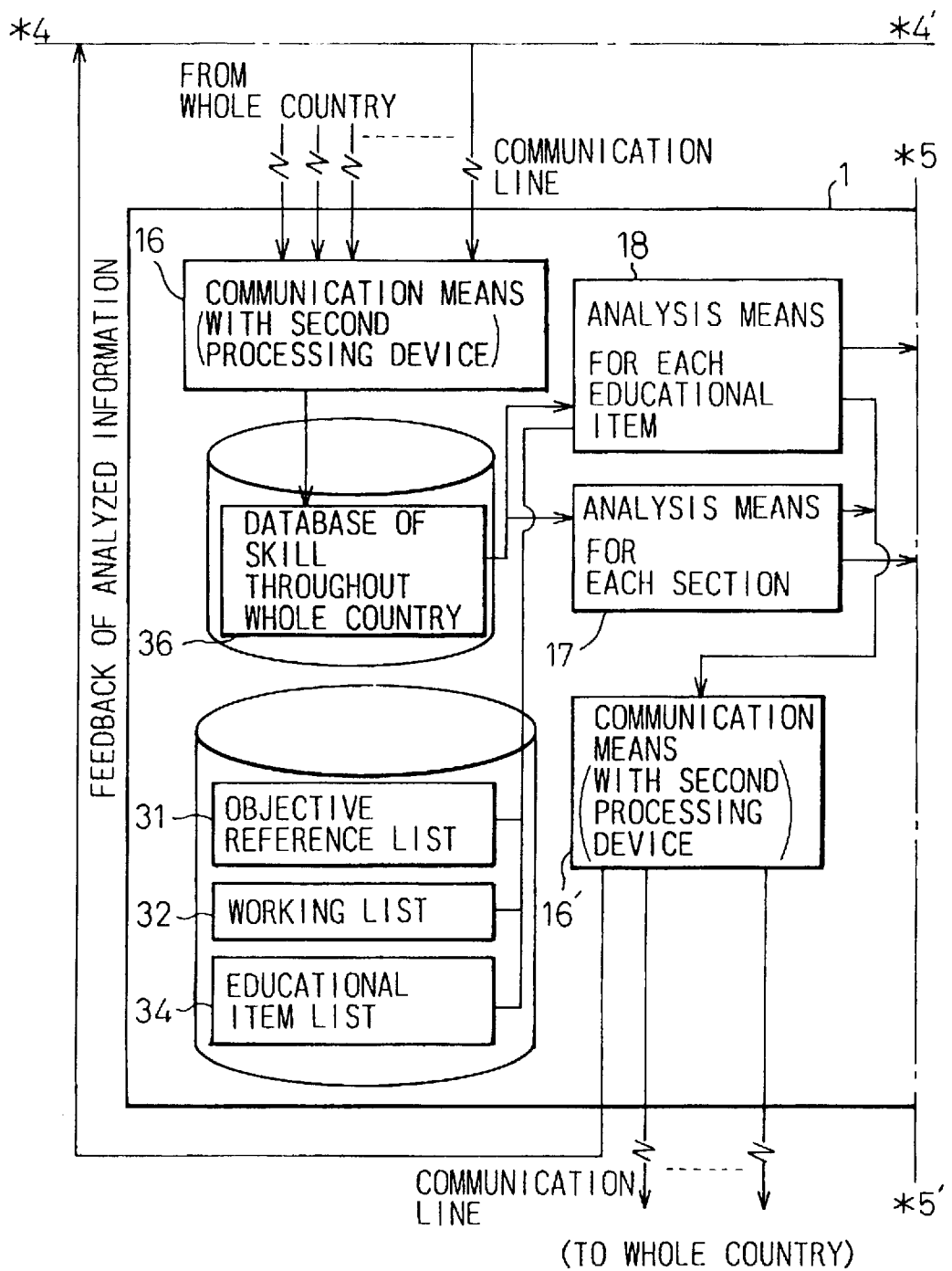

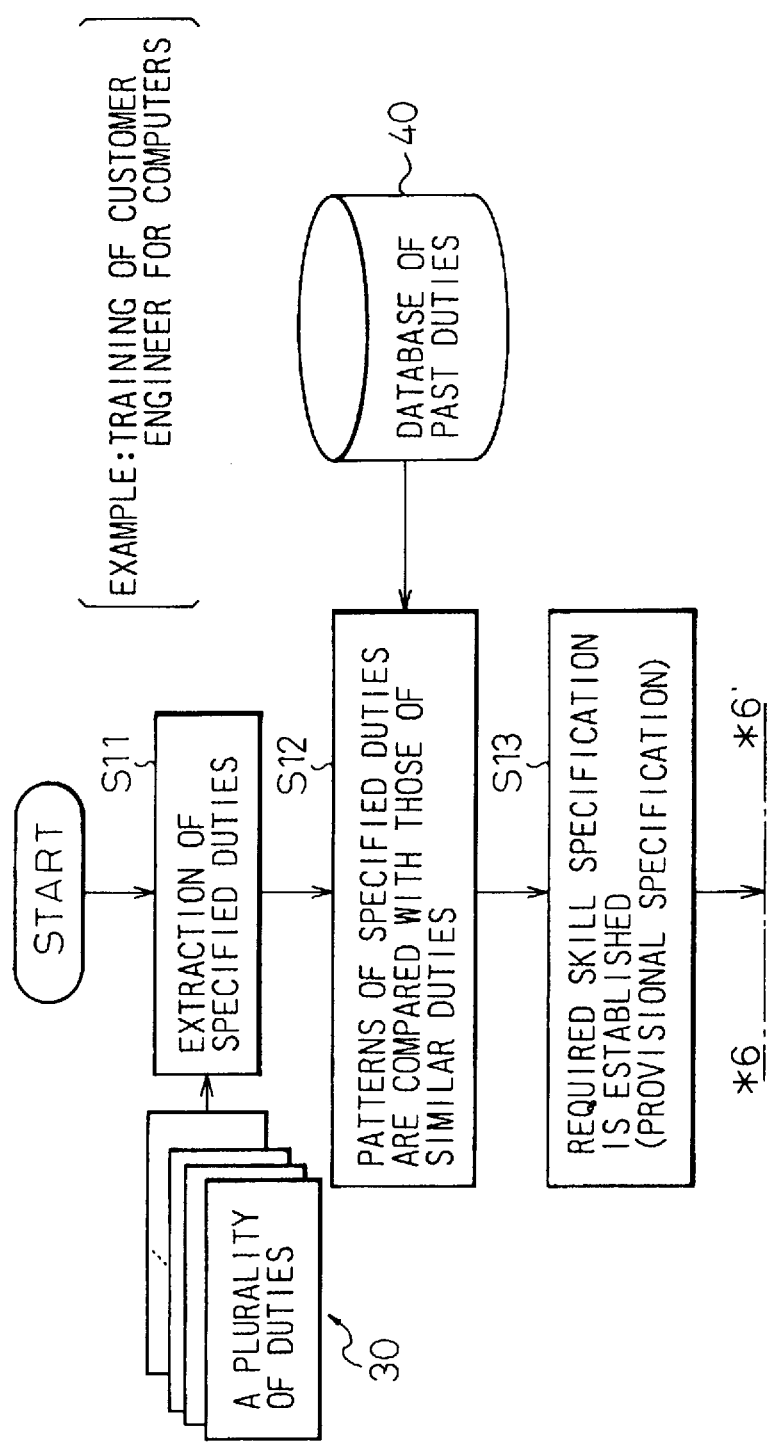

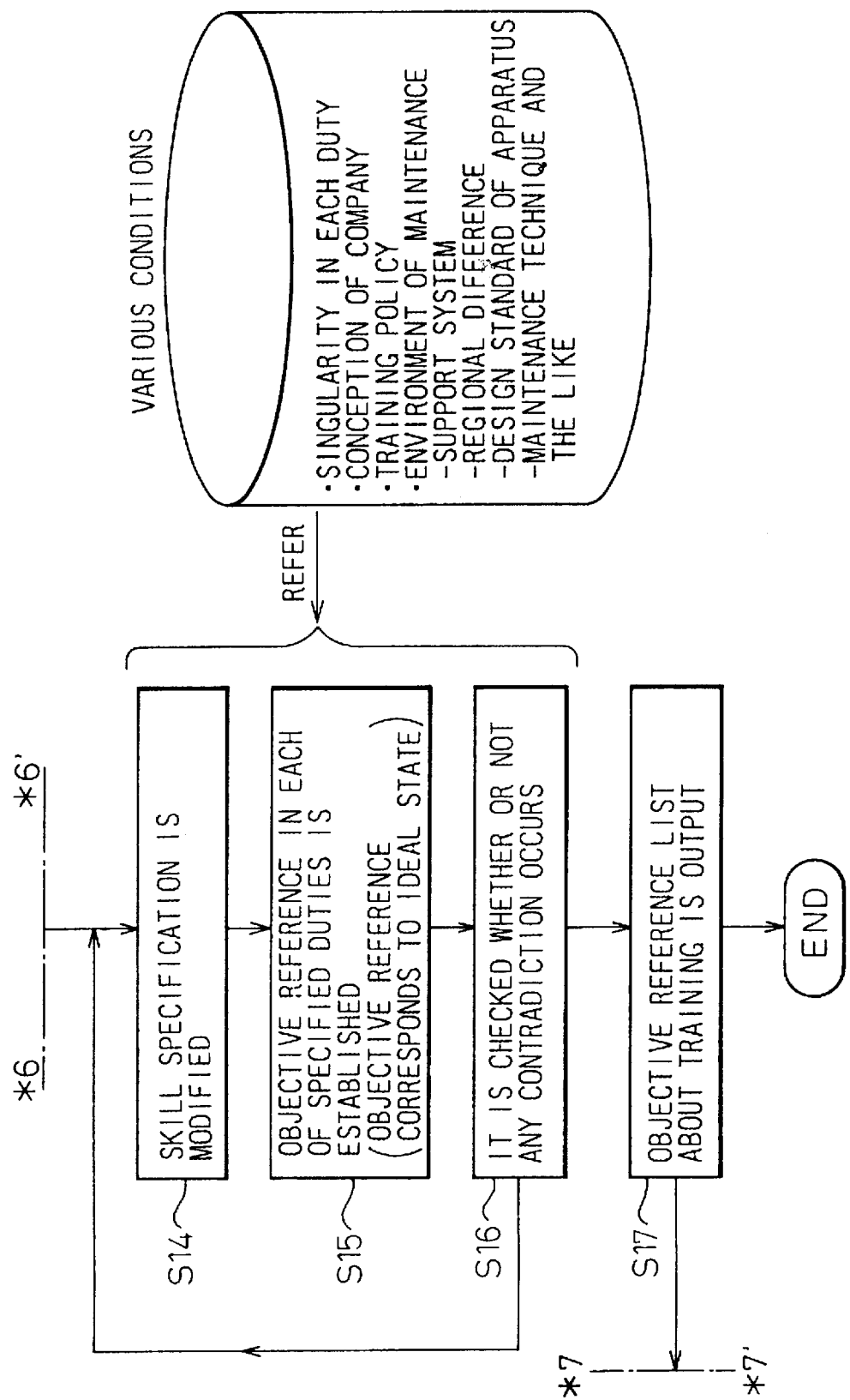

Fig. 5

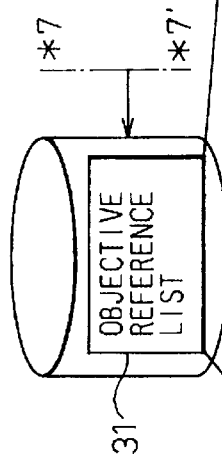

TABLE 1: OBJECTIVE REFERENCE LIST
(LIST REPRESENTING IDEAL STATE)

| OBJECTIVE REFERENCE (EXAMPLE: CUSTOMER ENGINEER FOR COMPUTERS) | | FIRST YEAR OF ENTRANCE | SECOND YEAR OF ENTRANCE | THIRD YEAR OF ENTRANCE |
|---|---|---|---|---|
| GRADE IN MAINTENANCE TECHNIQUE | CONCEPTION | ABILITY FOR EXECUTING GIVEN DUTY UNDER TRAINER'S GUIDANCE | ABILITY FOR UNDERSTANDING CONTENT OF GIVEN DUTY AND ACCOMPLISHING THE DUTY FOR HIMSELF | |
| | BASIC ITEM | UNDERSTANDING HARDWARE STRUCTURE OF APPARATUS IN CHARGE | EXCHANGING EACH HARDWARE UNIT IN APPARATUS IN CHARGE | |
| | | UNDERSTANDING CONFIGURATION OF BASIC INTERFACE AND MEANING OF EACH SIGNAL | UNDERSTANDING INTERFACE STANDARD, MEASURING EACH SIGNAL AND DETERMINING WHETHER IT IS GOOD OR BAD | |

Fig. 7A

★ US: USER SPECIFICATION

◎ : COMMON FOR EVERY USER
○ : DIFFERENT AT EACH EDITION OF OS
△ : MATTER INHERENT IN EACH USER

A PLURALITY OF SYSTEMS

WORKING LIST OF F○○○○ SYSTEM
WORKING LIST OF △△△△ SYSTEM
WORKING LIST OF F×××× SYSTEM

| WORKING ITEM | ADDITIONAL INFORMATION, AND MATTER TO BE ATTENDED TO | US | No. |
|---|---|---|---|
| ① CONFIRMATION OF OVERHAULED UNITS AND ATTACHED UNITS AND VISUAL INSPECTION THEREOF | ・ATTACHED UNITS FUNDAMENTALLY INCLUDES THE FOLLOWING UNITS (NOTE THAT THEY MAY BE DIFFERENT FOR EACH USER) -VBR -FPD FOR SYSTEM CONSTRUCTION | △ | - |
| ② SETTING OF CONTROL PRINTED CIRCUIT BOARD | ・SETTING IN THE ACTUAL PLACE INCLUDES THE FOLLOWING POINTS: -SETTING OF CPUID CODE -SETTING OF MEMORY CAPACITY -SETTING OF LAN INTERFACE SPECIFICATION | ◎ | 1 |
| ③ CONNECTION OF BATTERY AND CABLES | ・BATTERY IS USED FOR BACKING UP DATA IN CPU SRAM ・SCSI IS CONNECTED IN THE SEQUENCE OF ID1, ID2, ID3 AND ID4 | ◎ | 2 |

CARRYING IN APPARATUS, AND ADJUSTMENT OF APPARATUS IN THE ACTUAL PLACE
TABLE 4: WORKING LIST (POINT OF MAINTENANCE WORK)

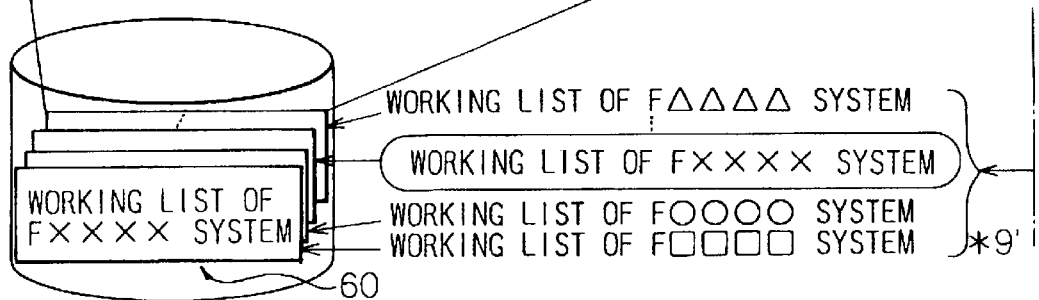

WORKING LIST OF F△△△△ SYSTEM
WORKING LIST OF F×××× SYSTEM
WORKING LIST OF F○○○○ SYSTEM
WORKING LIST OF F□□□□ SYSTEM
WORKING LIST OF F×××× SYSTEM
—60

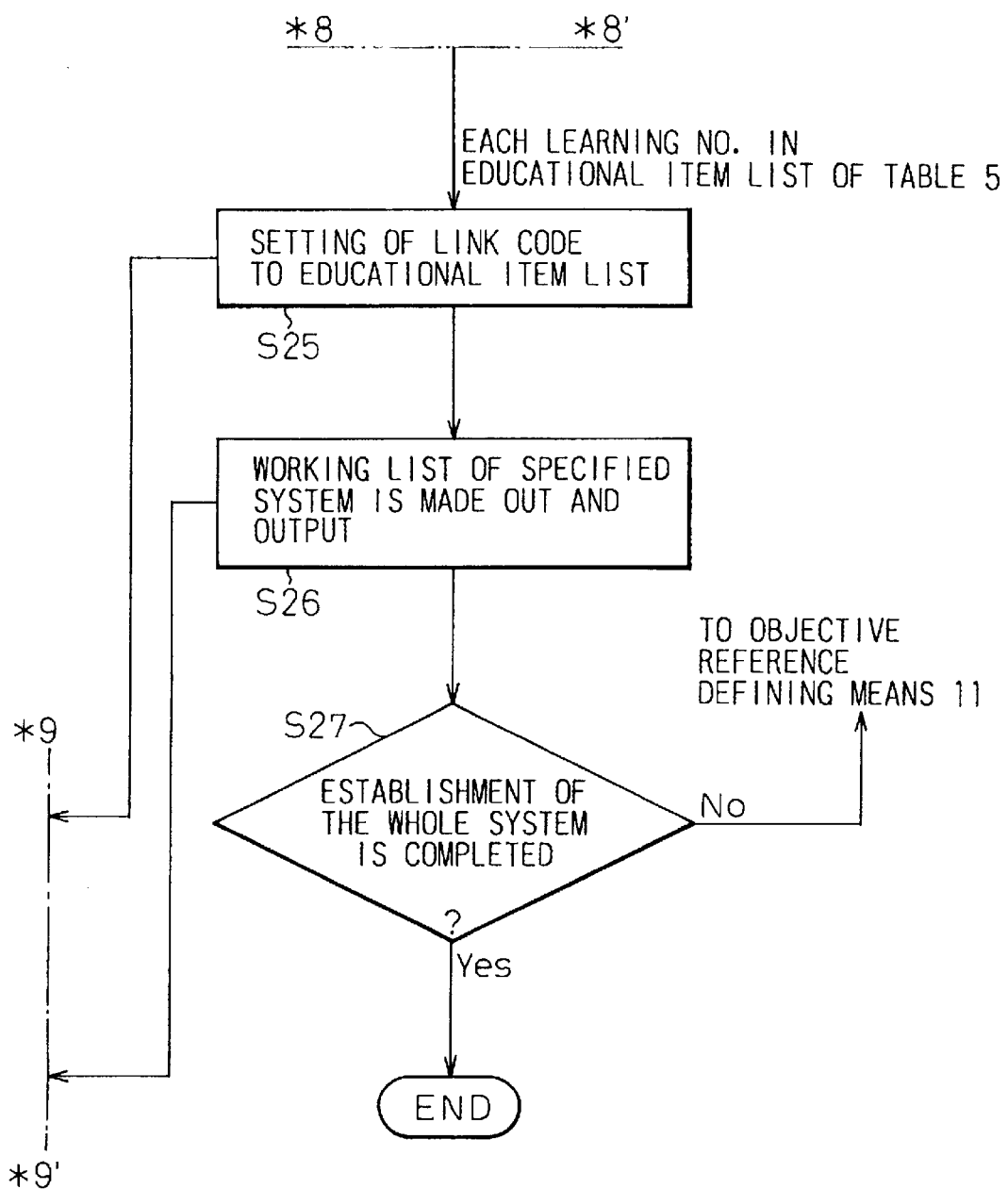

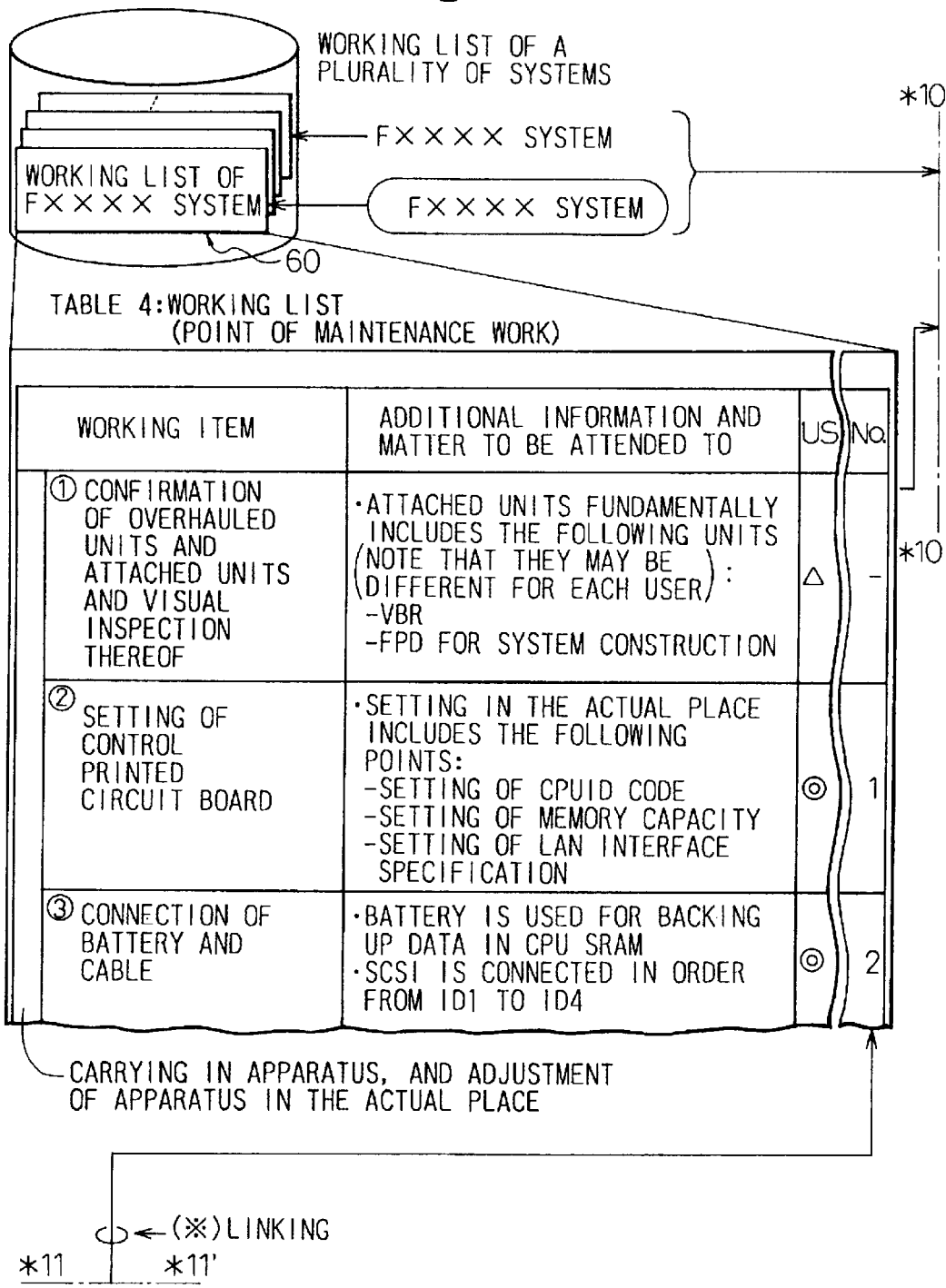

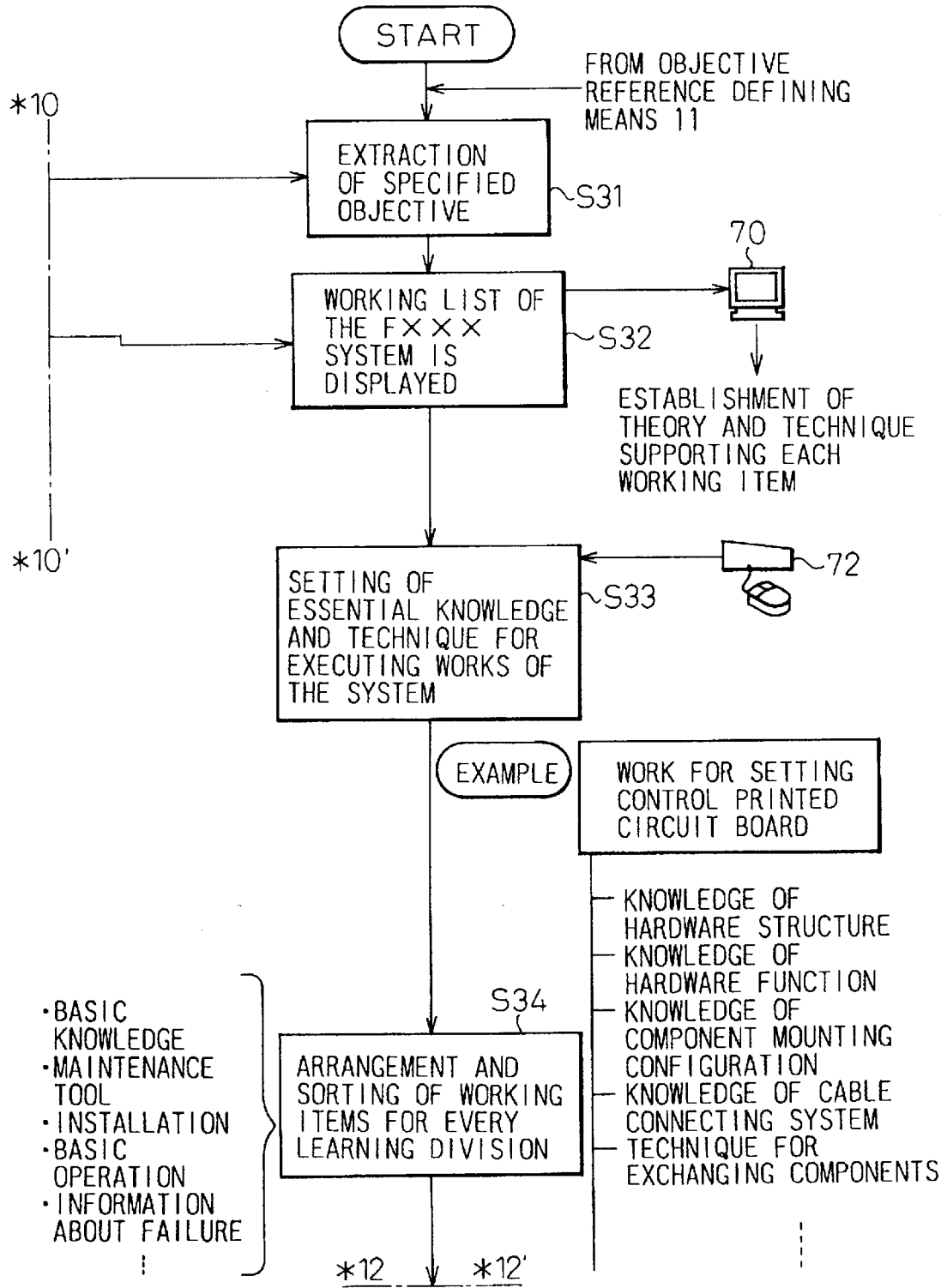

TABLE 5: EDUCATIONAL ITEM LIST
(PLAN LIST FOR RAISING UP INDIVIDUAL SKILL)

TABLE 6: INTEGRATED TRAINING PLAN LIST

INTEGRATED TRAINING PLAN LIST OF A PLURALITY OF TRAINEES

Fig.16A

TABLE 6: INTEGRATED TRAINING PLAN LIST

NUMBER OF SHEETS OF DESIGNATED PLAN LIST (NUMBER OF PERSONS)

SUM FOR EVERY LEARNING OBJECT: A B C D E F G H I J K L ---   *21

(INDIVIDUAL SKILL) INTEGRATED TRAINING PLAN LIST (NAME OF ENGINEER: ○○○○○)

| LEARNING OBJECT | | | | | | | STANDARD | SECTION | TRAINEE HIMSELF | TRAINER | STANDARD | SECTION | TRAINEE HIMSELF | CHIEF | STANDARD |
|---|---|---|---|---|---|---|---|---|---|---|---|---|---|---|---|
| □ | | 42 | 45 | 48 | 47 | 62 | 70 | 60 | 60 | 80 | 85 | 80 | 78 | 90 |
| □ | | 30 | 30 | 25 | 25 | 50 | 55 | 48 | 50 | 73 | 70 | 68 | 70 | 8 |
| □ | | 58 | 60 | 50 | 48 | 65 | 65 | 60 | 60 | 80 | 80 | 72 | 70 | 9 |
| SYSTEM | ◆ | 30 | 32 | 30 | 30 | 59 | 58 | 50 | 48 | 70 | 73 | 73 | 70 | 8 |
| | □ | 45 | 44 | 40 | 41 | 60 | 62 | 58 | 56 | 78 | 80 | 81 | 78 | 8 |
| | ■ | 43 | 40 | 40 | 35 | 60 | 64 | 54 | 55 | 76 | 79 | 78 | 75 | 8 | a b c d e f (g) h i j k l ----

CALCULATION OF AVERAGE VALUE
FOR ALL THE TRAINEES

EXAMPLE IN WHICH AVERAGE VALUE OF GRADE
OF ACHIEVEMENT ABOUT MANNER AND MORAL IN EACH
TRAINEE HIMSELF IS CALCULATED WHEN ONE YEAR
PASSED AFTER ENTRANCE

TRAINEE 1  60 g
TRAINEE 2  65 g
TRAINEE 3  70 g
TRAINEE 4  85 g
TRAINEE 181  45 g
TRAINEE 182  90 g

SUM = 14145 POINT

AVERAGE
VALUE
14145÷182≒77.7 *

NUBER OF
DESIGNATED = 182
TRAINEES

*: ANY FIGURE THAT IS
POSITIONED IN DECIMAL
PLACES NOT LESS THAN THREE
PLACES IS CUT
DOWN TO DECIMAL POINT IS
CUT OFF

Fig. 17

TABLE 7: ANALYZED INFORMATION (EVERY DESIGNATED APPARATUS)

| STATE OF ACHIEVEMENT OF SKILL THROUGHOUT WHOLE COUNTRY (TERMINAL DEVICE) | | | TIME WHEN EDUCATION IS FINISHED | | | ONE YEAR AFTER ENTRANCE | | | TWO YEARS AFTER ENTRANCE | | | THREE YEARS AFTER ENTRANCE | | |
|---|---|---|---|---|---|---|---|---|---|---|---|---|---|---|
| COMMON MATTER | MANNER, MORAL AND BEHAVIOR | | 189 | 500 | 57.8 | 182 | 70.0 | 78.0 | 100 | 85.0 | 88.5 | 137 | 90.0 | 90.0 | 90.1 |
| | BASIC DUTY OF CE | | 189 | 500 | 51.1 | 182 | 70.5 | 75.5 | 159 | 81.1 | 81.1 | 136 | 84.8 | 84.8 | 84.8 |
| | BASIC TECHNIQUE OF CE | | 189 | 500 | 53.5 | 182 | 70.5 | 73.3 | 159 | 75.1 | 75.1 | 136 | 80.8 | 80.8 | 80.8 |
| MAINTENANCE TECHNIQUE | SYSTEM | ◆ | — | — | — | 65 | 45.5 | 69.3 | 100 | 70.5 | 75.1 | 136 | 75.0 | 75.0 | 70.0 |
| | | □ | — | — | — | 40 | 45.5 | 40.5 | 120 | 60.0 | 68.5 | 136 | 75.5 | 75.5 | 66.5 |
| | BANKING TERMINAL | ■ | 189 | 500 | 55.4 | 180 | 70.5 | 35.0 | 160 | 85.8 | 59.0 | 136 | 90.5 | 90.5 | 91.5 |
| | | □ | — | — | — | 65 | 60.5 | 73.2 | 140 | 65.5 | 88.8 | 134 | 90.5 | 90.5 | 89.0 |
| | | ■ | 189 | 500 | 60.0 | 188 | 65.0 | 65.5 | 160 | 85.0 | 83.8 | 134 | 85.0 | 85.0 | 89.0 |
| | | ■ | 189 | 500 | 53.4 | 178 | 60.0 | 75.2 | 160 | 77.0 | 63.5 | 135 | 95.5 | 95.5 | 95.0 |
| | | ■ | 189 | 500 | 50.4 | 178 | 55.0 | 64.2 | 160 | 75.0 | 90.0 | 134 | 83.5 | 83.5 | 83.5 |
| | ON-LINE | ▲ | 189 | 500 | 30.2 | 178 | 45.0 | 60.5 | 160 | 65.0 | 75.8 | 135 | 75.5 | 75.5 | 70.5 |
| | | | 189 | 35.0 | 30.2 | 178 | 40.0 | 35.2 | 160 | 70.0 | (48.0) | 134 | 85.5 | 85.5 | 59.5 |

A'~D'    E'    F'    I'~L'

*23 / *23'
*24 / *24'

→ AVERAGE VALUE THROUGHOUT WHOLE COUNTRY
→ EACH COMPANY
→ EACH REGION
→ EACH SECTION
→ EACH PERIOD
→ DISTINCTION OF SEX

— AVERAGE VALUE OF GRADE OF ACHIEVEMENT BY TRAINEE
— AVERAGE VALUE OBTAINED BY ESTIMATION BY TRAINER
— AVERAGE VALUE BASED ON THE TWO KINDS OF AVERAGE VALUE

NUMBER OF SHEETS OF DESIGNATED PLAN LIST
(NUMBER OF PERSONS WHICH ARE SUBJECT OF ANALYSIS)

IN REGARD TO MATTER HAVING LOW GRADE OF ACHIEVEMENT, RELATED FACTORS CAN BE EXAMINED BY ANALYZING EDUCATIONAL ITEMS AS SHOWN IN FIGS. 19 TO 22

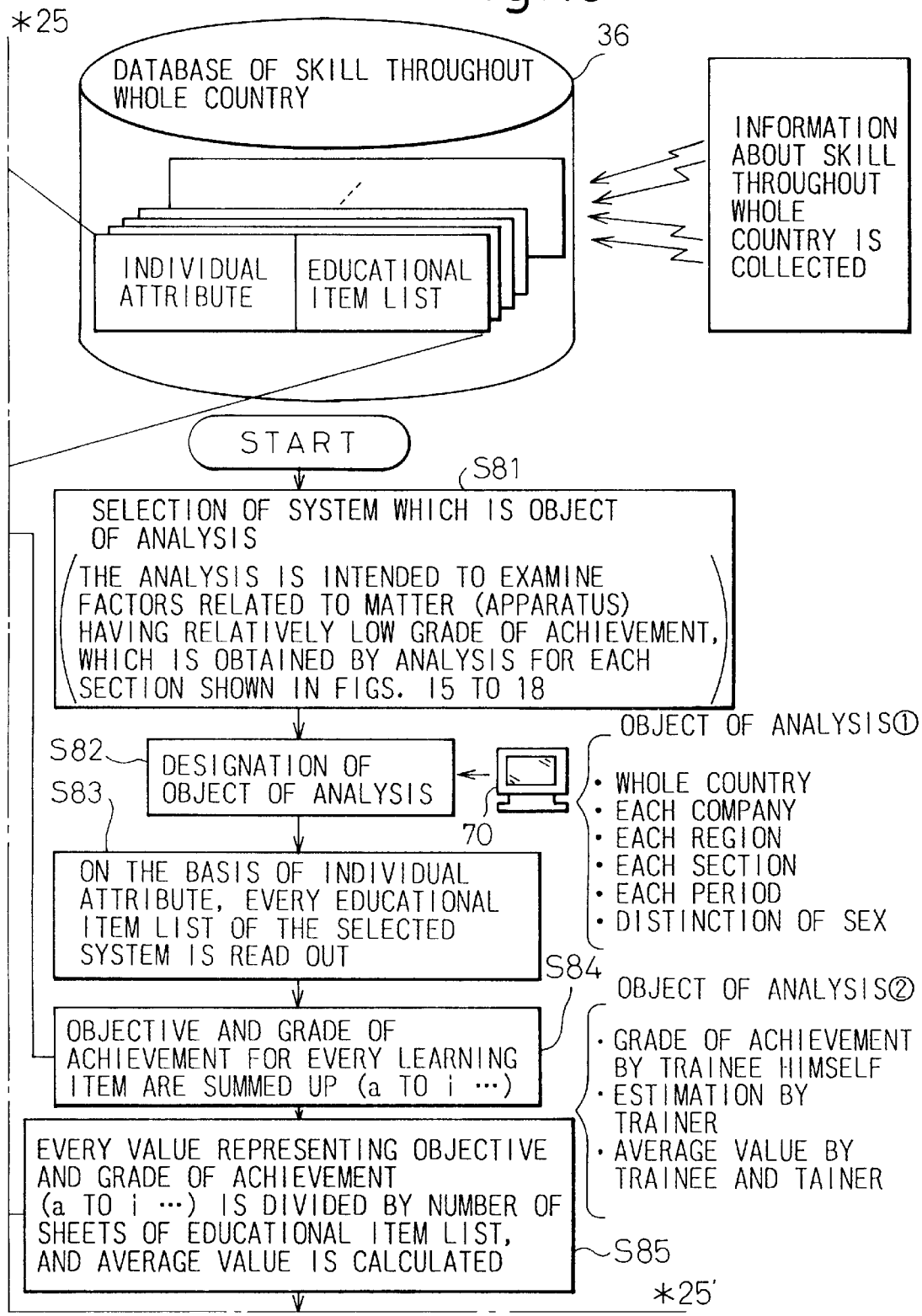

Fig.20A

TABLE 5: EDUCATIONAL ITEM LIST
(PLAN LIST FOR RAISING UP INDIVIDUAL SKILL)

NUMBER OF SHEETS OF DESIGNATED PLAN LIST (NUMBER OF PERSONS)

SUM FOR EVERY LEARNING OBJECT  *25

A  B  C  D  E  F  G  H  I ---

| LEARNING ITEM | OBJECTIVE, GRADE OF ACHIEVEMENT | TIME WHEN EDUCATION IS FINISHED | | ONE YEAR AFTER ENTRANCE | |
|---|---|---|---|---|---|
| | | OBJECTIVE | GRADE OF ACHIEVEMENT | OBJECTIVE | GRADE OF ACHIEVEMENT |
| 1 | □ | ○ ○ | ● ● | ○ ○ | ● ● |
| 2 | □ | ○ ○ | ● ● | ○ ○ | ● ● |
| 3 | □ | ○ ○ | ● ● | ○ ○ | ● ● |
| 4 | □ | △ △ | ▲ ● | ○ ○ | ● ● |
| 5 | □ | ○ △ | ▲ ✕ | ○ △ | ● ● |
| 6 | □ | △ △ | ✕ ✕ | △ △ | ▲ ▲ |
| 7 | □ | △ ○ | ✕ ✕ | △ ○ | ▲ ✕ | a  b  c  d  e  f  ⓖ  h  i ---

*25'

*26  *26'

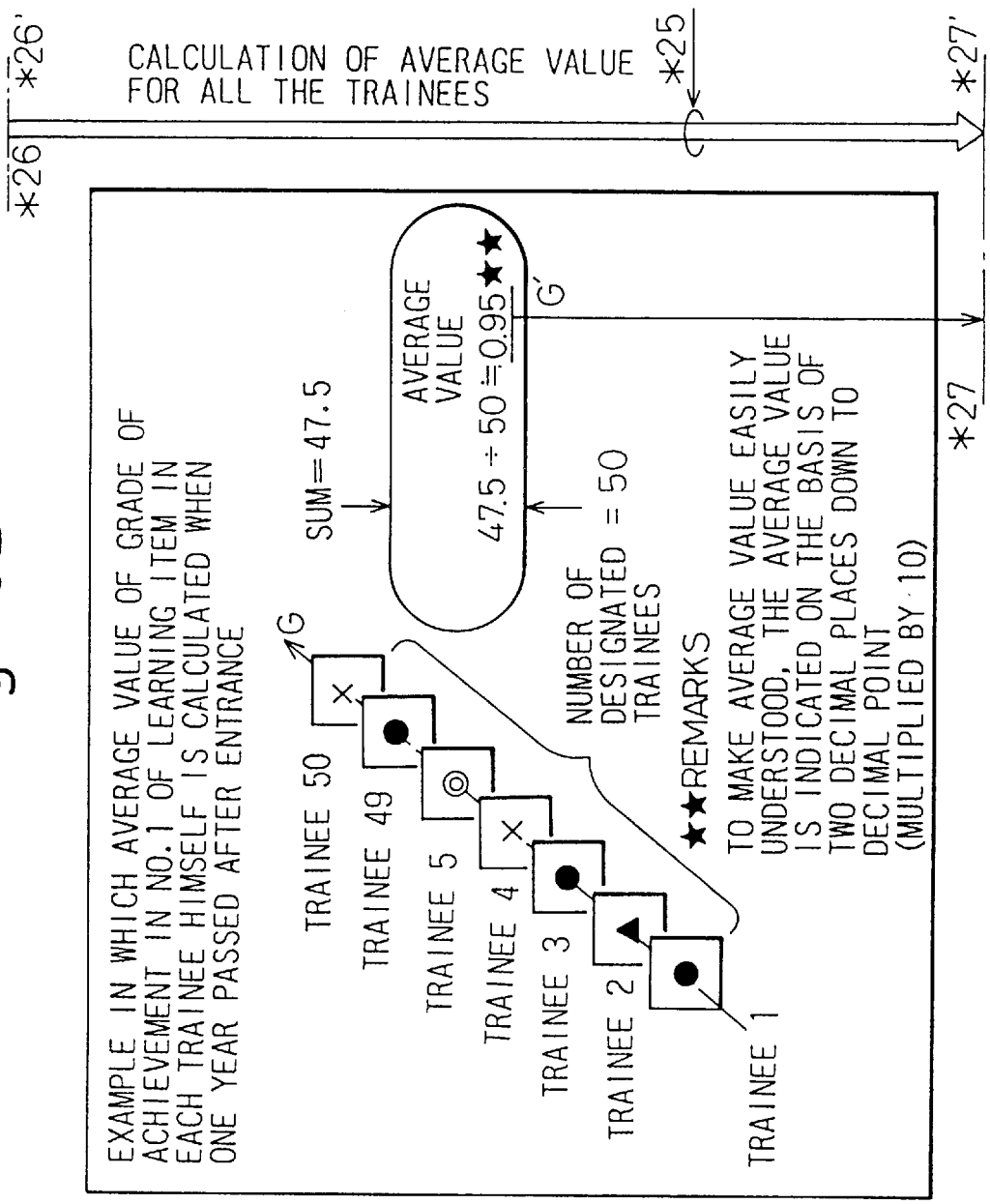

TABLES 8 AND 9: ANALYZED INFORMATION

| CE WHO ENTERED COMPANY AT THE 1993 YEAR; STATE OF ACHIEVEMENT OF SKILL FOR EACH COMPANY | S: REGION | RANKING NO.1 | RANKING NO.2 | RANKING NO.3 | --- |
|---|---|---|---|---|---|
| CE WHO ENTERED COMPANY AT THE 1993 YEAR; STATE OF ACHIEVEMENT OF SKILL FOR EACH REGION | S: NAME OF COMPANY | NO.1 OSAKA | NO.2 KYUSHU | NO.3 SHIKOKU | --- |
| CE WHO ENTERED COMPANY AT THE 1993 YEAR; STATE OF ACHIEVEMENT OF INDIVIDUAL SKILL | S: TRAINEE | RANKING NO.1 YAMADA | RANKING NO.2 TSUKAHARA | RANKING NO.3 KOJIMA | --- |

| P: LEARNING ITEM | | | | | | |
|---|---|---|---|---|---|---|
| 1 | □ | | 10 | 10 | 10 | --- |
| 2 | □ | | 10 | 10 | 10 | --- |
| 3 | □ | | 10 | 5 | 10 | --- |
| 4 | □ | | 10 | 10 | 10 | --- |
| 14 | * | | 10 | 10 | 5 | --- |
| 15 | * | | 10 | 5 | 5 | --- |
| 16 | * | | 10 | 10 | 5 | --- |
| 17 | * | | 10 | 10 | 10 | --- |
| 18 | □ | | 10 | 5 | 10 | --- |
| 19 | □ | | 10 | 10 | 5 | --- |
| 20 | ■ | | 10 | 5 | 5 | --- |
| 21 | ■ | | 10 | 5 | 10 | --- |
| 47 | * | | 10 | 5 | 10 | --- |
| 48 | * | | 10 | 5 | 0 | --- |
| 49 | * | | 10 | 5 | 5 | --- |
| 50 | * | | 5 | 5 | 5 | --- |
| SUM OF POINTS IN COLUMN DIRECTION | | | 425 | 405 | 385 | --- |
| | | | 42 | 40 | 38 | --- |
| ALL-INCLUSIVE GRADE OF ACIEVEMENT | | | | | | --- |

WARNING

| | RANKING NO.43 NAKAMURA | RANKING NO.49 TANAKA | RANKING NO.50 MITA | ... | NO.65 TOKYO | NO.66 HOKURIKU | NO.67 NAGANO | TOTAL POINTS | AVERAGE VALUE | GRADE OF ACHIEVEMENT | STANDARD OBJECTIVE | | SECTIONAL OBJECTIVE | |
|---|---|---|---|---|---|---|---|---|---|---|---|---|---|---|
| | | | | | | | | | | | OBJECTIVE | WARNING | OBJECTIVE | WARNING |
| --- | 10 | 5 | 0 | | RANKING NO.65 | RANKING NO.66 | RANKING NO.67 | 475 | 9.5 | | ●10 | ↕ | ▲5 | |
| --- | 10 | 10 | 10 | | | | | 500 | 10.0 | | ●10 | | ●:0 | |
| --- | 10 | 5 | 5 | | | | | 425 | 8.5 | | ●10 | ↕ | ●10 | |
| --- | 10 | 5 | 0 | | | | | 450 | 9.0 | | ●10 | ↕ | ●:0 | |
| --- | 5 | 5 | 0 | | | | | 50 | 1.0 | | 0 | | ×0 | |
| --- | 5 | 5 | 0 | | | | | 450 | 9.0 | | ●10 | ↕ | ●10 | ↕ |
| --- | 5 | 5 | 0 | | | | | 325 | 6.5 | | ▲5 | | ×0 | |
| --- | 5 | 5 | 0 | | | | | 375 | 7.5 | | ▲5 | | ▲5 | |
| --- | 5 | 5 | 5 | | | | | 425 | 8.5 | | ●:0 | ↕ | ●:0 | ↕ |
| --- | 10 | 5 | 5 | | | | | 495 | 9.5 | | ●:0 | ↕ | ▲0 | |
| --- | 5 | 5 | 5 | | | | | 450 | 9.0 | | ●:0 | ↕ | ▲5 | |
| --- | 5 | 5 | 5 | | | | | 450 | 9.0 | | ▲5 | | ▲5 | |
| --- | 10 | 10 | 10 | | | | | 375 | 7.5 | | ●10 | ↕ | ▲5 | |
| --- | 5 | 0 | 0 | | | | | 175 | 3.5 | | ▲5 | ↕ | ▲5 | ↕ |
| --- | 0 | 0 | 0 | | | | | 25 | 0.5 | | ×0 | | ×0 | |
| --- | 0 | 0 | 0 | | | | | 25 | 0.5 | | ×0 | | ×0 | |
| --- | 395 | 305 | 105 | | | | | — | 300.5 | | 370 | | 350 | |
| --- | 35 | 30 | 10 | | | | | | 30 | | 37 | | 35 | |
| --- | ! | ! | !! | | | | | — — | ! | | | | | |

Fig.23

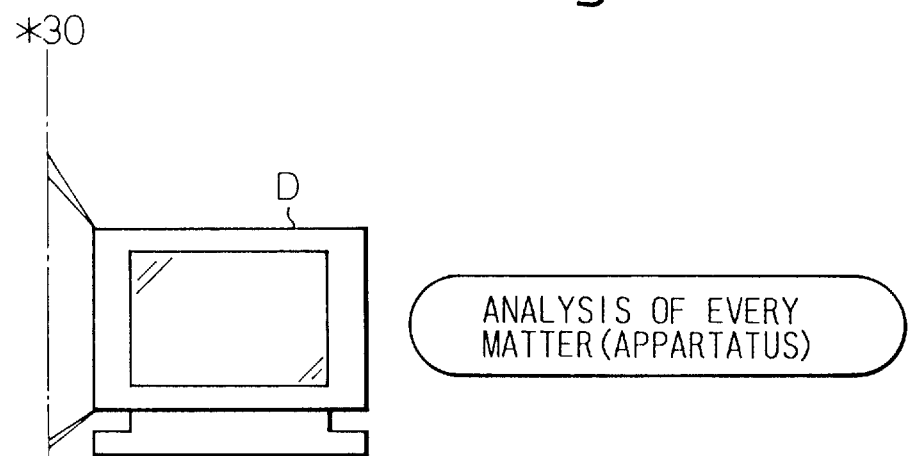

OUTPUT OF DISTRIBUTION OF SKILL THROUGHOUT
WHOLE COUNTRY AND RESULT OF ANALYSIS OF SKILL IN
THE OWN COMPANY/SECTION

⇒ MAKING TRAINING PLAN IN EACH
COMPANY AND PROMOTION OF OJT

- COMPREHENSION OF SKILL LEVEL IN THE OWN COMPANY/SECTION BY COMPARISON WITH SKILL LEVEL THROUGHOUT THE WHOLE COUNTRY AND OTHER COMPANIES

- COMPREHENSION AND RECONSTRUCTION OF CAPABLE MEN/THEIR SKILL AND PYRAMID DISTRIBUTION THEREOF

- COMPREHENSION OF APPARATUS WHICH MUST BE REINFORCED IN THE FUTURE

- ESTABLISHMENT OF TRAINING SYSTEM IN THE OWN COMPANY AND DEVELOPMENT OF INSTRUCTOR/TRAINER

- TAKING IN OBJECTIVES AND TRAINING TECHNIQUES USED IN OTHER COMPANIES

EXAMINING CONCRETE FACTORS
RELATED TO MATTER (APPARATUS)
HAVING LOW GRADE OF ACHIEVEMENT

TABLE 7: ANALYZED INFORMATION
(EVERY DESIGNATED APPARATRS)

| | | | STATE OF ACHIEVEMENT OF SKILL FOR EACH COMAPNY/SECTION | | | | | | | | | | | |
|---|---|---|---|---|---|---|---|---|---|---|---|---|---|---|
| | | | TIME WHEN EDUCATION IS FINISHED | | | ONE YEAR AFTER ENTRANCE | | | TWO YEARS AFTER ENTRANCE | | | THREE YEARS AFTER ENTRANCE | | |
| STATE OF ACHIEVEMENT OF SKILL REPRESENTED BY AVERAGE VALUE THROUGHOUT THE WHOLE COUNTRY | | | 189 | 50.0 | 57.8 | 182 | 70.0 | 78.0 | 100 | 77.7 | 85.0 | 88.5 | 89.1 | 137 | 90.0 | 90.0 | 90.1 |
| COMMON MATTER | MANNER, MORAL AND BEHAVIOR | | 189 | 50.0 | 51.1 | 182 | 70.5 | 75.5 | 159 | 73.3 | 81.1 | 81.1 | 81.1 | 136 | 84.8 | 84.8 | 84.8 |
| | BASIC DUTY OF CE | | 189 | 50.0 | 53.5 | 182 | 70.5 | 70.5 | 159 | 69.3 | 75.1 | 75.1 | 75.1 | 136 | 80.8 | 80.8 | 80.8 |
| | BASIC TECHNIQUE OF CE | | — | — | — | 65 | 45.5 | 40.5 | 100 | 40.5 | 70.5 | 70.5 | 68.5 | 136 | 75.0 | 75.0 | 70.0 |
| MAINTENANCE TECHNIQUE | SYSTEM | ◆ | — | — | — | 40 | 45.5 | 35.0 | 120 | 35.0 | 60.0 | 60.0 | 59.0 | 136 | 75.5 | 75.5 | 66.5 |
| | | □ | 189 | 50.0 | 55.4 | 180 | 70.5 | 70.5 | 160 | 73.2 | 85.8 | 88.8 | 83.8 | 134 | 90.5 | 90.0 | 91.5 |
| | BANKING TERMINAL | ■ | 189 | 50.0 | 60.4 | 188 | 60.5 | 65.0 | 140 | 65.5 | 65.5 | 67.5 | 63.5 | 136 | 85.0 | 90.0 | 89.0 |
| | | □ | 189 | 50.0 | 53.4 | 178 | 60.0 | 63.0 | 160 | 75.2 | 85.0 | 90.0 | 88.8 | 134 | 90.5 | 95.5 | 95.0 |
| | | ■ | 189 | 50.0 | 50.4 | 178 | 55.0 | 56.0 | 160 | 64.2 | 77.0 | 75.0 | 75.8 | 135 | 83.5 | 83.5 | 83.5 |
| | | ■ | 189 | 50.0 | 50.4 | 178 | 55.0 | 56.0 | 160 | 60.5 | 65.0 | 65.0 | 65.9 | 134 | 75.5 | 75.5 | 70.5 |
| | ON-LINE | ■ | 189 | 35.0 | 30.2 | 178 | 40.0 | 45.0 | 160 | 35.2 | 70.0 | 70.0 | (48.0) | 134 | 85.5 | 85.5 | 59.5 |

MODEM/ON-LINE

FOR EXAMPLE, GRADE OF ACHIEVEMENT IN SPECIFIC APPARATUS (MODEM/ON-LINE) WHEN TWO YEARS PASSED AFTER ENTRANCE IS LOW, AND RELATED FACTORS SHOULD BE EXAMINED

TABLES 8 AND 9:ANALYZED INFORMATION

| WHOLE COUNTRY | | | | | |
|---|---|---|---|---|---|
| EACH REGION/SECTION | | | | | |
| CE WHO ENTERED COMPANY AT THE 1993 YEAR;STATE OF ACHIEVEMENT OF INDIVIDUAL SKILL / P:LEARNING ITEM | S:TRAINEE | RANKING NO.1 YAMADA | RANKING NO.2 TSUKAHARA | RANKING NO.3 KOJIMA | --- |
| 1 | □ | 10 | 10 | 10 | --- |
| 2 | □ | 10 | 10 | 10 | --- |
| 3 | □ | 10 | 5 | 10 | --- |
| 4 | □ | 10 | 10 | 10 | --- |
| 14 | ∗ | 10 | 10 | 5 | --- |
| 15 | ∗ | 10 | 5 | 5 | --- |
| 16 | ∗ | 10 | 10 | 5 | --- |
| 17 | ∗ | 10 | 10 | 10 | --- |
| 18 | □ | 10 | 5 | 10 | --- |
| 19 | □ | 10 | 10 | 5 | --- |
| 20 | ■ | 10 | 5 | 5 | --- |
| 21 | ■ | 10 | 5 | 10 | --- |
| 47 | ∗ | 10 | 5 | 10 | --- |
| 48 | ∗ | 10 | 5 | 0 | --- |
| 49 | ∗ | 10 | 5 | 5 | --- |
| 50 | ∗ | 5 | 5 | 5 | --- |
| SUM OF POINTS IN COLUMN DIRECTION | | 425 | 405 | 385 | --- |
| | | 42 | 40 | 38 | --- |
| ALL-INCLUSIVE GRADE OF ACHIEVEMENT | | | | | --- |

WARNING

↓ MODEM/ON-LINE

| | RANKING NO.43 NAKAMURA | RANKING NO.49 TANAKA | RANKING NO.50 MITA | GRADE OF ACHIEVEMENT | | STANDARD OBJECTIVE | | SECTIONAL OBJECTIVE | |
|---|---|---|---|---|---|---|---|---|---|
| | | | | TOTAL POINTS | AVERAGE VALUE | OBJECTIVE | WARNING | OBJECTIVE | WARNING |
| --- | 10 | 5 | 0 | 475 | 9.5 | ●10 | ↕ | ▲5 | |
| --- | 10 | 10 | 10 | 500 | 10.0 | ●10 | | ●:0 | |
| --- | 10 | 5 | 5 | 425 | 8.5 | ●10 | ↕ | ●10 | |
| --- | 10 | 5 | 0 | 450 | 9.0 | ●10 | ↕ | ●:0 | |
| --- | 5 | 5 | 0 | 50 | 1.0 | 0 | | ×0 | |
| --- | 5 | 5 | 0 | 450 | 9.0 | ●10 | ↕ | ●10 | ↕← |
| --- | 5 | 5 | 0 | 325 | 6.5 | ▲5 | | ×0 | |
| --- | 5 | 5 | 0 | 375 | 7.5 | ▲5 | | ▲5 | |
| --- | 5 | 5 | 5 | 425 | 8.5 | ●:0 | ↕ | ●:0 | ↕← |
| --- | 10 | 5 | 5 | 495 | 9.5 | ●:0 | ↕ | ▲0 | |
| --- | 5 | 5 | 5 | 450 | 9.0 | ●:0 | | ▲5 | |
| --- | 5 | 5 | 5 | 450 | 9.0 | ▲5 | | ▲5 | |
| --- | 10 | 10 | 10 | 375 | 7.5 | ●10 | ↕ | ▲5 | |
| --- | 5 | 0 | 0 | 175 | 3.5 | ▲5 | | ▲5 | ↕← |
| --- | 0 | 0 | 0 | 25 | 0.5 | ×0 | | ×0 | |
| --- | 0 | 0 | 0 | 25 | 0.5 | ×0 | | ×0 | |
| --- | 395 | 305 | 105 | — | 300.5 | 370 | | 350 | |
| --- | 35 | 30 | 10 | | 30 | 37 | | 35 | |
| --- | ! | ! | !! | — — | ! | | | | |

Fig.26A

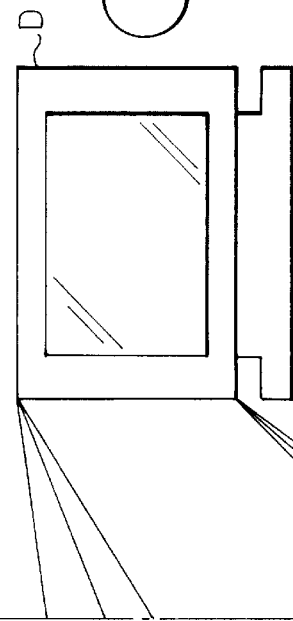

ANALYSIS OF SPECIFIC MATTER (APPARATUS)

FACTORS RELATED TO LOW GRADE OF ACHIEVEMENT

AVERAGE VALUE FOR ALL THE TRAINEES REACHES NEITHER VALUE OF STANDARD OBJECTIVE NOR VALUE OF SECTIONAL OBJECTIVE

REVIEW OF EDUCATIONAL LECTURE, CONTENT OF OJT, OJT TECHNIQUE, AND ESTABLISHED OBJECTIVE

→ FOLLOWING MEASURE

- REVIEW OF METHOD OF INSTRUCTING FIELD TRAINERS
- REVIEW OF IMPORTANT POINT ABOUT CURRENT EDUCATION OF CE
- ESTABLISHMENT OF SECTIONAL EDUCATION AND FOLLOW-UP EDUCATION
- JOB ROTATION OF CENTER CE FOR OBTAINING VARIOUS EXPERIENCES RELATED TO ACTUAL SERVICES
- PROVIDING OPPORTUNITY FOR FIELD EXPERIENCE (EXPERIENTIAL LEARNING)
- REINFORCEMENT OF RECIPROCAL CONNECTION WITH OTHER COMPANIES/SECTIONS
- REVIEW OF ESTABLISHED OBJECTIVE (TIME/OBJECT)

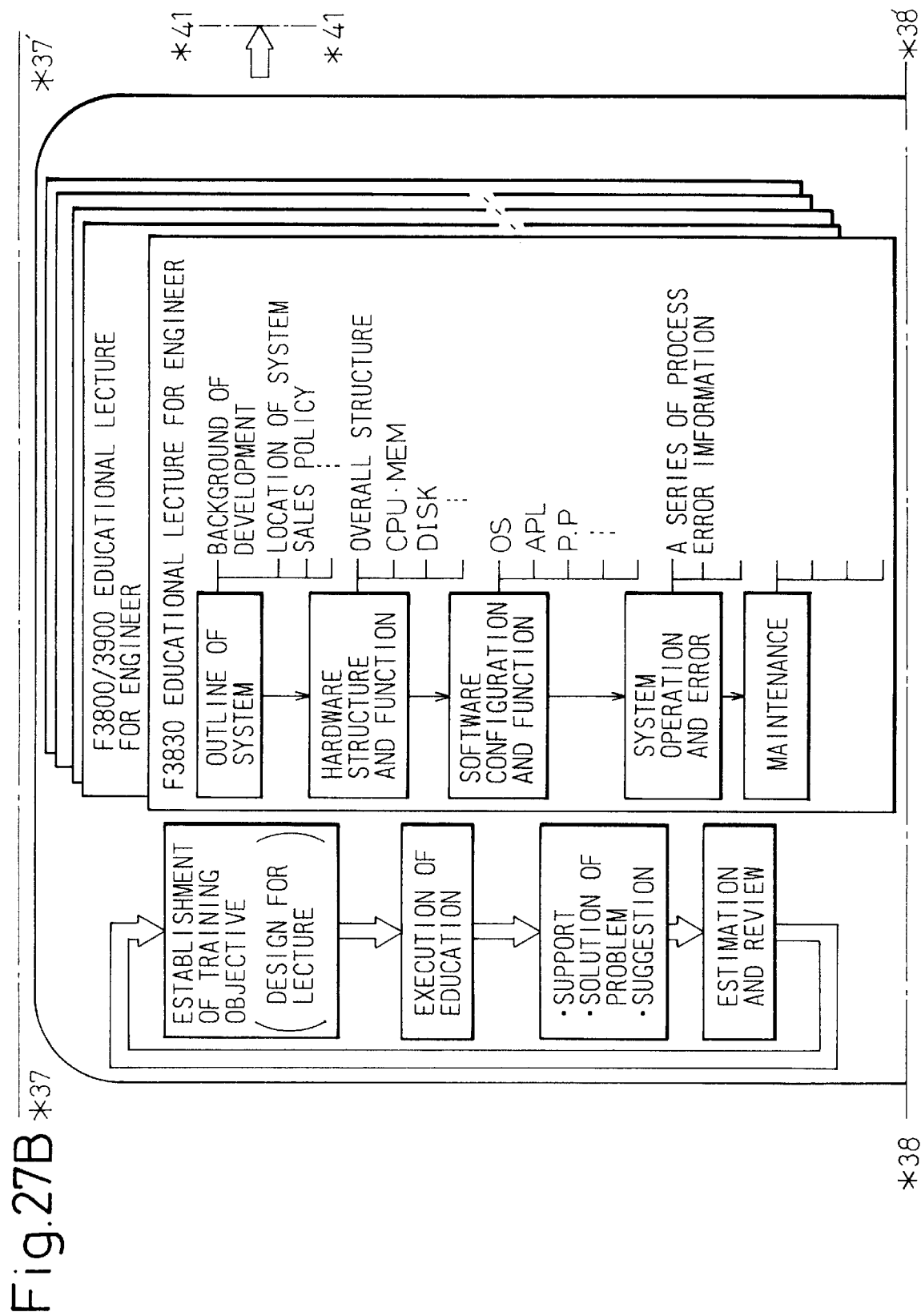

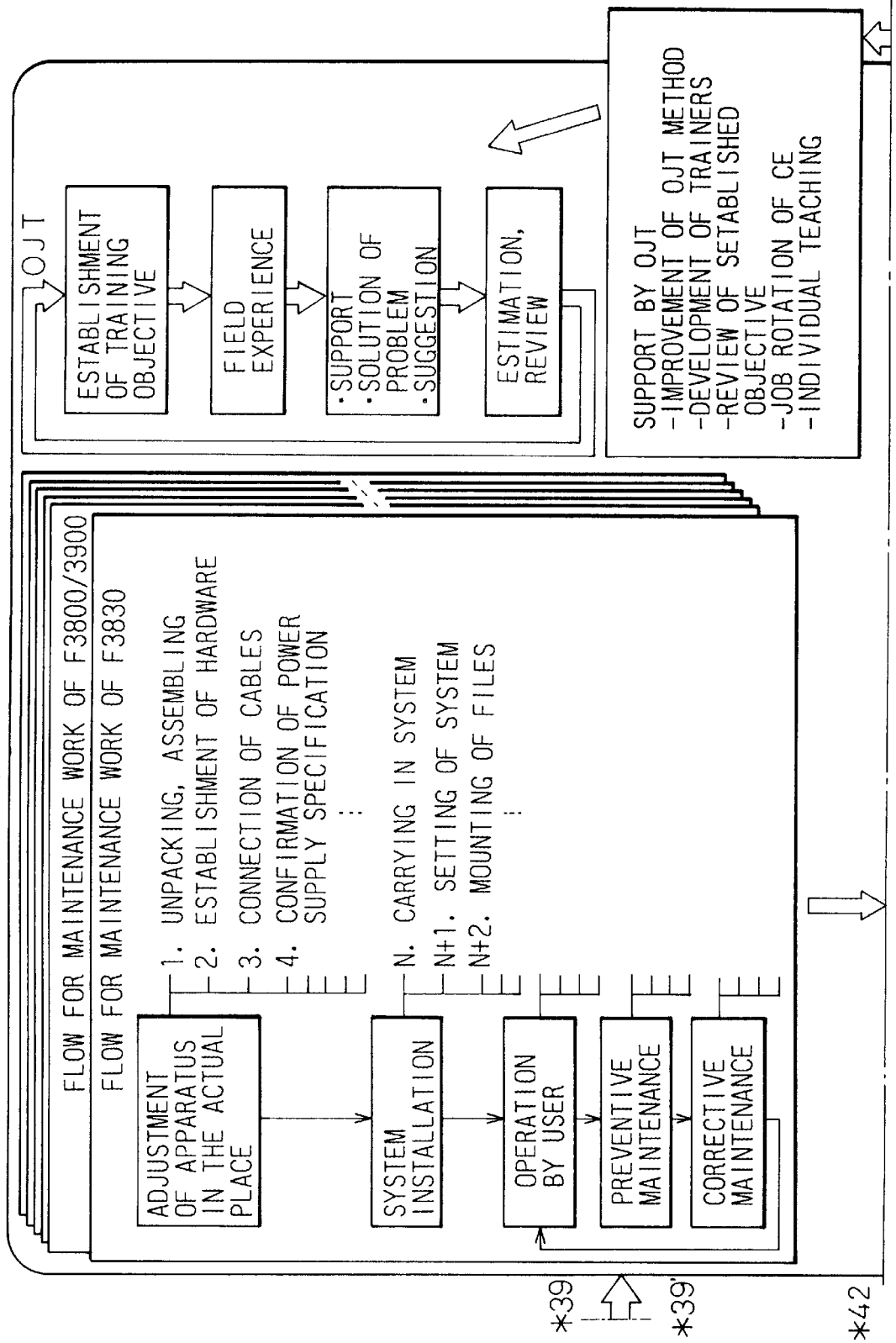

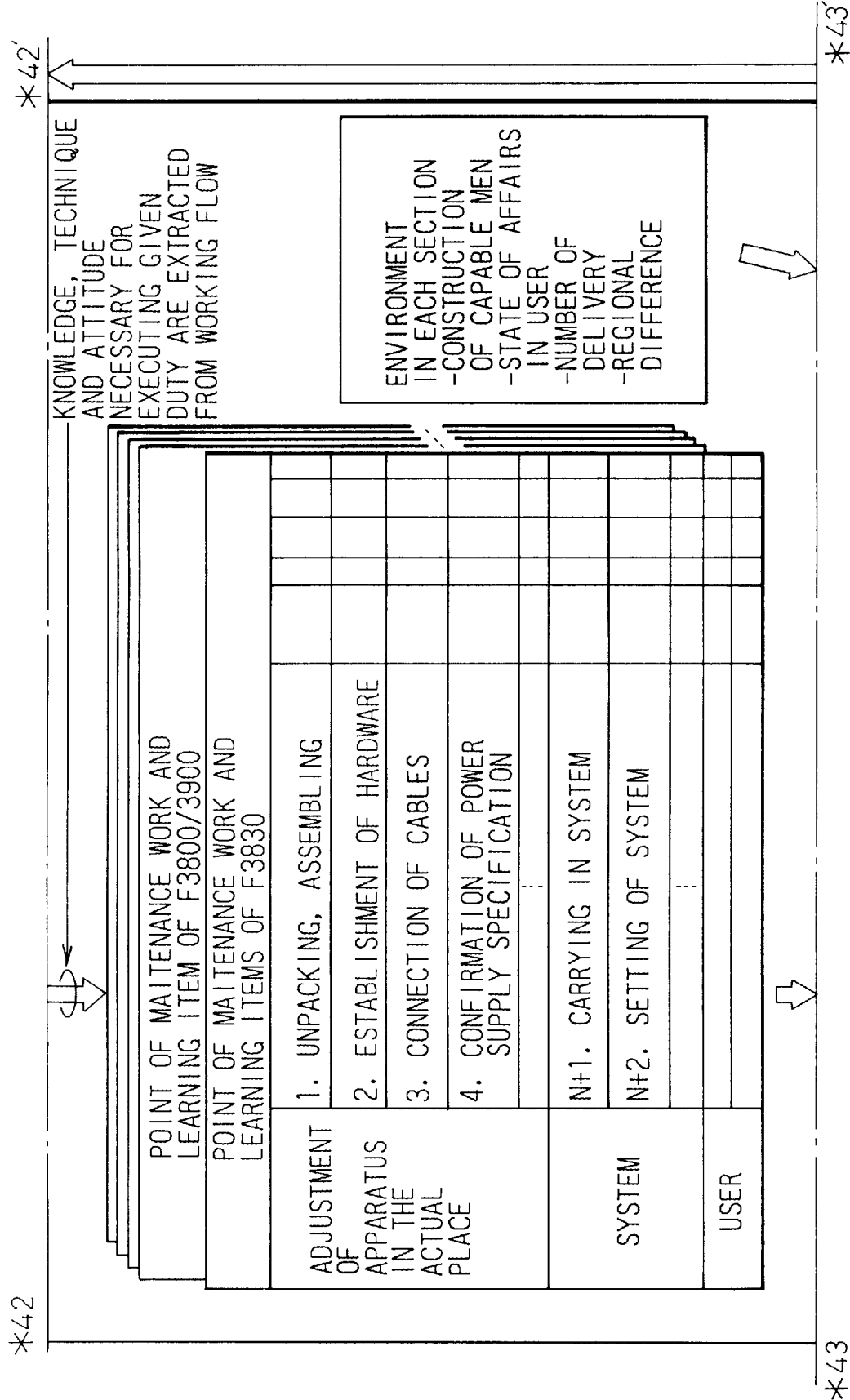

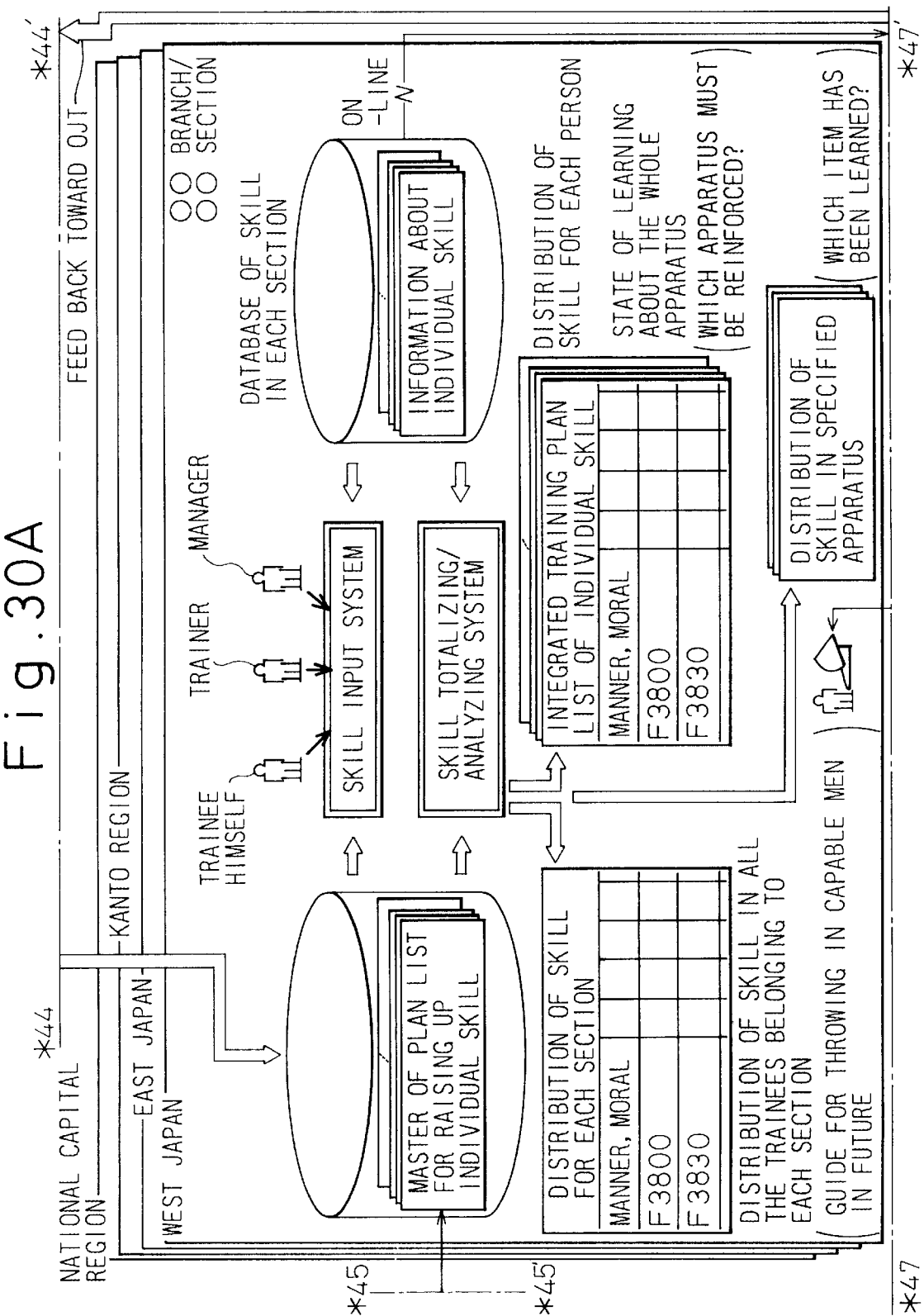

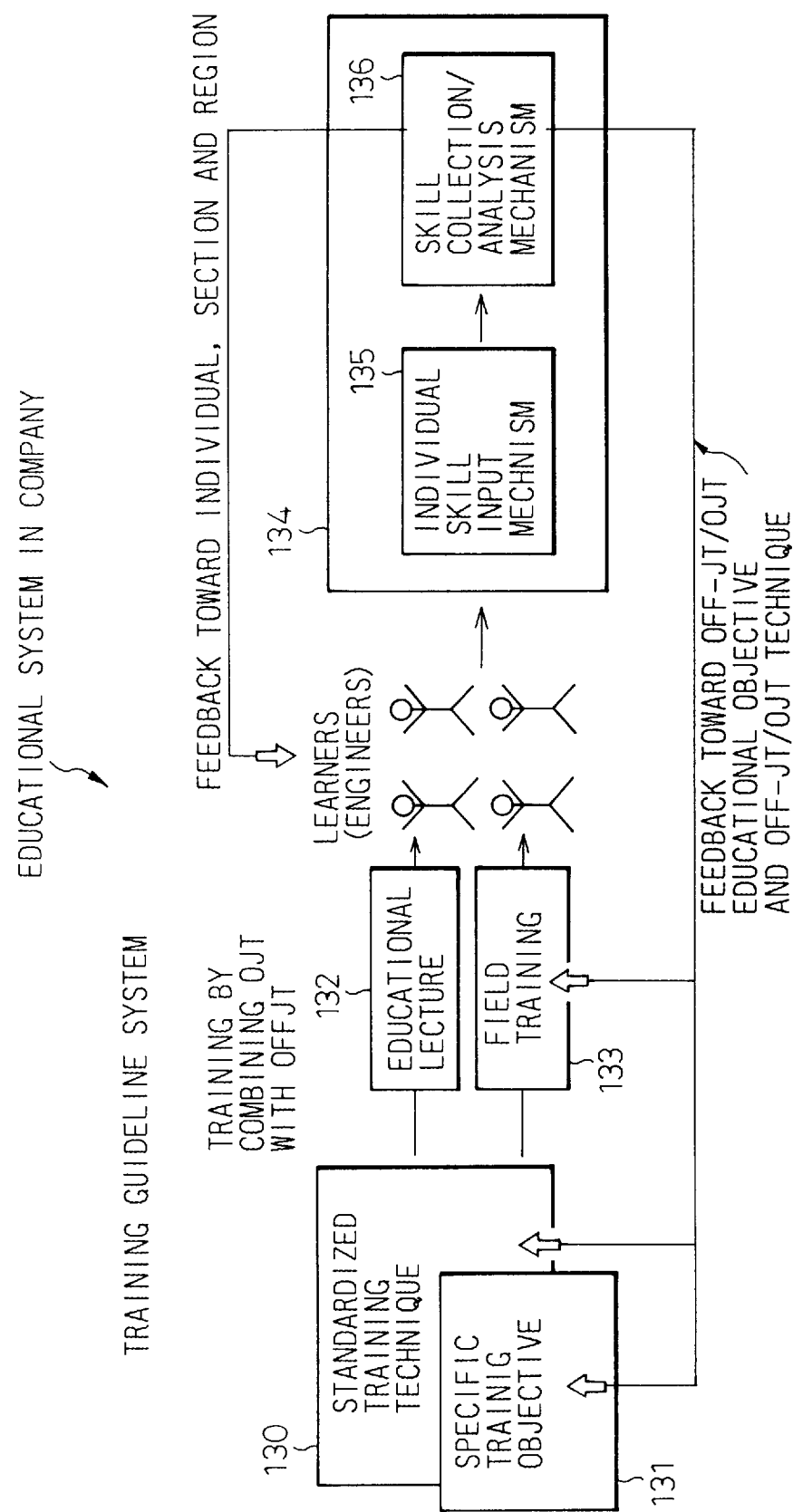

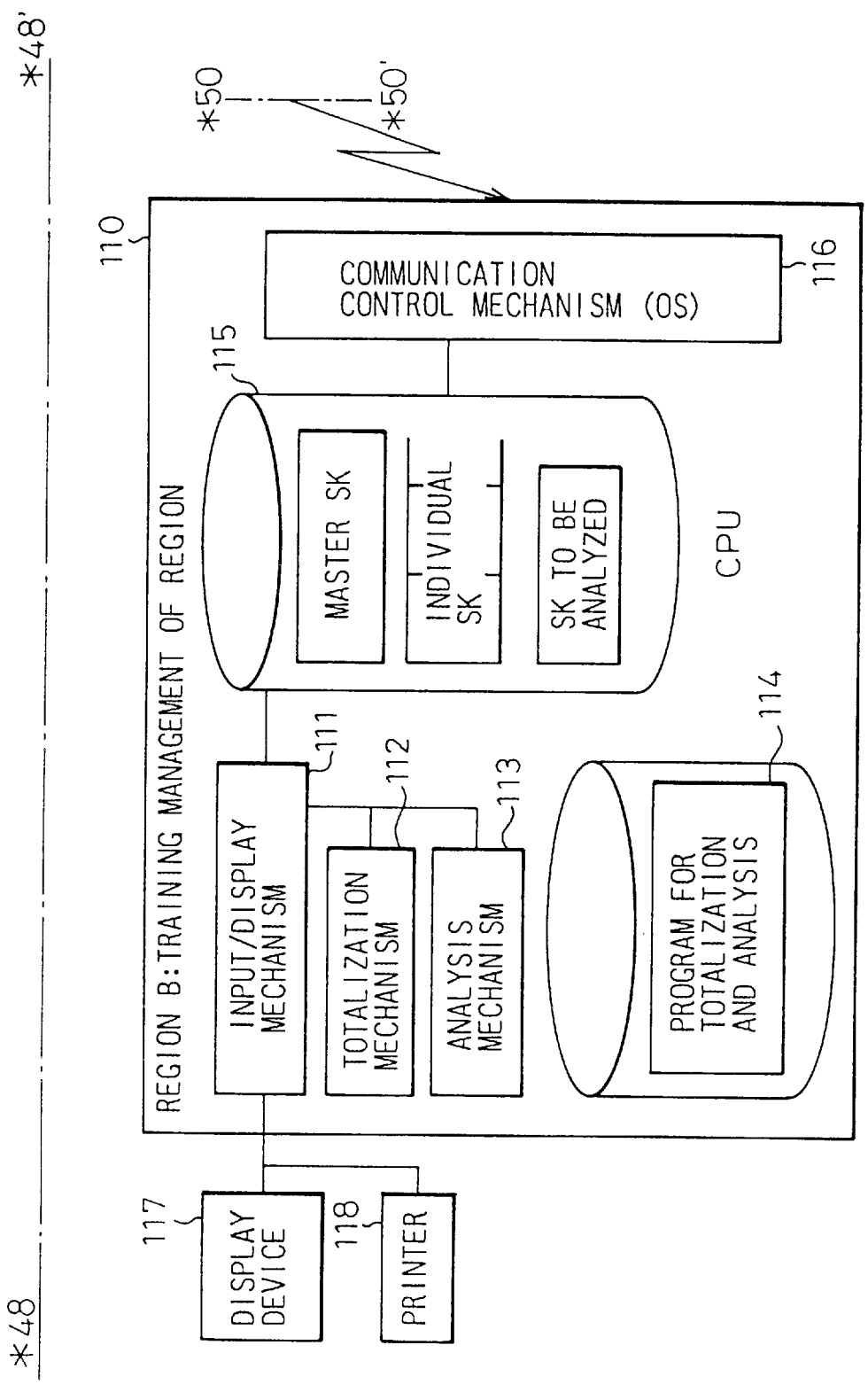

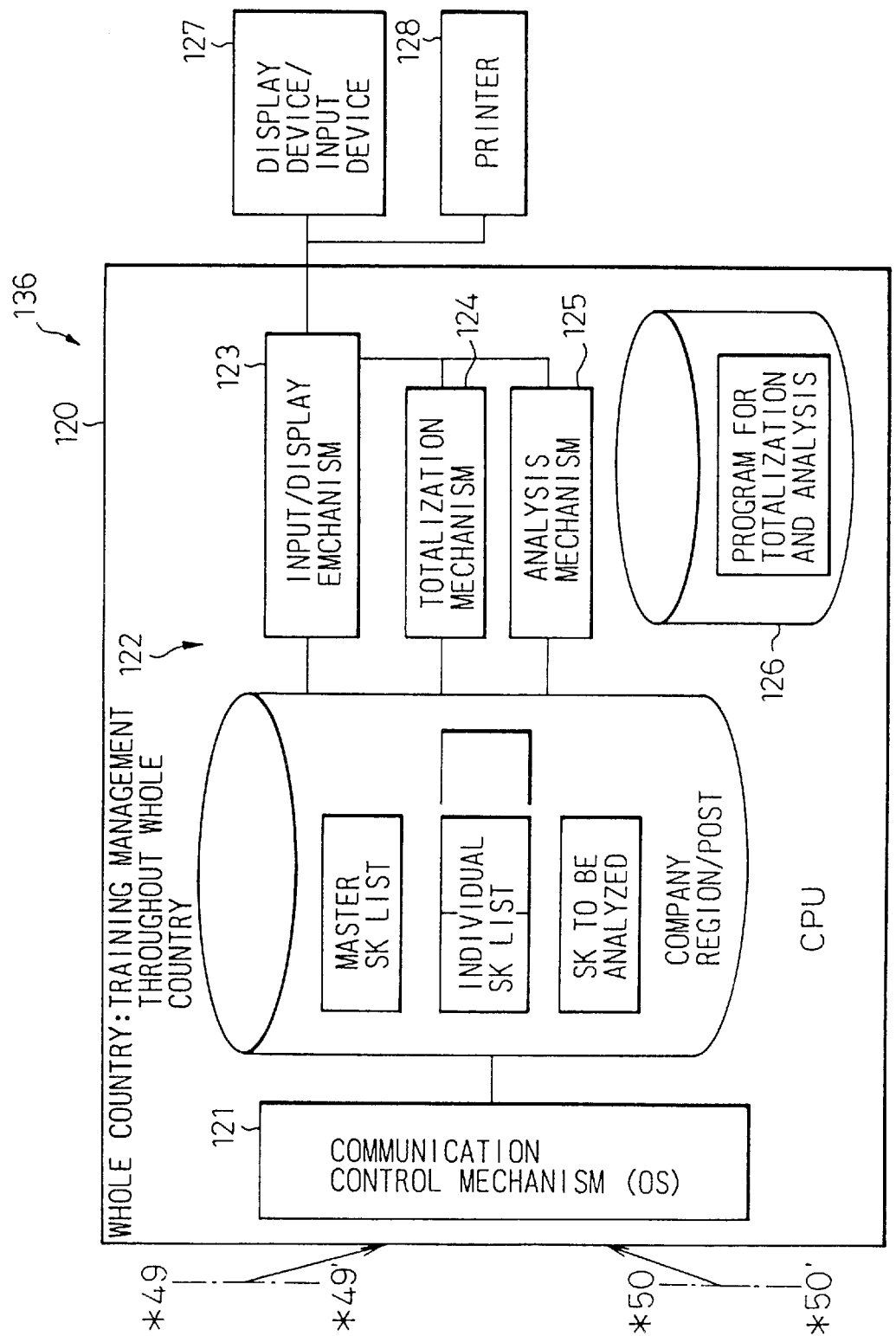

SYSTEM FOR CARRYING OUT EDUCATIONAL MANAGEMENT

BACKGROUND OF THE INVENTION

1. Field of the Invention

The present invention relates to an educational management system which is carried out in order to manage the education or training of a plurality of students or trainees in a company. More particularly, the present invention relates to an educational management system which standardizes the design of a training plan for trainees such as computer maintenance engineers or customer engineers (generally abbreviated to "CE"), lecture design as well as lecture operation, and carries out management/analysis of skill information of students inclusive of the trainees described above.

2. Description of the Related Art

Training of personnel through in-company education has been regarded in the past as an essential matter for the success of a company. Nonetheless, the principle of planning, lecture design and lecture presentation relating to training of personnel in a company has been extremely ambiguous and indefinite until present, and stereotyped lectures are likely to be held without definite plan in some cases.

Generally, means for training field trainees such as CEs in a company includes OFF-JT (Off the Job Training) which puts much importance on the theory other than the field and OJT (On the Job Training) which is educational training through business practices in the field. The above-mentioned OFF-JT mainly educates the principle, systems, etc, and lecture design from the standpoint of field workers is likely to be treated lightly. In the case of OJT, on the other hand, the field side is likely to put too much importance to the practical work, so that education tends to be conducted on the basis of experiences and intuition of the field side.

Since the mutual continuity of two kinds of training, that is, OFF-JT and OJT, has not been considered according to the prior art, satisfactory results cannot be obtained as expected in comparison with the investment in training.

The existing state of conventional educational in-company training which has been primarily carried out by mutually isolated OFF-JT and OJT, and associated problems will be summarized in the following eleven items [(1) to (11)]. Hereinafter, each of these problems will be explained in detail.

(1) Ambiguous whole image of training

A large number of lectures are likely to be held without definite planning while the whole image as to "what skill is to be raised to which level by what time", which is essentially necessary for training of personnel, by considering the present status of training and its future is left ambigous and indefinite. Employers who send trainees such as CEs are likely to lack the whole image of training of personnel.

Design of individual lectures and establishment, and learning should be carried out on the basis of the basic principle by first describing the originally "ideal state" and not defining the lectures first.

(2) Training plan without skill analysis

Grasping of a skill distribution by analyzing the skill of one's own company and own department or the skill of other companies or other departments so as to know which fields are weak and for which training must be made is an essential point which governs company strategy in the aspect of man-power commitment. However, such skill analysis is not carrier out and only vague grasping of the state is made after all.

When a training plan is made out, collection and analysis of digital information are much more necessary, and future policy should be planned always by grasping the skill status and weak points of one's own department and comparing them with the training state of other departments.

(3) Isolated OJT and OFF-JT

At present, requirements of the field side (actual works are taken into serious consideration) and conception of the training side (cultivation of fundamental skill and application skill) do not exist on the common stage, and OJT and OFF-JT are isolated from each other. Therefore, each department or each place executes the same training and shares the same problem. As a result, the expenses for training tend to increase.

From the aspect of the trainees, each of OJT and OFF-JT is nothing but one training means. Both the field side and the training side should recognize this fact and should execute training of personnel under the common objective.

(4) Lecture design having fall-off or insufficiency

Needless to say, learning of the theory and system is very important when training is carried out. However, it sometimes happens that the theory is ahead, and a situation whereby "trainees cannot execute the actual works, though they sufficiently understand the theory" is likely to arise. Lecture design in which the theory" is ahead and which is not based on the actual works always involve fall-off in some way or other. School education may be carried out on the premise that education will be useful someday, but the fall-off described above is not permissible in the case of educational training in a company.

Accordingly, lecture design should not be on the concept that a lecture exists first but should be made by laying stress on the point of the flow of the works such as "how the works flow, what items exist and what technique and theory are necessary for the execution of this work".

(5) Indefinite roles of OJT and OFF-JT

Once any trouble occurs, the field side and the training side are likely to blame one another that training is not good or the field side is to be blamed. Generally speaking, it is not possible to let trainees learn all the educational items by OJT or OFF-JT.

In training of personnel, there are educational items which essentially require field experience and those which should be thought over on the field side. It is therefore necessary to first clarify which are to be born by OJT and OFF-JT, and to train personnel through cooperation of both.

(6) Lecture design by experience and intuition

At present, the means of lecture design is indefinite for both of OJT and OFF-JT and is not standardized. Accordingly, lecture design is made out in most cases on the basis of the experience and intuition by instructors and field trainers per se.

In order to clarify the technique for lecture design relating to OJT and OFF-JT, predetermined design means must be standardized in advance without relying on the skill of individuals so that everyone can participate in lecture design.

(7) Given education or training

The motto "learn by yourself" is easy to say, but training of the "learn by yourself" type is likely to become mere theory unless the objective of training is clarified in a comprehensible way.

To solve such a problem, it is necessary, in the lecture or OJT as the object, to clarify what should be learnt for what purpose, by what time, and to which level, and to enable the trainees "to always evaluate themselves" so that the trainees can well understand the objectives of the object lecture or OJT and can develop themselves.

(8) Untimely follow-up

Needless to say, the greatest effects can be obtained by effecting follow-up of the trainees at the time of training. In most cases, however, the grade of achievement is obtained through questionnaires after the training is finished.

Accordingly, the status of achievement of the trainees during the lecture period, that is, the points to be followed, must be kept distinct at all times before the lecture is finished.

(9) Invisible improvement

Evaluation of the lecture should be made in terms of the "grade of achievement" of the trainees. If this evaluation is made merely through questionnaires which rely on the feeling of the trainees to the effect that the lecture is "good/bad, well satisfied/not satisfied, could understand about ** %", the points which should be improved originally cannot be grasped.

The improvement in the true meaning of the word cannot be obtained unless the lecture evaluation is made definitely, but not abstractly, such as "which points cannot be learned by how many trainees for what reasons".

(10) Training without recognition of weak points of trainees

To educate or train students or trainees, it is first important to know the weak points. The trainer must recognize in which portions the trainees are weak. The effects of education or training can be obtained only after the weak points of the trainees are followed, but not merely pointing out common things. On the other hand, the trainers must always recognize their own weak points in order to achieve self development.

The training side should clearly recognize the weak points of the trainees as well as those of their own and should then start training.

(11) OJT without training guideline

In the case of young trainees in general, the quality of OJT on the field side would greatly affect the formation of their character, but at present, training of the younger generation solely depends on the skill of the trainers in charge.

Accordingly, OJT based on the clear guideline representing "what is to be trained by OJT to which level by what time" is essentially indispensable, but not the mere premise that good training cultivate good trainees.

SUMMARY OF THE INVENTION

In view of the problems described in the items (1) to (11) listed above, the present invention is directed to provide an educational management system which clarifies the guideline of training personnel in-company without relying on the skill of individuals and which can train the trainees under the common objective of both OFF-JT and OJT as two kinds of educational means while allowing both the field side and the educational side to sufficiently consider mutual continuity of OFF-JT and OJT.

To accomplish the objectives described above, the educational management system for managing training of a plurality of trainees according to the present invention comprises a first processing device for managing a plurality of trainees, and a plurality of second processing devices as a device for the trainee. Further, the first processing device includes objective reference defining means for defining an objective reference list by inputting the reference relating to objectives of achievement of a plurality of educational items; and communication means for delivering the objective reference list so defined and an educational item list consisting of a plurality of the educational items to a plurality of the second processing devices. Each of the second processing devices includes an educational plan list defining means for defining an educational plan list consisting of each educational item and an objective of achievement corresponding to each educational item, by displaying the objective reference list and the educational item list and inputting the objective of achievement of each educational item.

Alternatively, the system of the present invention includes working list defining means for defining a working list by inputting each working item in a series of works; and educational item list defining means for defining an educational item list by displaying the working list defined by the working list defining means and selecting an item to be learned among the working items of the working list so displayed.

Preferably, in the educational system for managing education relating to a plurality of apparatus, the working list described above is defined for each apparatus and the educational item list is made out.

Further preferably, training by OJT or training by OFF-JT is designated as given educational items to be learned among the items, which are selected by the educational item listed defining means.

Further preferably, the educational plan list defining means described above includes means for inputting the grade of achievement by a plurality of trainees and trainers for each educational item of the educational plan list; and means for making out an integrated training plan list, for analyzing the grade of achievement on the basis of the grade of achievement input by the trainees and the trainers and the objective of achievement of the educational plan list, and outputting an integrated training list as the result of analysis.

Preferably, each of the second processing devices described above includes means for inputting the grade of achievement for each educational item of the educational plan list; and communication means for delivering the grade of achievement so input and the objective of achievement of the educational list to the first processing device. The first processing device includes analysis means for each educational item, for analyzing each educational item on the basis of each objective of achievement and the grade of achievement received from the communication means to the first processing means.

Preferably, the second processing device described above includes means for inputting the grade of achievement for each educational item of the educational plan list; and communication means for delivering the grade of achievement so input, the objective of achievement of the educational plan list, and the section of the trainees, to the first processing device. The first processing device includes analysis means for each section, for making analysis for each section, on the basis of the objective of achievement and the grade of achievement received from the communication means to the first processing device.

Preferably, in an educational system for managing education relating to a plurality of apparatus, each educational item of the educational plan list is classified for each apparatus, and the means for making out the integrated training plan list makes analysis of the grade of achievement of the objective of achievement of the educational plan list for each apparatus.

Preferably, the grade of achievement of the objective of achievement of the educational item list is displayed by using achievement levels of a plurality of stages.

Preferably, the grade of achievement of the objective of achievement of the educational plan list is displayed on the basis of analyzed information for each educational item obtained by the analysis means for each educational item.

The grade of achievement of the objective of achievement of the educational plan list is displayed on the basis of analyzed information for each section obtained by the analysis means for each section.

In the educational management system according to the present invention, the whole image of training of personnel (i.e., capable men) is first defined in the first processing device in order to concentratedly manage the second processing devices in each branch throughout the whole country or in each section. The objective reference list, the educational item list and the working list are made out by inputting the reference relating to the objective of achievement of a plurality of educational items on the basis of the whole image of training of personnel. Further, these objective reference list, educational item list, etc., are offered to the second processing devices in each branch throughout the whole country or in each section as the standardized guideline. Accordingly, the guideline of training personnel in-company can be made clear in each branch throughout the whole country or in each section without relying on the skill of individuals.

In the educational management system according to the present invention described above, the whole image of training personnel is defined in advance and the reference relating to the objective of achievement of a plurality of educational items is established on the basis of this whole image. Accordingly, each company throughout the whole country or each section can determine the objective of achievement of the educational items of their own on the basis of this reference. Since each company throughout the whole country or each section can clearly understand which level can be reached by what time, the guideline for training personnel can be made clear without relying on the skill of individuals.

BRIEF DESCRIPTION OF THE DRAWINGS

The above objects and features of the present invention will be more apparent from the following description of the preferred embodiments with reference to the accompanying drawings, wherein:

FIGS. 1A, 1B, 2A, 2B, 3A and 3B are block diagrams of an embodiment based on the basic principle of the present invention;

FIGS. 4A, 4B and 5 are flowcharts useful for explaining the operation of objective reference defining means in an embodiment of the present invention;

FIGS. 6, 7A and 7B are flowcharts useful for explaining the operation of working list defining means in an embodiment of the present invention;

FIGS. 8A, 8B, 9A and 9B are flowcharts useful for explaining the operation of educational item list defining means in an embodiment of the present invention;

FIGS. 15, 16A, 16B, 17 and 18 are flowcharts useful for explaining the operation of analysis means for each section in an embodiment of the present invention;

FIGS. 19, 20A, 20B, 21A, 21B and 22 are flowcharts useful for explaining the operation of analysis means for each educational item in an embodiment of the present invention;

FIGS. 23, 24, 25A, 25B, 26A and 26B are drawings showing application examples of analysis information in an embodiment of the present invention;

FIGS. 27A, 27B, 28A, 28B, 28C, 29, 30A and 30B are drawings showing the correlationship of functional portions in an embodiment of the educational system in company according to the present invention;

FIG. 31 is a block diagram showing an example of the educational system in-company to which the present invention is applied; and FIGS. 32A, 32B and 33 are block diagrams showing the detail of the skill analysis system shown in FIG. 31.

DESCRIPTION OF THE PREFERRED EMBODIMENTS

Figure 3B:
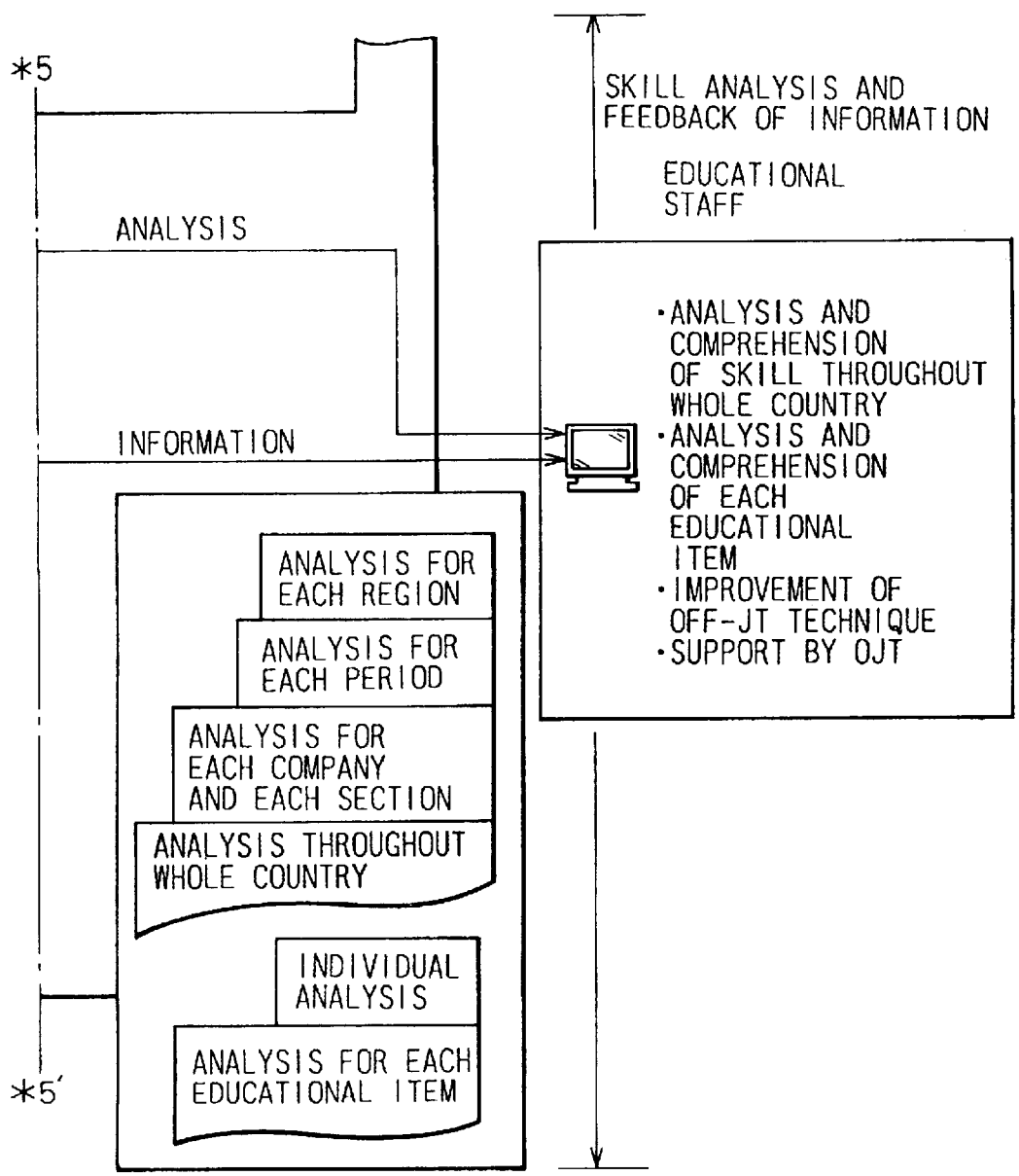

In summary, the system for carrying out educational management for a plurality of students according to the present invention has a first processing device for managing a plurality of students and a plurality of second processing devices as a processing device for the student. The first processing device includes an objective reference defining means for defining an objective reference list by inputting the reference of objectives of achievement of a plurality of educational items; and a communication means for delivering the objective reference list and an education item list to the second processing device. Each of the second processing devices includes an educational plan list defining means for defining an educational plan list by displaying the objective reference list and the educational item list and inputting the objective of achievement of each educational list to obtain the educational plan list.

Hereinafter, the detailed description of preferred embodiments will be given with reference to the attached drawings.

FIGS. 1A to 3B are block diagrams showing an embodiment based on the basic principle of the present invention. More specifically, FIGS. 1A and 1B show portions necessary for making out the basic specification of the educational items for trainees, FIGS. 2A and 2B show portions for inputting skill data and for applying analysis data based on the basic specification shown in FIGS. 1A and 1B, and FIGS. 3A and 3B show portions necessary for skill analysis and information feedback on the basis of the skill data and the analysis data shown in FIGS. 2A and 2B.

In order to solve the aforementioned problems, the educational management system according to the present invention includes a first processing device 1 and a plurality of second processing devices (for example, second processing device for each branch or for each section) as the processing devices for the trainees. Further, the first processing device 1 includes objective reference defining means 11 for defining an objective reference list 31 by inputting a skill specification 3 required for each duty, that is, a reference relating to the objective of achievement of a plurality of educational items; and communication means for communicating with a plurality of second processing devices 2 by a communication line to deliver the objective reference list 31 defined by the objective reference defining means 11 and an educational item list 34 consisting of a plurality of education items (communication means 14 for communicating with the second processing devices shown in FIG. 1A). The second processing device 2 includes means for making out an integrated training plan list comprising each educational item and an achievement objective corresponding to each educational item, by displaying the objective reference list 31 and the educational item list 34 and inputting the achievement objective of each educational item.

More preferably, the first processing device 1 shown in FIG. 1A is equipped with working list defining means 12 for inputting each duty item for each system, that is, each duty item in a series of duties, and making out the working list 32. Furthermore, the first processing device 1 is equipped with educational item list defining means 13 for defining an educational item list 34 by displaying the working list 32 defined by the working list defining means 12 and selecting the item to be educated among the working items in the working list 32 so displayed.

Further preferably, in the educational system for managing the education involving a plurality of educational equipment, the present invention makes out the working list 32 for each equipment and also makes out the educational item list 34 described above.

Further preferably, the educational management system of the present invention is so constituted as to designate and select whether the item to be educated, which is selected by the educational item list defining means 13, is to be educated by OJT or OFF-JT.

In this case, as shown in FIG. 1B, the roles of OFF-JT and OJT are clearly distinguished by defining in advance the objective reference, work execution know-how and the OJT/OFF-JT distinction by the cooperation of the educational staff and the field staff, without isolating the education by OJT and the education by OFF-JT.

Further preferably, the integrated training plan list defining means in the second processing device 2 shown in FIGS. 2A and 2B includes means 25 for inputting grade of achievement, for inputting the grade of achievement by a plurality of trainees and trainers for each educational item of the educational plan list on the basis of the objective reference list 31, the working list 32 and the educational item list 34 transmitted from communication means 24 for communicating with the first processing device; and means 26 for making out an integrated training plan list for outputting an integrated training plan list 46 as the result of analysis by analyzing the grade of achievement on the basis of the grades of achievement input by the trainees and the trainers described above.

In this case, the means 25 for inputting the grade of achievement takes into consideration the given environment, the grade of achievement of the individual trainee and evaluation of the trainer in addition to each educational item of the educational plan list when the grade of achievement is input to the educational item list 34.

Further preferably, the educational management system according to the present invention includes, in the second processing device 2 shown in FIG. 2B, the means 25 for inputting the grade of achievement for each educational item of the educational plan list, and means (communication means 24' for communicating with the first processing means in FIG. 2B) for delivering the input grade of achievement and the objective reference of the educational plan list to the first processing device 1. Furthermore, the educational management system according to the present invention includes, in the first processing device 1 shown in FIGS. 3A and 3B, analysis means 18 for each educational item, for analyzing each educational item on the basis of each objective reference and the grade of achievement received from the communication means with the first processing device 1, via communication means 16 for communicating with the second processing device.

Further preferably, the educational management system according to the present invention includes, in the second processing device shown in FIG. 2B, the means 25 for inputting the grade of achievement for each educational item of the educational plan list; means (communication means 24' for communicating with the first processing device in FIG. 2B) for delivering the grade of achievement so input, the achievement objective of the educational plan list, and the section of the trainee, to the first processing device 1; and analysis means 17 for each section, for analyzing the section on the basis of each achievement objective of the educational plan list received from the communication means with the first processing device 1 and the grade of achievement, in the first processing device 1 shown in FIGS. 3A and 3B.

In this case, each achievement objective and the grade of achievement of the educational plan list received from the communication means 16 with the second processing device are once held in a database 36 of skills throughout whole country and are then input to analysis means 18 for each educational item and analysis means 17 for each section.

In the educational system for managing the education involving a plurality of equipment, the present invention preferably classifies each educational item of the educational plan list for each equipment and the means 26 (FIG. 2B) for making out the integrated training plan list analyzes the grade of achievement of the objective reference for each equipment.

Further preferably, in the educational management system according to the present invention, as shown in FIG. 3B, after the grade of achievement of the achievement objective of the educational plan list is analyzed by the analysis means 18 for each educational item and by the analysis means 17 for each section, it is displayed by using achievement levels of a plurality of stages so that the grade of achievement can be visibly grasped by the educational staff.

In the educational management system according to the present invention, the analyzed information for each educational item obtained by the analysis means 18 for each educational item and the analysis means 17 for each section from communication means 16' for communicating with the second processing device shown in FIG. 3A through a database retrieving unit 27 (FIG. 2B) is fed back to the field staff in charge of OJT so that the grade of achievement of the achievement objective of the educational plan list is displayed by using the achievement levels of a plurality of stages even in each branch of the whole country or in each section.

In order to concentratedly manage the second processing device 2 of each branch of the whole country or of each section in the educational management system according to the present invention, the whole image of the education of the trainees, that is, "the ideal state", to the effect that a trainee is desired to be, or must be, such a person, is first worked out in the first processing device 1. The references relating to the achievement objectives relating to a plurality of educational items are input on the basis of this "ideal state" so as to make out the objective reference list, the educational item list and the working list. These objective reference list, educational item list, etc, are offered as the standardized guideline to the second processing device 2 of each branch throughout the whole country and of each section through the communication line. Accordingly, the basic policy about development in the company can be made clear and definite in each branch or in each section without relying on the skill of the individuals.

Each second processing device inputs the achievement references of the educational items of its own company or own section with reference to the objective reference list, the educational item list and the working list transmitted thereto from the first processing device 1, and makes out the educational plan list comprising each educational item and the achievement reference corresponding to each educational item.

Furthermore, the integrated training plan list is made out and displayed as the result of analysis of the grade of achievement on the basis of the grades of achievement input by the trainees and the trainers of their own company or own section and the achievement objectives of the educational plan list.

The input grade of achievement, the achievement objectives and the section of the trainees so provided to this integrated training plan list are transmitted to the first processing device 1. The first processing device 1 analyzes each educational item and each section on the basis of each achievement objective and each grade of achievement of the educational plan list. The analysis information obtained as the result of this analysis is fed back to the field staff and the educational staff associated with each of a plurality of second processing devices and is displayed as such.

Because the OJT training and the OFF-JT training carried out by the field staff and the educational staff use the achievement objective of each educational item established on the basis of the basic policy of development to the effect that a trainee is desired to be, or must be, such a person, etc., obtained from the first processing device, as the reference, the roles of the OFF-JT training and the OJT training can be made clear and definite by the cooperation of the educational staff and the field staff without mutual isolation of OJT and OFF-JT.

Next, the advantages obtained by the educational management system according to the present invention will be explained for each person in charge.

First, the necessity for learning knowledge and skill and the clear objective of development can be given to learners inclusive of the trainees, and self-development can be made on the basis of recognition of their weak points.

Secondly, standardized guidelines but not generalities can be given to the field trainers as the leaders of OJT, and appropriate OJT on the basis of recognition of the weak points of the trainees (learners) can be accomplished.

In the third place, a manager group as general leaders is allowed to analyze skills of their own department and company, to make out the development plan on the basis of digital information relating to this skill analysis and to constitute a man power pyramid in future.

In the fourth place, the educational staff as the trainers of OFF-JT is able to accomplish the education capable of representing good results, reliable follow-up during the lecture period, a smooth handing over to OJT and lecture improvements capable of representing the improvement by evaluation.

As described above, the present invention designs in advance the whole image of training talents and establishes objective references relating to the achievement objectives of a plurality of educational items on the basis of this whole image. Accordingly, each branch throughout the country or each section can determine the achievement objects of the educational items of its own company or department on the basis of the references. For this reason, it is clear for each branch or each department or section to realize which level should, or can, be achieved by what time, without relying on the skill of individuals, and the guideline for development can be made clear and definite.

The results of analysis of the grades of achievement on the basis of the grade of achievement input by the trainees and the trainers of own company or department and the achievement objective of the educational plan list are fed back to the field side as well as to the educational side. In this way, two kinds of educational methods, that is, OFF-JT and OJT, can be mutually linked, and high quality development of talents can be carried out under the common objective.

Hereinafter, the embodiment of the present invention will be explained in further detail with reference to the accompanying drawings (FIGS. 4A to 33). Here, skill analysis for computer service engineers (customer engineers for computers: CEs) and the system of the integrated training plan will be explained as a typical example.

FIGS. 4A and 4B are flowcharts useful for explaining the operation of the objective reference defining means in the embodiment of the present invention. The aforementioned objective reference defining means 11 shown in FIG. 1A preferably comprises a CPU (Central Processing Unit) of a computer, or the like. Hereinafter, like reference numerals will be used to identify like constituents already described.

A series of operations of the objective reference defining means 11 will be explained with reference to the flowcharts of FIGS. 4A to 5. First of all, a specified duty is extracted from among a plurality of duties 30 at step S11.

Next, the pattern of the specified duty is compared with the patterns of past duty data held in a past duty database 40 at step S12. A required skill specification is established as a provisional specification on the basis of this comparison result (step S13).

Further, as shown in FIG. 4B, the skill specification once established is modified by referring to various conditions such as a peculiarity of the duty, the company concept, the principle of development, the maintenance environment, etc. (step S14). Thereafter, the objective reference of the specified duty, that is, the "ideal state" is established on the basis of this skill specification so modified (step S15). Further, whether or not any contradiction exists in this objective reference is checked (step S16), and when any contradiction is detected, the flow returns to step S14, where the skill specification is again modified. When no contradiction is judged as existing in the skill specification, the objective reference list of training is finally output and is stored in the database (step S17). The content of the objective reference list ("ideal state") relating to the maintenance engineering skill of a CE held in this database is tabulated in the following Table 1 and a part of the content is shown at the lower part of FIG. 5.

TABLE 1

Objective Reference List ("Ideal State")
Objective reference list (ex. Customer Engineer for Computers)

| first year of entrance | | second year of entrance | third year of entrance |
|---|---|---|---|
| [A] | | [B] | [C] | [D] |
| [E] | [F] | ☐ [G] | ☐ [H] | ☐ [I] |
| | | ☐ [J] | ☐ [K] | ☐ [L] |
| | | ☐ - - - | ☐ - - - | ☐ - - - |

Numerals [A] to [L] in the Table 1 will be described as follows:

[A] conception;

[B] able to execute given duty under trainer's guidance;

[C] able to understand the content of duty and to completely accomplish given duty by himself;

[D] able to act under his own judgement and to guide the inexperienced;

[E] grade in maintenance technique;
[F] basic item;
[G] able to understand hardware structure of an apparatus in charge;
[H] able to exchange each hardware unit in an apparatus in charge;
[I] able to infer defective hardware component from a mode of trouble;
[J] able to understand a configuration of basic interface and the meaning of each signal;
[K] able to understand interface standard and to determine whether it is good or bad; and
[L] able to estimate associated defective apparatus from a mode of system trouble.

For reference, Tables 2 and 3 given below tabulate "ideal state" required for customer engineers for each year of enrollment in the company for a group of young CEs inclusive of manner, moral and behaviours, besides the maintenance engineering skill of computers.

TABLE 2

"Ideal State" of Younger CE Group
(Development Guideline No. 1)

CE first year (HOP) ⟶ CE second year (STEP)

↓ ability to execute duties under guidance with self-knowledge as a member of society and company ↓ ability to understand duties of CE and to completely execute given duties by himself Remarks)
[*consecutive to next year]
[main development means]□(A):OJT
□(B):CE education

T2

|   |   |   | final objective of first year |   | final objective of second year |   |
|---|---|---|---|---|---|---|
| ⑥ | ⑨ |   | □(C) | ⑩ | □(A) | ㉒ |
|   |   |   | □(C) | ⑪ | *□(C) | ㉓ |
|   |   |   | □(C) | ⑫ | *□(C) | ㉔ |
|   |   |   | □(C) | ⑬ | □(C) | ㉕ |
|   |   |   | □(C) | ⑭ | □(C) | ㉖ |
|   |   |   | □(C) | ⑮ | *□(C) | ㉗ |
|   |   |   | □(C) | ⑯ |   |   |
|   |   |   | □(C) | ⑰ |   |   |
|   |   |   | □(C) | ⑱ |   |   |
|   |   |   | □(C) | ⑲ |   |   |
|   |   |   | □(C) | ⑳ |   |   |
|   |   |   | □(C) | ㉑ |   |   |
| ⑦ | ㉘ |   | □(A) | ㉙ | □(A) | ㉝ |
|   |   |   | □(A) | ㉚ | □(A) | ㉞ |
|   |   |   | □(A) | ㉛ | □(A) | ㉟ |
|   |   |   | □(A) | ㉜ | □(A) | ㊱ |

TABLE 2-continued

"Ideal State" of Younger CE Group
(Development Guideline No. 1)

| | | | | | | |
|---|---|---|---|---|---|---|
| ⑧ | ㉗ | □(C) | ㊳ | □(C) | ㊵ | |
| | | □(C) | ㊴ | □(C) | ㊶ | |
| | ㊷ | □(C) | ㊸ | □(C) | ㊼ | |
| | | □(C) | ㊹ | □(C) | ㊽ | |
| | | □(C) | ㊺ | □(C) | ㊾ | |
| | | □(C) | ㊻ | □(C) | ㊿ | |
| | | | | □(C) | 51 | |

T2'

Numbers 6 to 51 in Table 2 will be described as follows:
⑥ manner and moral;
⑦ behavior;
⑧ maintenance technique;
⑨ basic item;
⑩ to outgrow school life and to have self-knowledge
⑪ hair style, clothes, etc., are suitable as member of society and businessman;
⑫ able to pay suitable respect and to exchange namecards with strangers;
⑬ nice in speech with seniors, superiors and users;
⑭ have sense of time and to keep appointments (10 minutes earlier) when coming to office or visiting users;
⑮ able to understand smoking and drinking manner at users' office;
⑯ able to correctly answer inquiries from seniors and superiors;
⑰ able to act with common sense in privacy inclusive of life in company's dormitory;
⑱ have desire for learning and to accept advice from trainers and seniors;
⑲ able to express himself straightforwardly (able to talk on everything inclusive of failures, tastes, etc.);
⑳ not to leave any ambiguity in conference or meeting;
㉑ able to put things in order;
㉒ have attitute of mind as second year staff (self-knowledge as the superior to freshmen);
㉓ understand social role of CE services and to understand that quality of CE service depends on the man who offers the service;
㉔ able to negotiate with colleagues in company/associated departments (to express his opinion and to converse with managers of other departments/branches);
㉕ able to express his own ideas/opinions with responsibility in conferences/meetings;
㉖ able to receive correct instruction of duties from superiors and managers and to report correct situation/completion of duties;
㉗ able to act while recognizing importance, social influences, specialty (security), etc., of a CE;
㉘ telephone conversation;
㉙ learn basic telephone manners such as to give company name, take memorandum, to confirm, not to have calling party wait, not to let calling party repeat the same story, etc.;
㉚ able to make appointment with users before visit;
㉛ understand basic manner when using user's telephone (time, place), etc.;
㉜ able to make simple conversation with user about models under training;
㉝ able to converse with user about models in charge;
㉞ able to accept call, to make primary diagnosis and to make periodic maintenance communication;
㉟ able to take measures by recognizing to certain extent whether or not the subject is important;
㊱ understand processing rules in company to cope with trouble call, claims, etc. (transfer to other companies in charge);
㊲ tool;
㊳ able to confirm approval/rejection of modem itself by using modem tester;
㊴ understand various RAS and test program systems under instruction;
㊵ able to measure ripple of power supply voltage by synchroscope and to make analog/digital waveform observation (including establishment of synchronization);
㊶ understand various RAS and test program systems under instruction;
㊷ field duties;
㊸ able to conduct unpackaging, appearance inspection, assembly, connection, installation, confirmation of power supply voltage under guidance of trainer/superior;
㊹ able to execute setting/installation and confirmation of operation under guidance of trainer/superior;
㊺ able to provide simple explanation of handling of apparatus under guidance of trainer/superior;
㊻ able to conduct auxiliary work of circuit opening work under guidance of trainer/superior;
㊼ able to execute preparation for field duties (duty instruction/setting number/preparation of tools, etc.);
㊽ able to execute unpacking, appearance inspection, assembly, connection, installation, confirmation of power supply voltage by himself;
㊾ able to execute setting/installation and operation confirmation test by himself;

50 able to provide simple explanation of handling of apparatus to user by himself; and 51 able to execute circuit opening work by himself.

TABLE 3

"Ideal State" of Young CE Group
(Development Guideline No. 2)

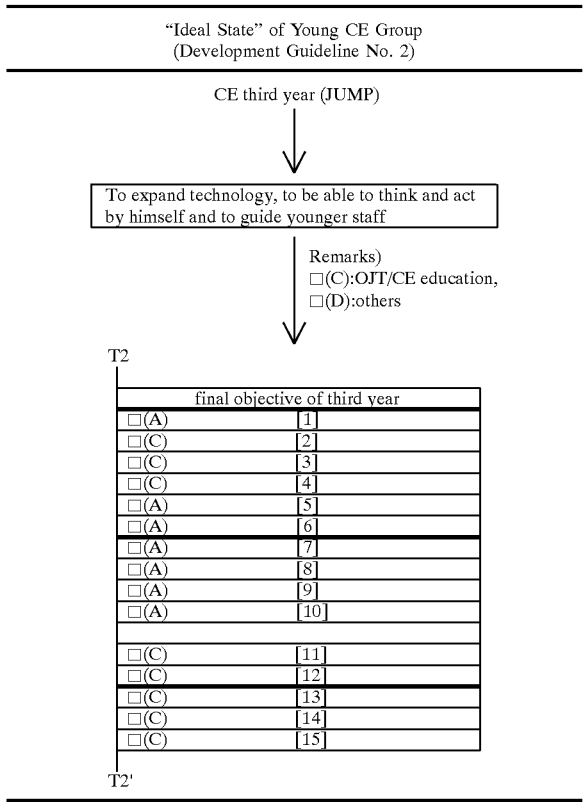

Numbers [1] to [15] in Table 3 will be described as follows:

[1] able to select clothes and to attend to users (greeting, attitude at user's office) as model to younger staff;

[2] understand social role of CE service and to know by himself that quality of service depends on the man who offers service;

[3] able to attend to staff in-company/departments (to be able to speak own opinion, to converse with managers of other departments/branches);

[4] able to guide younger staff (clothes, attendance to users) on the basis of experience in his first and second years;

[5] able to attend to customers with consciousness of service to improve customer's satisfaction;

[6] able to make correct situation report about complex trouble, system-down for long time, critical trouble, etc., to chief or manager;

[7] able to attend to a certain extent to inquiries for analogous models;

[8] make telephone contact with associated sections in company (SE, SA, FS, business divisions);

[9] able to report and make suitable situation report about telephones such as trouble calls, claims, etc., to chief and manager;

[10] able to attend to telephone when persons in charge are absent (to grasp content/subject, reply, etc.);

[11] able to segment defective portions of circuit failure by using earphone and synchroscope;

[12] able to utilize various RAS and test programs in accordance with troubles;

[13] able to become responsible person of installation and field duties in addition to field duties by himself (person capable of assuming leadership at the time of duties by a plurality of staff);

[14] able to conduct circuit opening work from preparation to on-line confirmation; and

[15] able to execute field adjustment of analogous models of learnt models by himself.

These Tables 2 and 3 clearly stipulate which level the CE must reach, and by what time, the CE must be reach the level, with the year of joining in the company as a guideline. Accordingly, Tables 2 and 3 can be used as an effective development guideline for CE training. Incidentally, the asterisk * in Table 2 represents items which continue to the next year, symbol (A) represents items associated with OJT, (B) represents items associated with OFF-JT CE training and (C) represents the matter associated with both of OJT and CE training.

Figure 6:
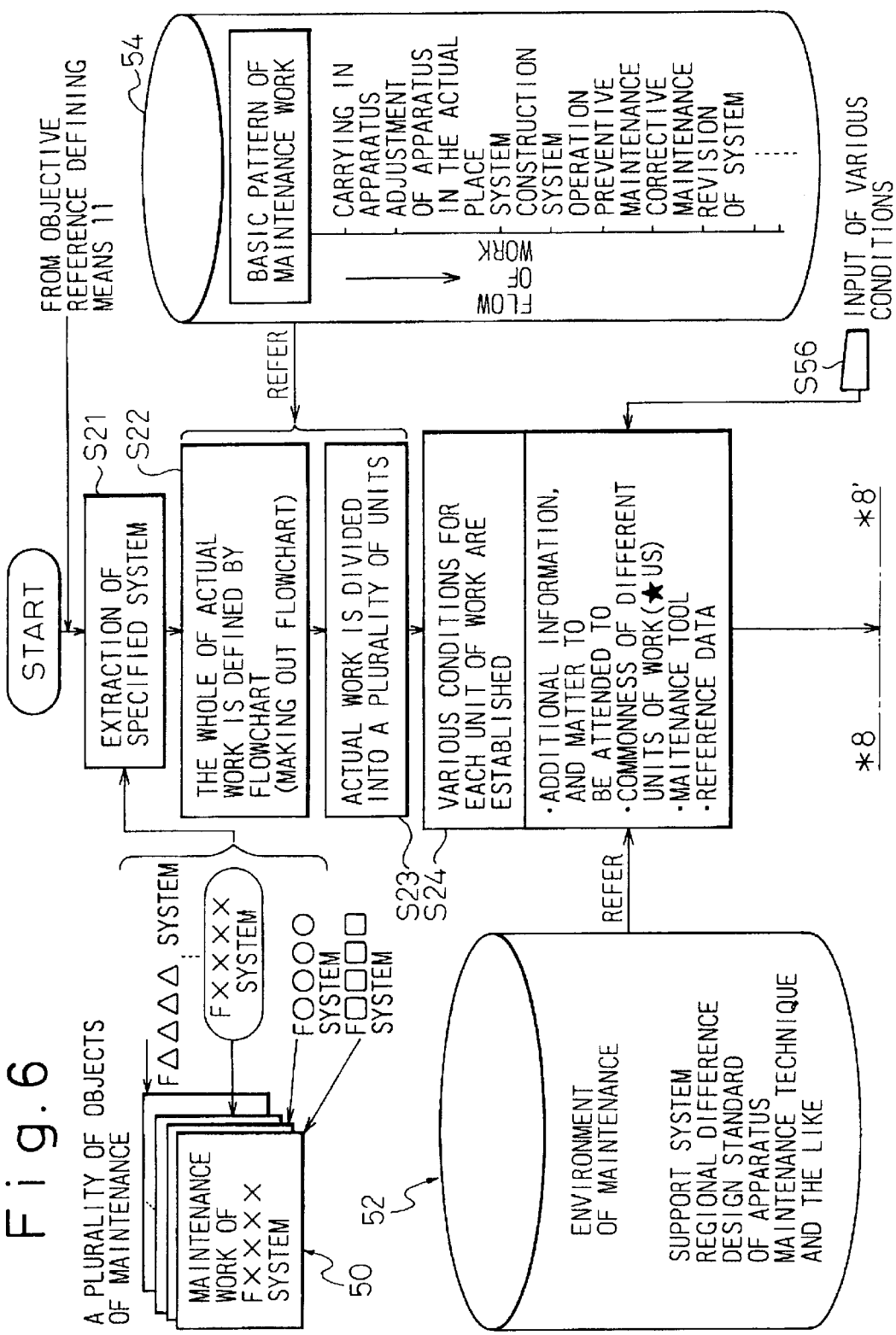

FIGS. 6, 7A and 7B are flowcharts useful for explaining the operation of the working list defining means of the embodiment described above. The working list defining means 12 shown in FIG. 1 preferably comprises a CPU (Central Processing Unit) of a computer, or the like.

A series of operations of the working list defining means 12 will be explained with reference to the flowcharts of FIGS. 6, 7A, and 7B. First, a specified working system relating to the target maintenance object is extracted from a plurality of maintenance objects (e.g. Maintenance work of an F3800 system) 50 on the basis of the objective reference list output from the objective reference defining means 11, at step S21 in FIG. 6.

At the next step S22, the whole of the actual work of the object system is defined by the flowchart. When this flowchart is made out, the work is divided and converted into units by referring to the basic pattern (the flow of work) of a series of the maintenance work system continuing such as carry-in of apparatus, adjustment of the apparatus at the actual place, system construction, system operation, and so forth (step S23).

At step S24, various conditions are set afresh for each unit of the divided work. These conditions include additional information of the maintenance work, matters to be attended to, commonness of different units of work (differences due to user specifications, numbers of edition of hardware/software, etc.), maintenance tools, reference data, and so forth. When the various conditions are set, reference is made to the environment 52 of maintenance such as support system, regional difference, design standard of apparatus, maintenance technique, etc., held in advance in the database, and various conditions which are believed appropriate can be input, too, by the manual operation of an input device 56 such as a keyboard.

At step S25 shown in FIG. 7B, the portion of "No." in the working list (point of maintenance work) shown in the following Table 4 is set as the link codes corresponding to the learning numbers of the educational item list (skill-up program list) in the following Table 5.

TABLE 4

Working List (Point of Maintenance Work)

```
                    Working list of F○○○○ system
a plurality of systems
                    Working list of FΔΔΔΔ system Working list of F×××× system
    ┌──────────┬────┬────┬────┬────┬─────┐
    │working   │ ⑥  │ US │ ⑦  │ ⑧  │ No. │
    │item      │    │    │    │    │     │
    ├──────────┼────┼────┼────┼────┼─────┤
    │    ①    │ ⑩  │ Δ  │ —  │ ⑪  │ —   │
    │    ②    │ ⑫  │ ◎  │ —  │ ⑬  │ 1   │
 9  │    ③    │ ⑭  │ ◎  │ —  │ ⑮  │ 2   │
    │    ④    │ ⑯  │ ◎  │ ⑰ │ ⑱  │ 3   │
    │    ⑤    │ ⑲  │ ○  │ ⑳ │ ㉑ │ 8, 9│
    └──────────┴────┴────┴────┴────┴─────┘
```

◎ :common to all hardware/OS
○ :different depending on edition number of OS
Δ :different depending on user's specification linking with learning item number of Table 5

Numbers ① to ⑳ in the Table 4 will be described as follows:

① confirmation of overhauled units and attached units, and visual inspection thereof;
② setting of control printed circuit board;
③ connection of battery and cables;
④ confirmation of power supply voltage;
⑤ system construction;
⑥ additional information and matters to be attached to;
⑦ maintenance tools;
⑧ reference data;
⑨ carry-in of apparatus and adjustment at site;
⑩ attached units include the following two units (Note that they may be different for each user)
VBR
FPD for setting system construction;
⑪ procedure list at actual place, p. 2 to 6;
⑫ setting in the actual includes following three points
setting of CPUID code
setting of memory capacity
setting of LAN interface specification;
⑬ procedure list at actual place, p. 17 to 30;
⑭ battery is used for backing up data in CPU-SRAM
SCS1 interface is connected in the sequence of ID1, ID3, ID2 and ID4;
⑮ educational text, p. 40 to 45 procedure list at actual place, p. 36 to 49;
⑯ confirmation of AC input voltage (±10%)
confirmation of DC output (±5%) of power supply panel;
⑰ digital tester;
⑱ procedure list at actual place, p. 43 to 45;
⑲ restoration from CRMT to DISK by VBR independent utility
mounting of option file;
⑳ VBR
system setting FPD; and
㉑ installation procedure list, p. 101 to 107.

TABLE 5

Educational Item List (Skill-up Program List)

a plurality of systems

Educational item list of FΔΔΔΔ system
Educational item list of F○○○○ system
Educational item list of F×××× system

| [1] | | [2] | [3] | | [4] | | [5] | | third | |
|---|---|---|---|---|---|---|---|---|---|---|
| | | | [6] | [7] | [8] | [9] | [10] | [11] | [12] | |
| | | [13] | [14] | [15] | [16] | [17] | [18] | [19] | [20] | [21] | [22] | [23] | [24] | [25] | [26] |

| [1] | | | [2] | [3] | | [4] | | [5] | | | third | | | | |
|---|---|---|---|---|---|---|---|---|---|---|---|---|---|---|---|
| | | | | [6] | [7] | [8] | [9] | [10] | [11] | [12] | | | | | |
| | | | [13] | [14] | [15] | [16] | [17] | [18] | [19] | [20] | [21] | [22] | [23] | [24] | [25] | [26] |
| [27] | 1 | ■[28] | ○ | ○ | ● | ● | ○ | ○ | ● | ● | ◎ | ◎ | ◎ | ◎ | ◎ | ◎ |
| | 2 | ■[29] | ○ | ○ | ● | ● | ○ | ○ | ● | ● | ◎ | ◎ | ◎ | ● | ◎ | ◎ |
| | 3 | ■[30] | ○ | ○ | ● | ▲ | ○ | ○ | ● | ● | ◎ | ◎ | ◎ | ● | ◎ | ◎ |
| | 4 | ■[31] | Δ | ○ | ▲ | ● | ○ | ○ | ● | ● | ◎ | ◎ | ◎ | ● | ◎ | ◎ |
| [32] | 5 | ■[33] | Δ | Δ | × | × | ○ | ○ | ▲ | × | ○ | ○ | ● | ● | ◎ | ○ |
| | 6 | □[34] | Δ | Δ | × | × | Δ | Δ | ● | ▲ | ○ | ○ | ● | ● | ○ | ○ |
| | 7 | ■[35] | Δ | ○ | ▲ | × | ○ | ○ | ▲ | ▲ | ◎ | ○ | ● | ▲ | ◎ | ◎ |
| [36] | 8 | ■[37] | Δ | Δ | × | × | ○ | ○ | ▲ | ▲ | ○ | ○ | ● | ● | ○ | ○ |
| | 9 | ■[38] | Δ | Δ | ▲ | × | Δ | Δ | ▲ | ▲ | ○ | ○ | ● | ● | ○ | ○ |
| | 10 | □[39] | Δ | Δ | ▲ | × | Δ | Δ | ● | ▲ | ○ | Δ | ● | ● | ○ | ○ |
| | 11 | ◇[40] | Δ | Δ | ▲ | ▲ | Δ | Δ | ▲ | × | ○ | ○ | ● | ▲ | ○ | ○ |

No. of Table 4 linking with

Note:
■: OFF − JT
□: OFF − JT + OJT
◇: OJT
Δ: executable under trainer's guidance
○: executable by himself
◎: able to guide the inexperienced TABLE 5-continued Educational Item List (Skill-up Program List)

x: unlearned
▲: executable under trainer's guidance
●: executable by himself

Numbers [1] to [43] in Table 5 will be described as follows:

[1] learning item;
[2] objective, grade of achievement;
[3] time when education is finished;
[4] one year after entrance;
[5] two years after entrance;
[6] objective;
[7] grade of achievement;
[8] objective;
[9] grade of achievement
[10] objective;
[11] grade of achievement;
[12] objective;
[13] standard;
[14] section;
[15] trainee himself;
[16] instructor;
[17] standard;
[18] section;
[19] trainee himself;
[20] trainer;
[21] standard;
[22] section;
[23] trainee himself;
[24] chief;
[25] standard;
[26] section;
[27] basic knowledge;
[28] hardware construction and function (control printed circuit board);
[29] hardware-cable connection system;
[30] power supply rating;
[31] each unit exchange procedure;
[32] maintenance tool;
[33] VBR utility;
[34] system setting utility;
[35] maintenance diagnosis program;
[36] system installation;
[37] system development by VBR;
[38] disk partition, separation, assembly;
[39] network information setting; and
[40] user individual information setting.

Thereafter, the working list of the objective system is finally made out and output at step S26, and is held as F xxxx system working list 60 (FIG. 7A) (the whole of content is tabulated in Table 4 given above and its part is shown in FIG. 7A) in the database. When the working list of the objective system is completed as a whole, the content of this working list is sent to the objective reference defining means 11 and is reflected on setting of the objective reference (step S27).

It is hereby important that when the working list of the objective system is made out, the direct working flow is listed in the column in Table 4 and is linked with a part of the educational items. When such means is employed, the basic knowledge/theory to be learnt besides the direct works can be also recognized. As a result, a lecture design having fall-off can be improved, and the actual work and the basic knowledge/theory necessary for the actual work can be simultaneously established.

FIGS. 8A and 8B are flowcharts useful for explaining the operation of the educational item list defining means in the embodiment of the present invention. The educational item defining means 13 shown in FIG. 1A preferably comprises the CPU (Central Processing Unit) of the computer, or the like.

A series of the operations of the educational item defining means 13 will be explained with reference to the flowcharts of FIGS. 8A and 8B. First, at step S31 in FIG. 8B, a system associated with the specified working list is extracted from among the working lists 60 (for example, the working list of the F xxxx system) of a plurality of systems on the basis of the objective reference list output from the objective reference defining means 11.

Next, at step S32 in FIG. 8B, the working list of the specified system is displayed on the screen of a display device 70.

Further, at step S33, essential knowledge and technique necessary for executing the works of the specified system are again set. This setting operation can be carried out by operating an input device 72 such as a mouse while watching the working list displayed on the display device 70 and inputting the data relating to the theory and technique as the background of each work item in the working list. As to the setting work of the control printed circuit board of the working item ② in the working list (Table 4), for example, the learning item No. 1 of the educational item list (Table 5) is described to the No. portion of the working item, ② to establish a link, in order to clarify that the actual work cannot be executed smoothly unless knowledge of hardware structure, knowledge of hardware function, knowledge of hardware mounting configuration and knowledge of the cable connecting system described in the learning item No. 1 are understood. Further, arrangement and sorting of working items for every learning division are carried out at step S34.

Figure 9A:
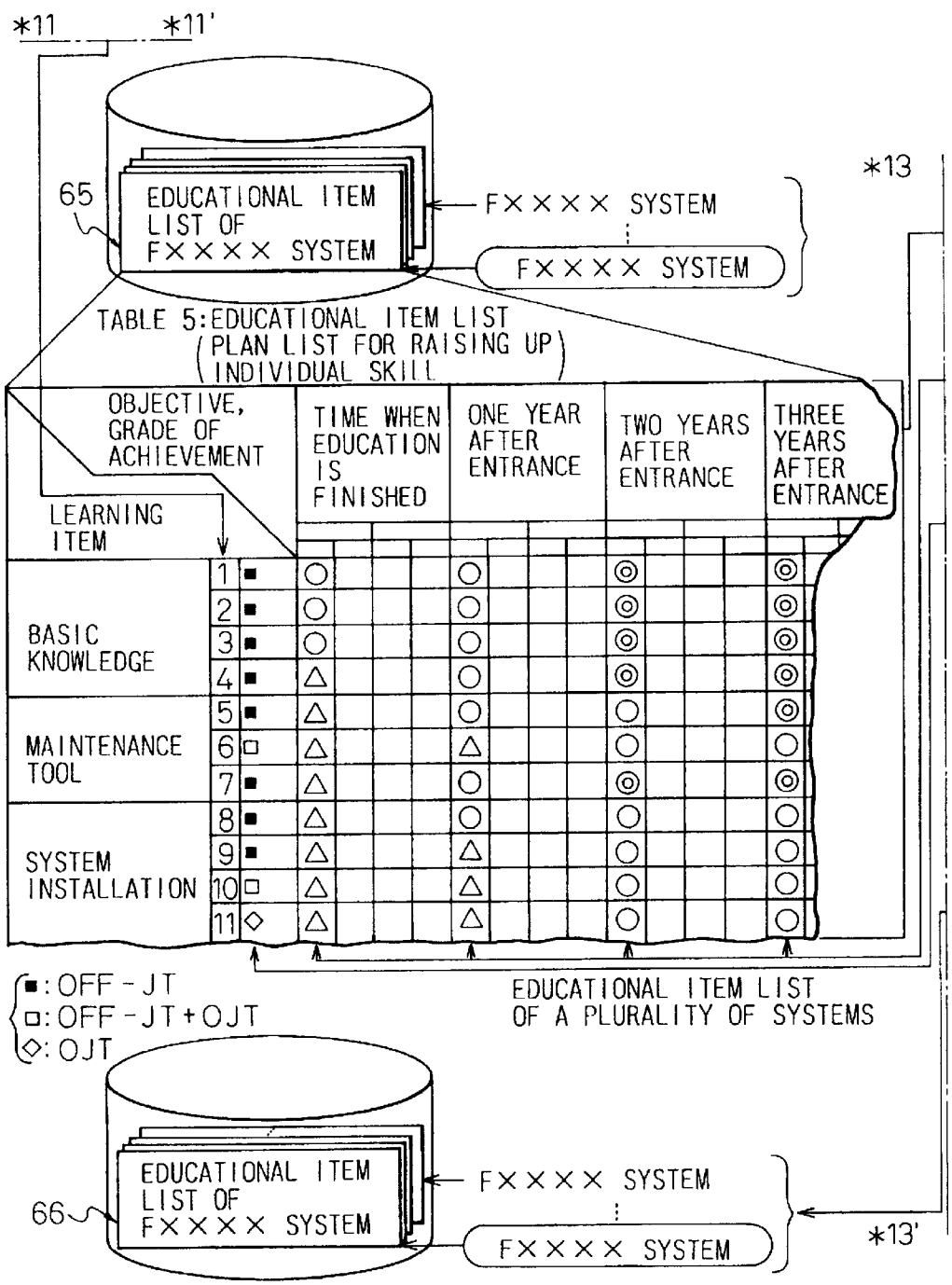
Figure 9B:
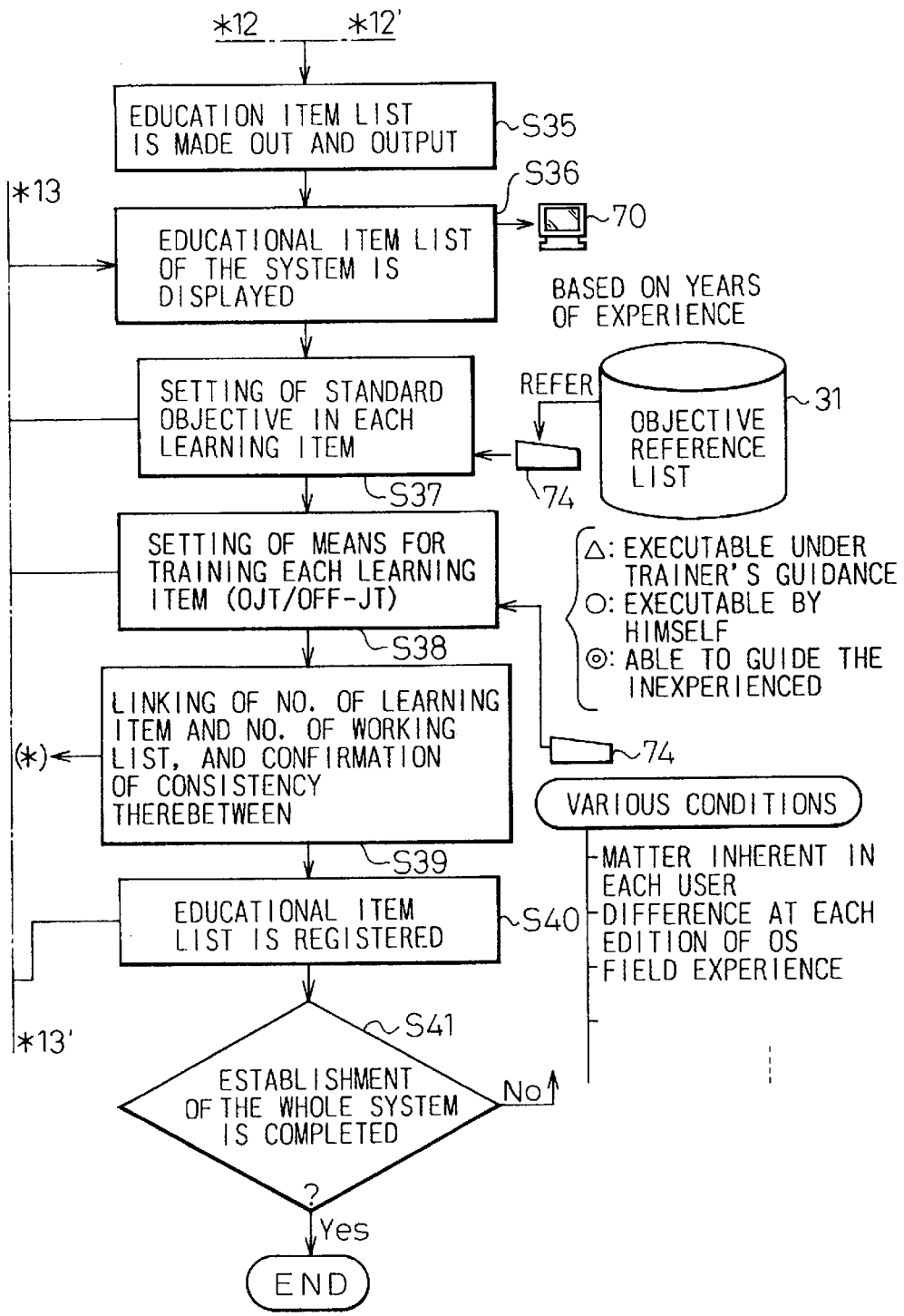

The education item list relating to the work of the specified system is finally made out and output at step S35 in FIG. 9B and is held as F xxxx system educational item list 65 (the whole content is shown in Table 5 and its part is shown in FIG. 9A) in the database. At the same time, the educational item list of the works relating to the specified system is displayed on the display device 70 at step S36.

At step S37 in FIG. 9B, the standard objective of each learning item is set in accordance with the years of experience of the trainee on the basis of the objective reference list 31 (the portion of the standard objective in Table 5 or in the educational item list shown in FIG. 9A). This standard objective is divided into x (unlearned), Δ (executable under trainer's guidance), ⊚ (executable by himself) and ○ (able to guide the inexperienced). The standard objective thus divided is input by the input device such as a keyboard and is as such displayed on the screen of the display device 70.

At step S38, meaning for training each learning item in the educational item list relating to the works of the specified system is set. When this training means is set, matter inherent to each user, differences in each edition of OS, field experience, and other conditions, are input via the input device 74. In the training means described above, the roles of OJT and OFF-JT are clearly distinguished, and OJT and OFF-JT are suitably linked with one another in a certain item or items.

At step S39, linking of No. of learning item in the educational item list and No. of the working list and consistency between them are checked. When consistency between the No. of the learning item in the educational item list and No. of the working list is confirmed, the F xxxx system educational item list 66 (FIG. 9B) based on the clear guideline is finally completed and registered (step S40). When the educational item list of the specified system is completed as a whole, the defining work of this educational item list is completed (step S41).

Originally, training of the trainees may be carried out in accordance with the working list defined by the working list defining means 12 shown in FIGS. 6, 7A and 7B, but regretfully, overlapping items occur and the working list cannot be used as it is, as the curriculum. In the case of the basic pattern of the maintenance work, for example, a maintenance program becomes necessary for each of field adjustment, preventive maintenance and trouble maintenance, so that such overlapping items result not only in the waste of training steps but also confusion for learners inclusive of the trainees. Accordingly, it becomes necessary to reassemble the curriculum by the educational item defining means 13 by using the educational item list described above, that is, the skill-up program list (plan list for improving individual skill). As shown in detail in Table 5, in this skill-up program list, the technique and the theory to be learnt are listed in the column and the learning time (standard objective) and the grade of achievement of the individual trainee are listed in the row.

Linking between the number of the learning item in the educational item list and the number in the working list means which learning item becomes necessary in which scene, and is directed to clearly represent why this technique must be learnt.

More specifically, the standard objective is set by the field staff and the training staff is first described on the abscissa of the educational item list. This means the level which is desired to be achieved at each stage, such as the point when education is finished, two years after entrance, three years after entrance, and so forth.

The setting column of the objective inside a given section is provided on the right side of the achievement level marks (x unlearnt, Δ executable under trainer's guidance, ○ executable by himself and ⊙ able to guide the inexperienced). This setting column of the objective inside the given section is provided so that the objective can be set in accordance with the number of the apparatus delivered, regional differences, differences of maintenance environment, and the like.

It is commonly known that training of talents cannot be smoothly made by merely compelling the trainees. Therefore, the setting column inside the given section is provided from the viewpoint that the objective should be set in accordance with the training program of each company and each section.

On the side of the standard objective in the educational item list, a column is provided for describing the grade of self achievement of a skill at a point in time such as the point when the education is finished, one year after entrance, two years after entrance, three years after entrance, and so forth. Particularly in the case of the grade of younger trainees, not only the evaluation by himself, but also the evaluation of the trainer in charge are described so at to further promote the training of the trainee. By the way, consecutive operations are possible for the engineers of the medium or higher levels by replacing the right side of the standard objective by a format for the engineers of medium standing.

Figure 10:
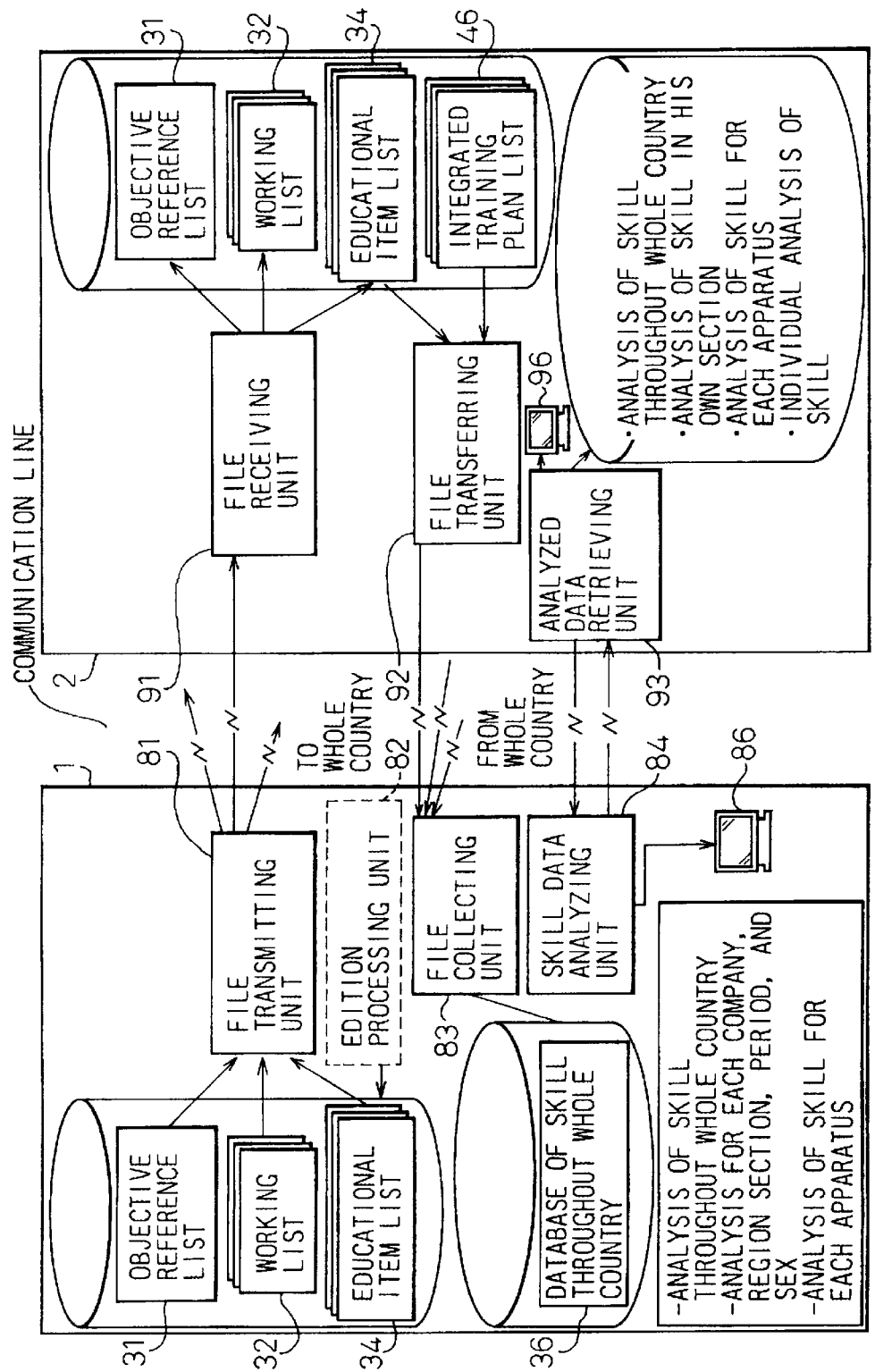
FIG. 10 is a block diagram showing the detail of communication means between first and second processing devices in an embodiment of the present invention.

FIG. 10 is a block view showing in detail the communication means for communicating with the first and second processing devices in the embodiment of the present invention. The means 14, 16 and 16' for communicating with the second processing device shown in FIGS. 1A and 3A and the means 24, 24' for communicating with the first processing device shown in FIG. 2B are preferably accomplished by an interface portion of a computer.

More concretely, the means 14 for communicating with the second processing device comprises a file transmitting unit 81 for transmitting the objective reference list 31, the working list 32 and the educational item list 34, which are held in the database, from the first processing device 1 to the first processing device 2. Further, an edition processing unit 82 is disposed so as to execute edition processing of the content of this database whenever necessary.

Further, means 24 for communicating with the first processing device comprises a file receiving unit 91 for receiving the objective reference list 31, the working list 32 and the educational item list 34 transmitted from the file transmitting unit 81.

Further, means 24' for communicating with the first processing device comprises a file collecting unit 83 for collectively receiving the educational item list 34 and the integrated training plan list 46 sent from the second processing devices in all parts of the country.

Various analysis information such as an analysis of skills throughout whole country, analysis of skills in each company or in each region, etc., are exchanged between a skill data analyzing unit 84 inclusive of the means 16 (16') for communicating with the second processing device and an analyzed data retrieving unit 93 in the second processing device which corresponds to the database retrieving unit 27. These analysis data are displayed inside the respective processing devices by the display devices 86 and 96.

FIGS. 11A, 11B, 12A and 12B are flowcharts useful for explaining the operation of means for inputting the grade of achievement in the embodiment of the present invention. The means 25 for inputting the grade of achievement shown in FIG. 2 is preferably accomplished by a CPU (Central Processing Unit) of a computer, or the like.

Figure 11A:
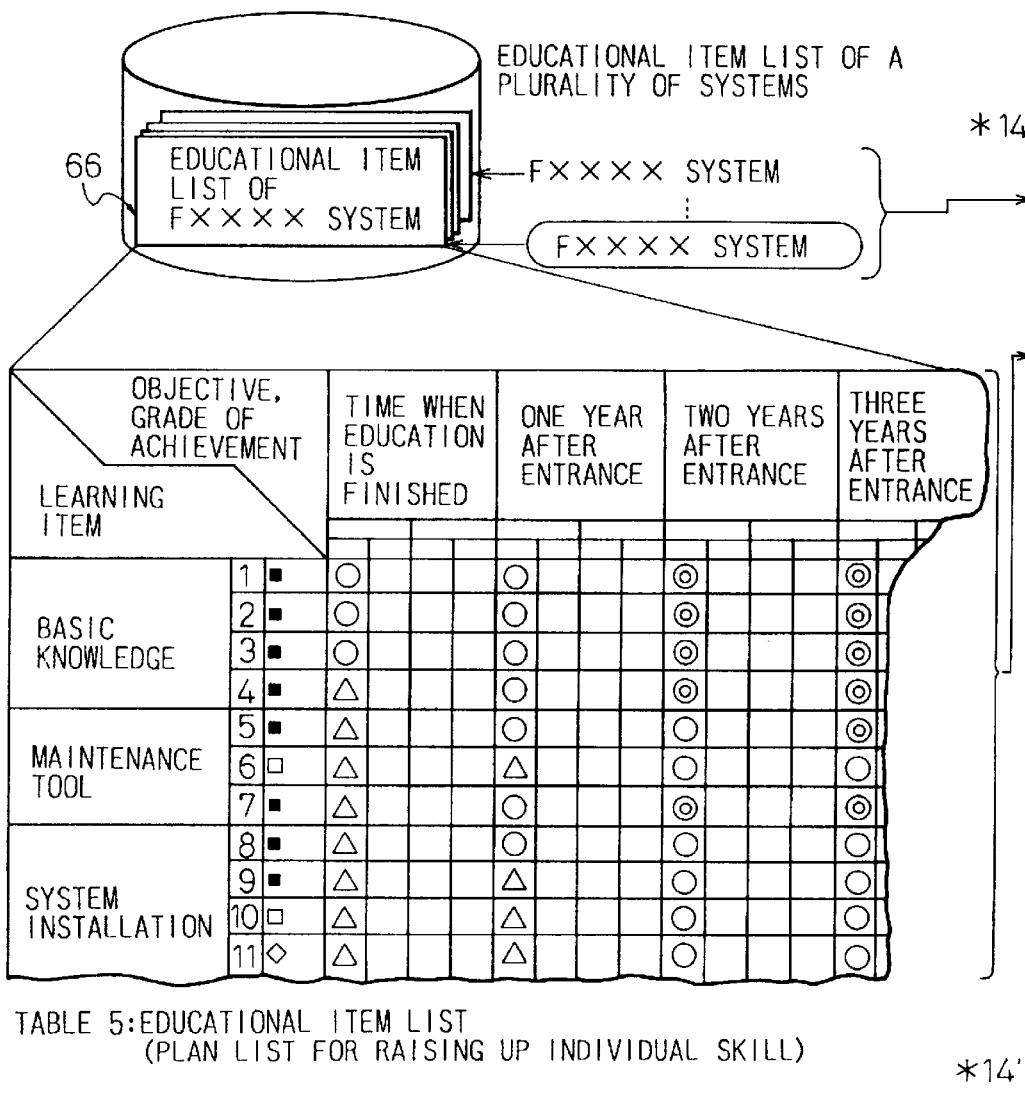
FIGS. 11A, 11B, 12A and 12B are flowcharts useful for explaining the operation of means for inputting the grade of achievement in an embodiment of the present invention.

A series of the operations of the means 25 for inputting the grade of achievement will be explained with reference to the flowcharts of FIGS. 11A to 12B. First, at step S51 in FIG. 11B, the individual attribute codes, such as a company code, a post code, a region code, an employee code, year of entrance, distinction of sex, etc., are input by the input device 74 (FIG. 11A). Next, the F xxxx system educational item list 66 as the object of input is read from the educational item list 34 described above at step S52.

Figure 11B:
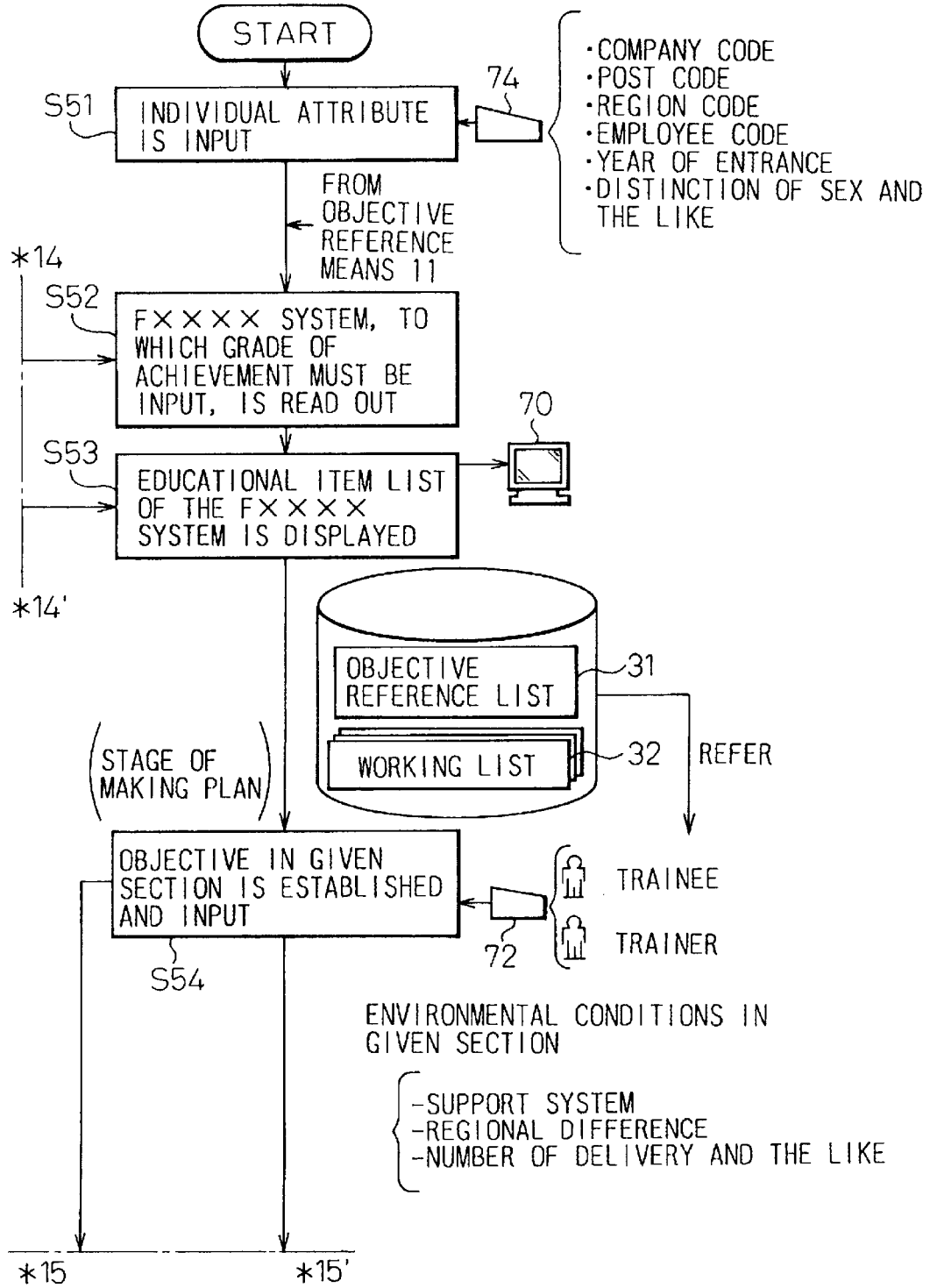

Further, at step S53 of FIG. 11B, the F xxxx system educational item list so read is displayed on the display device 70. At the next step S54 (stage of making a plan), the objective in the given section is established and input by the input device 74 with reference to the objective reference list 31 and the working list 32 while opinions of both trainer and trainee are taken into consideration. When this objective inside the section is established and input, the environmental condition in the given section such as a support system, regional differences, number of apparatus delivered, etc., are also taken into consideration.

Figure 12A:
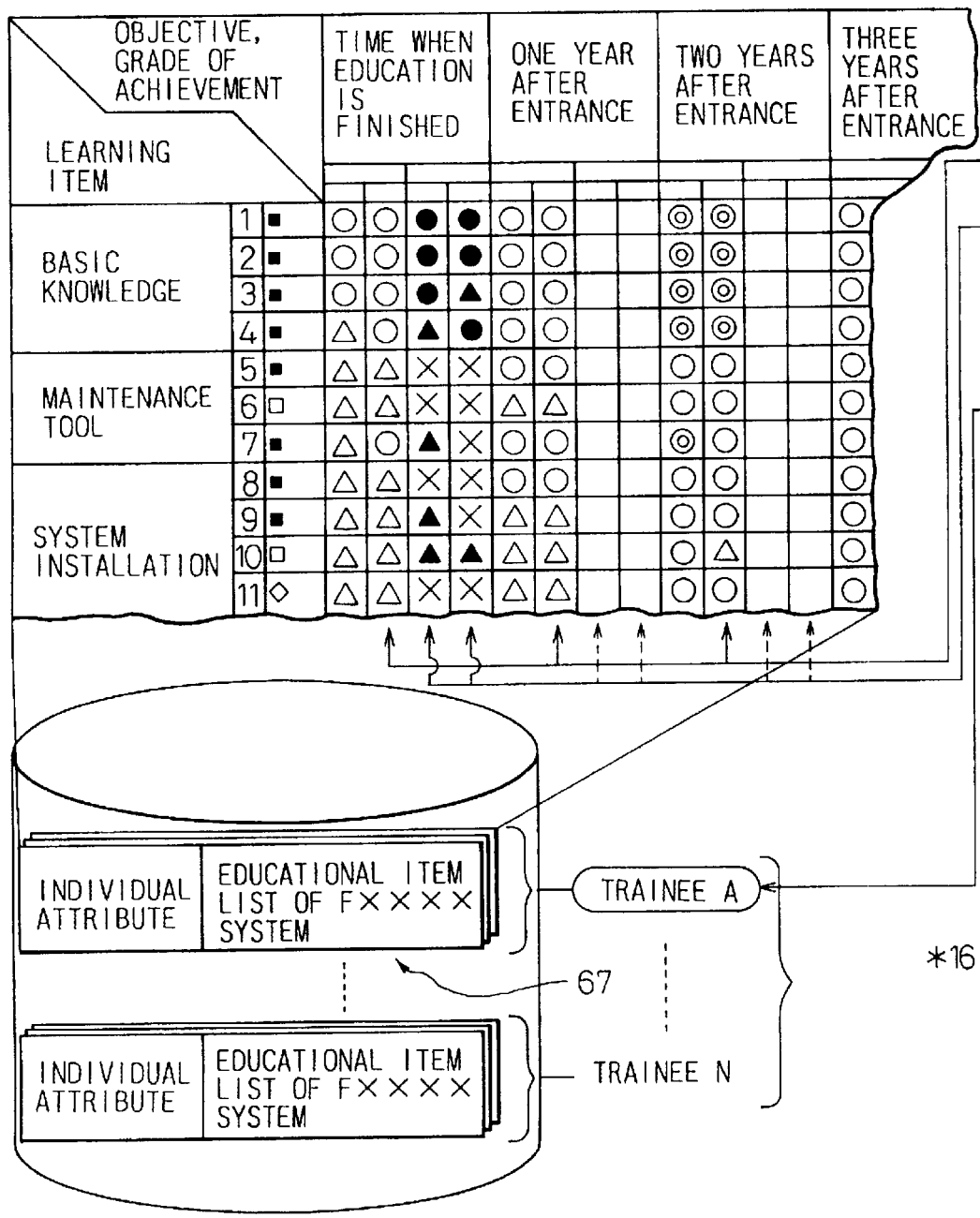
Figure 12B:
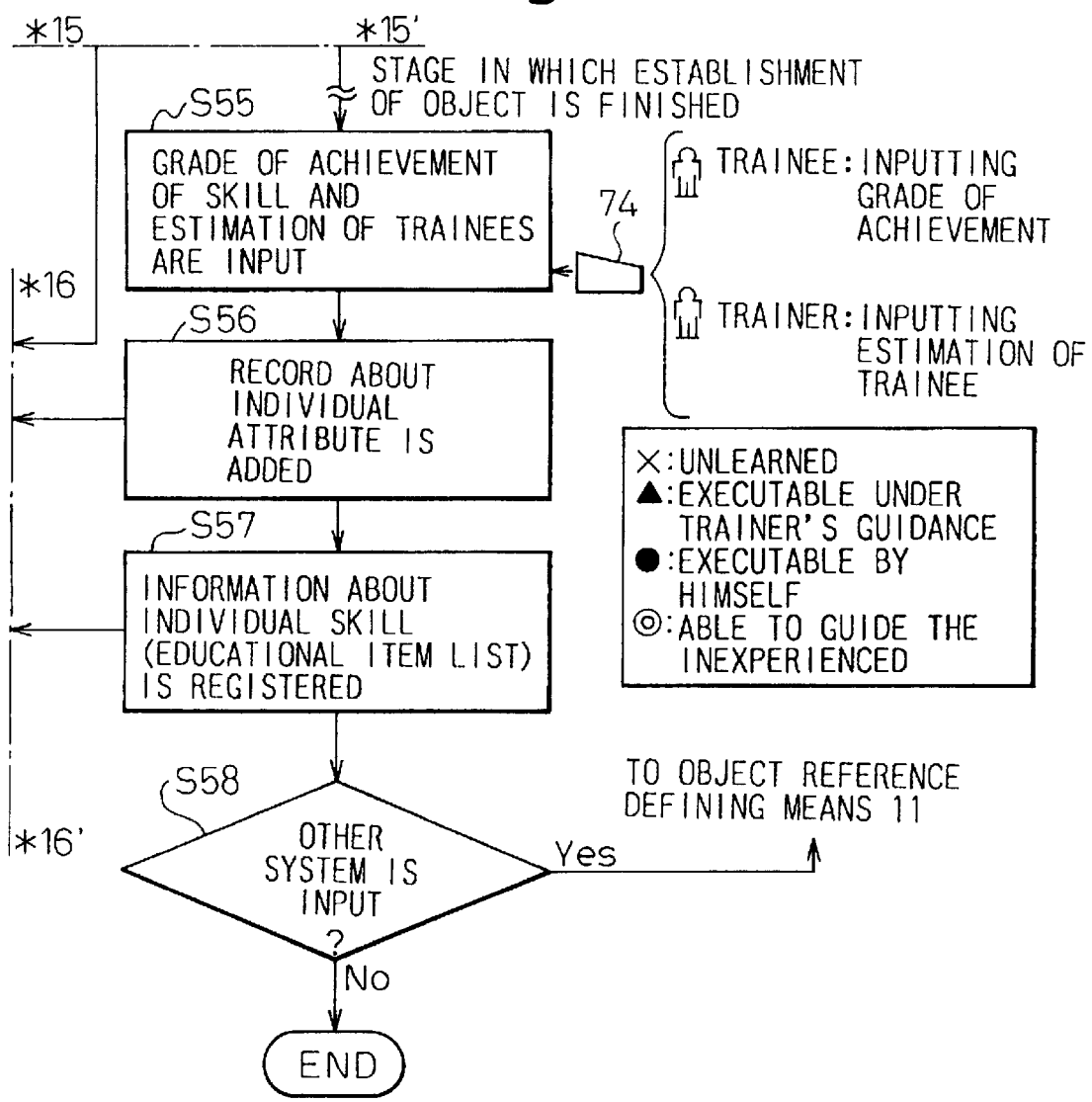

At step S55 in FIG. 12B (stage at which establishment of the objective is finished), the grade of achievement of skill is input by the trainee and the evaluation is input by the trainer. The grade of achievement of skill and the evaluation input described above are displayed by using four-stage achievement level marks (x unlearned, ▲ executable under guidance of trainer, ⊙ executable by himself and ▭ able to guide the inexperienced). At the next step S56, necessary individual attribute records are added. The F xxxx system educational item list 67 (FIG. 12A) is registered at step S57 under the state where the individual skill data of each of a plurality of trainees (trainee A to trainee N) is described. At step S58, edition of the objective reference defining means 11 is carried out if input of other systems exists. If input of other systems does not exist, the operation of the means for inputting the grade of achievement is finished.

More concretely, orientation must be essentially made at the start of training by using the working list and the educational item list in order to have the trainees sufficiently recognize the final objective of this training, that is, recognize what they must learn finally by this training, and to have them study educational items by themselves.

During the training, each trainee is forced to describe the grade of achievement (achievement level mark) for each item into the training finished column of the educational item list whenever each unit is finished. In this way, each trainee is allowed to always recognize his level and, particularly when the achievement level mark is x or ▲, the trainee tries to develop himself so as to attain the mark ⊙. The instructor (educational staff) supervises the achievement state of the educational item list (skill-up plan list) of the trainees and when the achievement state is low as a whole, supplementary lessons are carried out. When the achievement state of only a part of the trainees is low, individual follow-up is carried out.

When a lecture is finished, the trainees are caused to again describe the grade of achievement into the training finished column of the educational item list. There naturally occurs cases where the item which has been x or ▲ during the lecture changes to ◎ by learning. On the other hand, educational items which have remained x or ▲ to the end of training are used as the object of OJT on the field side.

Unlike the conventional educational system which gives trainees the impression that their learning is vague, the system of the present invention enables the trainees to clearly recognize what they have learned and what they cannot understand.

In OJT on the field side, the field trainer first grasps the weak points of the trainees, that is, the educational items for which x or ▲ has remained, on the basis of the grade of learning of the educational item list, and then takes follow-up measures for such items.

In this way, OJT on the field side can be standardized without relying on the skill of the individual trainers, and appropriate follow-up and guidance can be given in accordance with the level of each trainee. The trainees of the medium or high standings are required to develop themselves so as to improve x and ▲ to ⊙.

FIGS. 13A, 13B, 14A and 14B are flowcharts useful for explaining the operations of means for making out the integrated training plan list in the embodiment of the present invention. Means 26 for making out the integrated training plan list shown in FIG. 2B is preferably accomplished by a CPU (Central Processing Unit) of a computer, or the like.

Figure 13A:
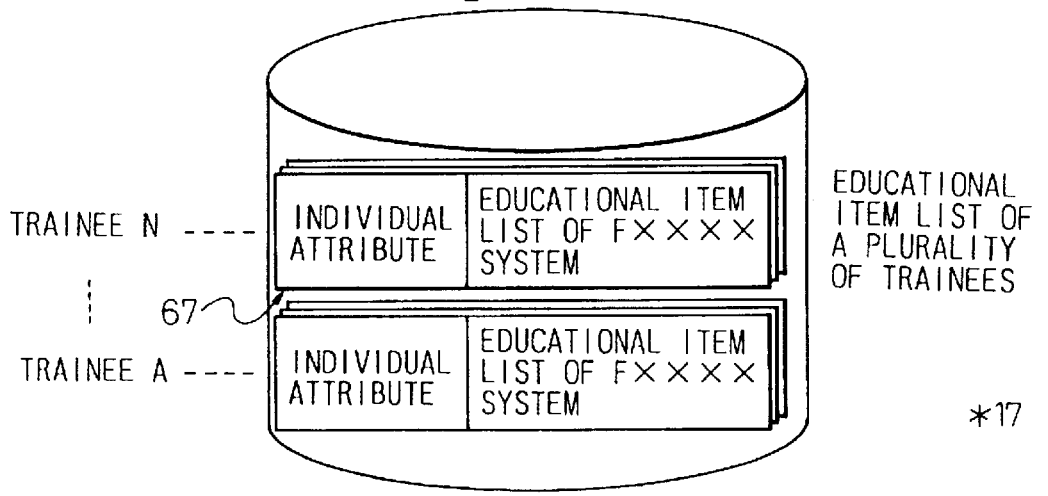
FIGS. 13A, 13B, 14A and 14B are flowcharts useful for explaining integrated training plan list defining means in an embodiment of the present invention.
Figure 13B:
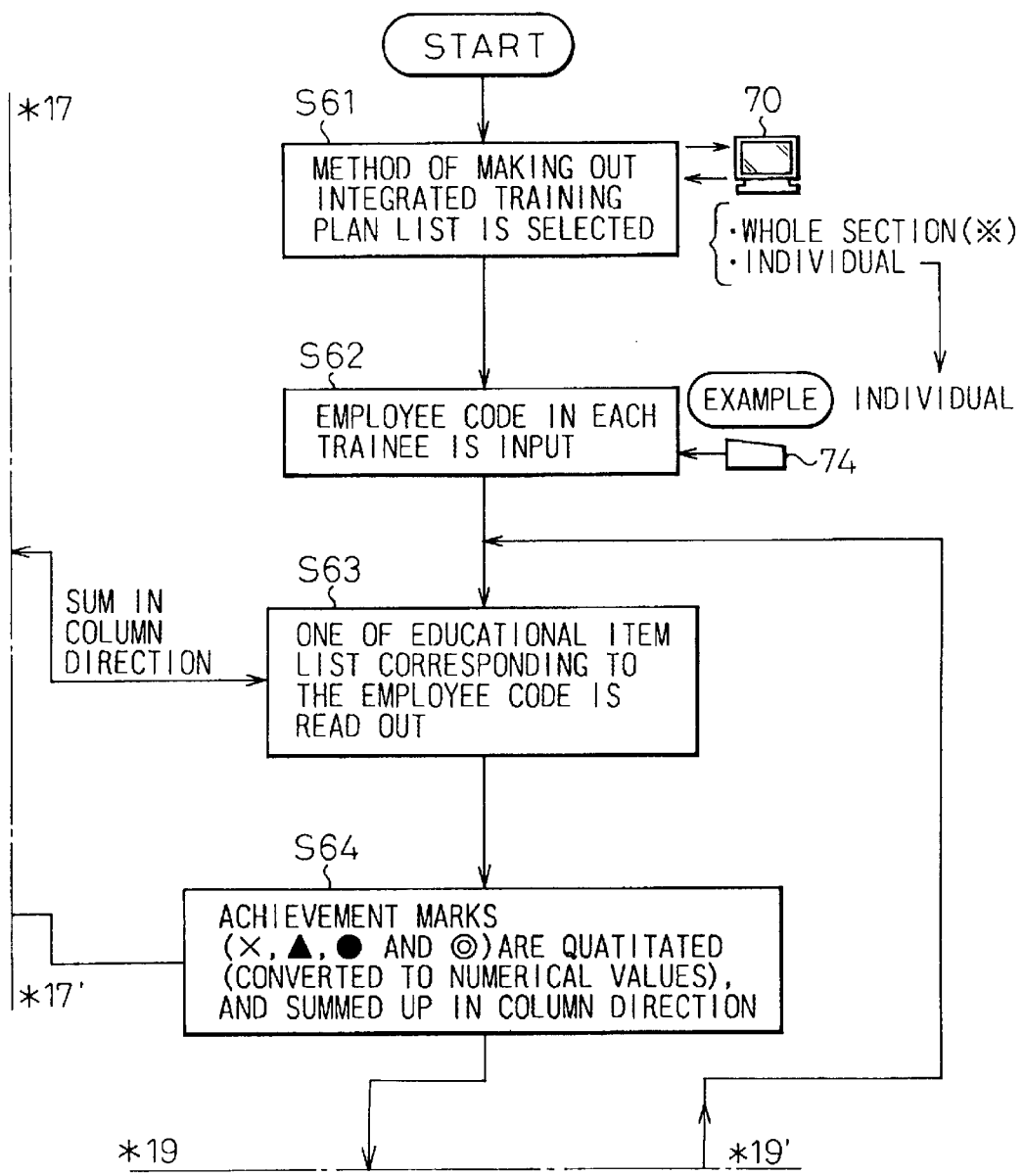

A series of the operations of the means 26 for making out the integrated training plan list will be explained with reference to the flowcharts of FIGS. 13A, 14B. First, at step S61 of FIG. 13B, a method of making out the integrated training plan list is selected. More concretely, a mode for the whole section or a mode for the individual is selected. When the mode of the given section is selected, the plans for all the registered trainees are collectively converted and output.

When the mode of the individual is selected, on the other hand, the employee codes of the trainees, as the object, are input by the input device 74 (step S62). At step S63, further, one of the F xxxx system educational item lists 67 (FIG. 13A) corresponding to this inputted employee code is read. At the next step S64 of FIG. 13B, the achievement level marks (x, ▲, ⊙ and ◎) are quantitated (converted to numerical values) and are summed in the column direction (a to n, . . . ).

Figure 14A:
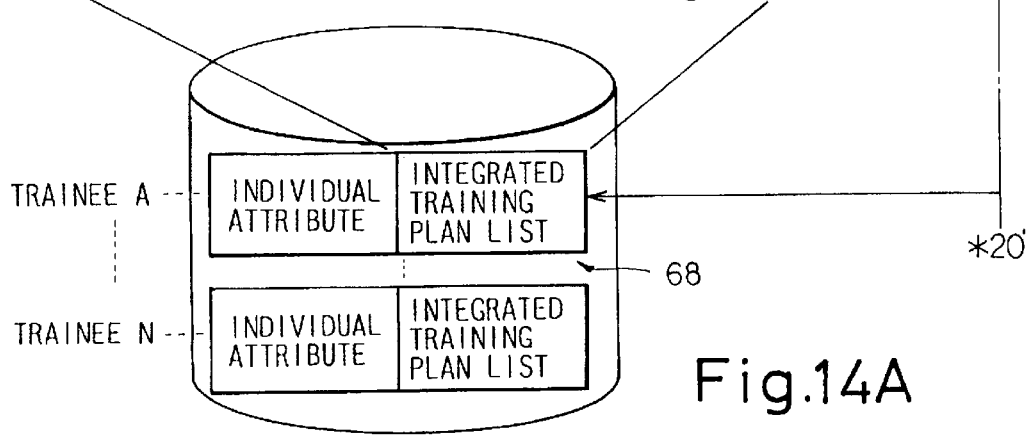
Figure 14B:
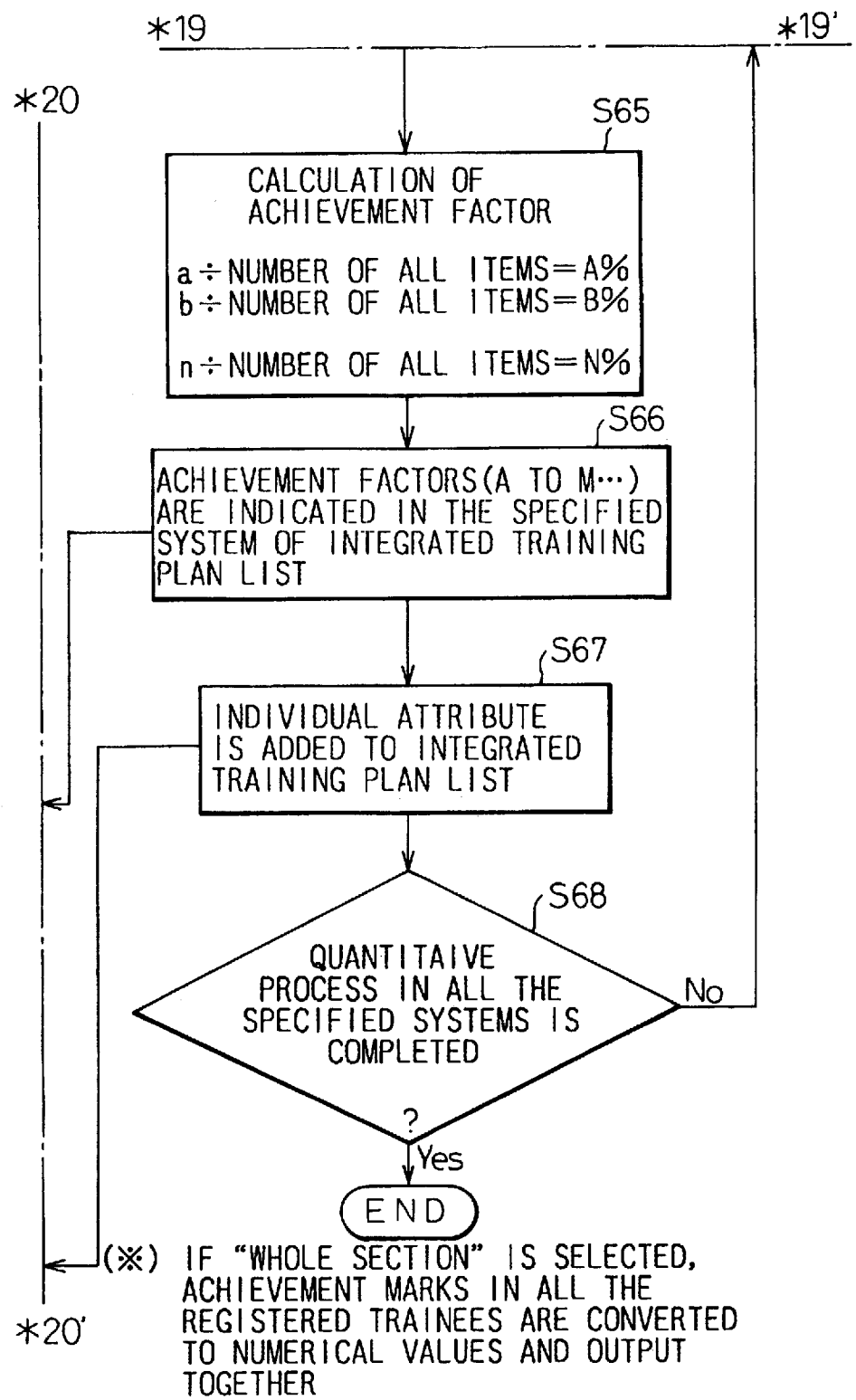

At step S65 of FIG. 14B, the achievement factor for each of a to n is calculated. For example, the achievement factors such as [a÷(number of all items)=A %], [b÷(number of all items)=B %], [c÷(number of all items)=C %], and so forth, are calculated. Further, at step S66 of FIG. 14B, the achievement factors are output for the corresponding system of the integrated training plan list shown in the following Table 6.

TABLE 6

Integrated Training Plan List

| (Individual skill) Integrated training plan list | | | | | | | | | | | | | | |
|---|---|---|---|---|---|---|---|---|---|---|---|---|---|---|
| ① | | ② | | | | ③ | | | | ④ | | | | ⑤ |
| | | ⑥ | | ⑦ | | ⑧ | | ⑨ | | ⑩ | | ⑪ | | ⑫ |
| ⑬ | ⑭ | ⑮ | ⑯ | ⑰ | ⑱ | ⑲ | ⑳ | ㉑ | ㉒ | ㉓ | ㉔ | ㉕ | ㉖ | ㉗ |
| ㉘ | □ ㉙ | 42 | 45 | 48 | 47 | 62 | 70 | 60 | 60 | 80 | 85 | 80 | 78 | 90 |
| | □ ㉚ | 30 | 30 | 25 | 25 | 50 | 55 | 48 | 50 | 73 | 70 | 68 | 70 | 8 |
| | □ ㉛ | 58 | 60 | 50 | 48 | 65 | 65 | 60 | 60 | 80 | 80 | 72 | 70 | 9 |
| ㉜ | ㉝ ◆F3800/3900 R system | 30 | 32 | 30 | 30 | 55 | 58 | 50 | 48 | 70 | 73 | 73 | 70 | 8 |
| | ☐F3800/3900 LAN system | 45 | 44 | 40 | 41 | 60 | 62 | 58 | 56 | 78 | 80 | 81 | 78 | 8 |
| | ■F3830 UBT-2/2E | 43 | 40 | 40 | 35 | 60 | 64 | 54 | 55 | 76 | 79 | 78 | 75 | 8 |
| | ㉞ ☐F3940 UBT-G | 50 | 50 | 37 | 35 | 60 | 63 | 60 | 54 | 70 | 70 | 72 | 70 | 8 |
| | ■F3875 FACT-2 | 50 | 48 | 40 | 40 | 60 | 58 | 60 | 58 | 70 | 71 | 68 | 70 | 8 |
| | ■F1509A12 RBC | | | | | | | | | | | | | |

Numbers 1 to 34 in Table 6 will be described as follows:
① learning item;
② time when education is finished;
③ one year after entrance;
④ two years after entrance;
⑤ three years after entrance;
⑥ objective;
⑦ grade of achievement;
⑧ objective;
⑨ grade of achievement;
⑩ objective;
⑪ grade of achievement;
⑫ objective;
⑬ division;
⑭ name of system and apparatus;
⑮ standard;
⑯ section;
⑰ trainee himself;
⑱ instructor;
⑲ standard;
⑳ section;
㉑ trainee himself;
㉒ trainer;
㉓ standard;
㉔ section;
㉕ trainee himself;
㉖ chief;
㉗ standard;
㉘ common matter;
㉙ manner, moral and behavior;
㉚ basic duties of CE;
㉛ basic technique of CE;
㉜ maintenance technique;
㉝ system; and
㉞ banking terminal.

Further, the individual attributes are added and registered to the integrated training plan list 68 (FIG. 14A) at step S67 of FIG. 14B. When quantitation of the whole specified systems is not yet finished at step S68 of FIG. 14B, the operations of steps S63 to S67 of FIG. 14B are repeated until quantitation is completed.

More specifically, the integrated training plan list is used in order to review all the skills of the trainees and is used as materials for the next self-development, as shown in FIG. 14A.

In this integrated training plan list, the corresponding principal apparatus are listed in the row direction and the objectives in accordance with the year of entrance and the grade of achievement of each trainee are placed in the column direction in the same way as the educational item list previously described. Whereas the educational item list manages the grade of achievement for the essential technique for each apparatus, the integrated training plan list is directed to grasp his skill distribution for the whole apparatus.

When the grade of achievement is put into this integrated training plan list, it becomes clear on which apparatus the trainee is strong and on which apparatus he has to direct much more effort. Managers can utilize the integrated training plan list so as to grasp the direction in which their staff has to be committed in future, by comparing the plan lists of all their staff. Quite naturally, when using their staffs, the managers must take the maintenance environment in which their sections are placed (number of apparatus delivered, constitution of the staff, etc.), into consideration.

FIGS. 15, 16A, 16B, 17 and 18 are flowcharts useful for explaining the operation of the analysis means for each section in the embodiment of the present invention. The analysis means 17 for each section shown in FIG. 3 is preferably accomplished by a CPU (Central Processing Unit) of a computer, or the like.

Figure 15:
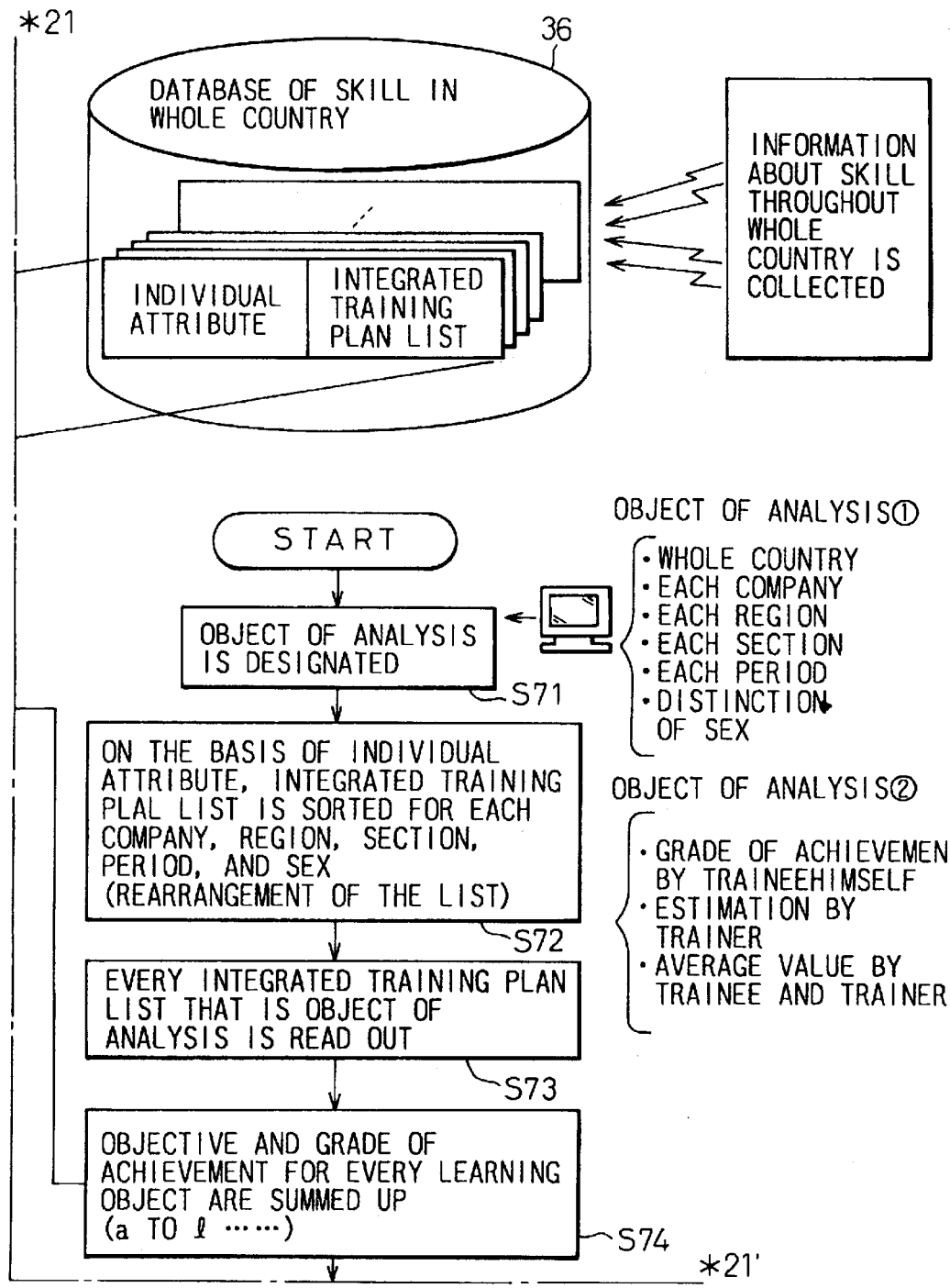

A series of the operations of the analysis means 17 for each section will be explained with reference to the flowcharts of FIGS. 15 to 18. As shown in FIGS. 15, 16A and 16B, the analysis data for each section as a result of the skill distribution in the whole country is registered to the database 36 of skill in the whole country under the state where the individual attributes are added to the integrated training plan list.

First, at step S71 of FIG. 15, the object of the skill analysis for the objects of the whole skill analysis registered to the database 36 of skill in the whole country is designated. In other words, whether the object of analysis is (i) in accordance with the whole country or each section or each region, or (ii) the grade of achievement of the trainee himself or evaluation of the trainer or the mean of both of them, is designated. Further, at step S72, the integrated training plan list is sorted (and rearranged) in accordance with the company, region, section, age and distinction of sex, on the basis of the individual attribute. At step S73, all the contents of the integrated training plan list (FIG. 16A) as the object are read. The objective and the grade of achievement for each learning object are further added (a to 1, . . . ) at step S74.

Figure 18:
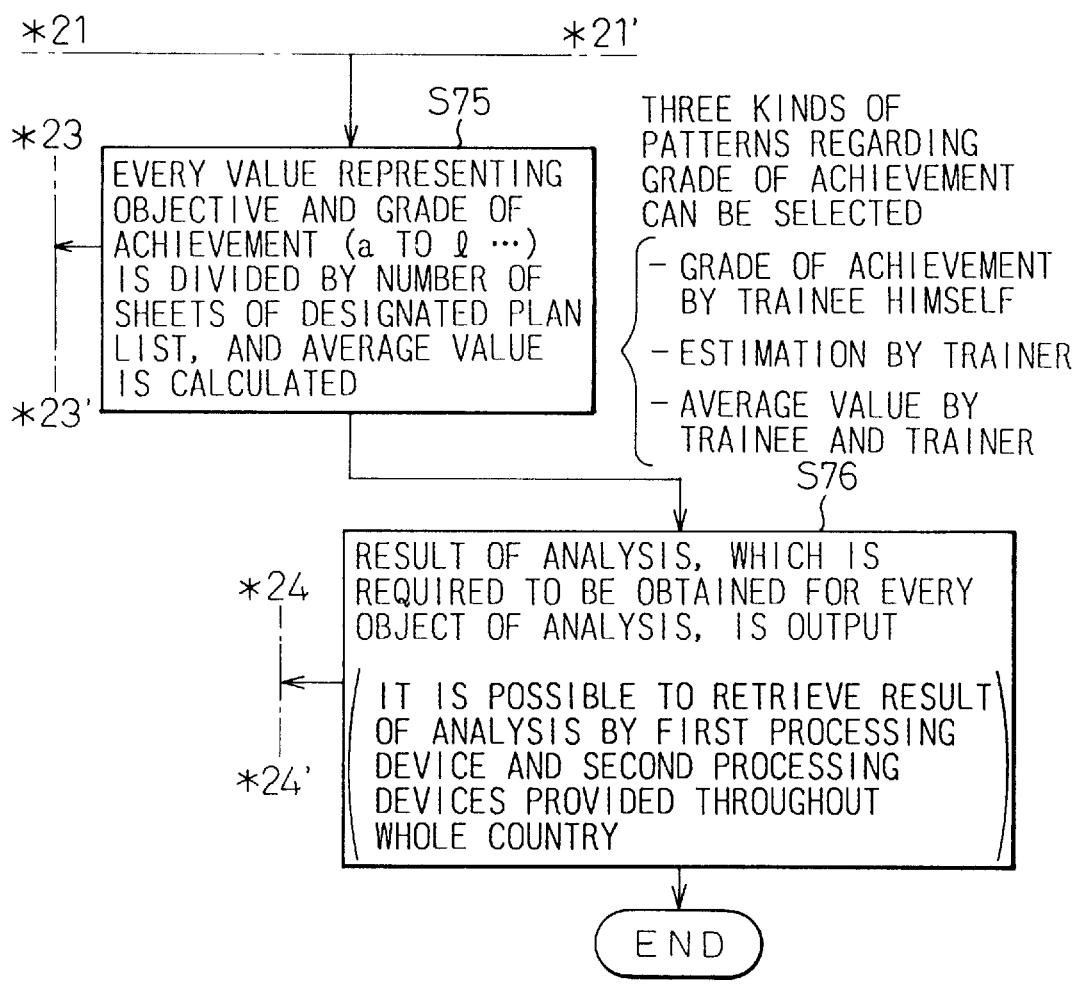

Referring next to FIG. 18, the result of addition of a to 1 . . . is divided by the number of sheets of the integrated training plan lists (that is, the number of trainees) to calculate each mean value (i.e., average value). The calculation of this mean value is made for all the trainees as the object as shown in FIG. 16B. In this case, three kinds of patterns, that is, the grade of achievement of the trainee himself, evaluation of the trainer and both, can be selected as the grade of achievement. At step S76 of FIG. 18, the result of analysis designated by the analysis object is output. The analysis data corresponding to this analysis result can be retrieved from the first processing device and the second processing devices for the whole country. FIG. 17 and Table 7, which is given below, represent the example of the output of such an analysis data (all the object apparatus).

[15] sectional objective;
[16] grade of achievement;
[17] total number;
[18] standard objective;
[19] sectional objective;
[20] grade of achievement;
[21] common matter;
[22] manner, moral and behavior;
[23] basic duties of CE;
[24] basic technique of CE;
[25] maintenance technique of CE;
[26] system;
[27] banking terminal;
[28] on-line;
[29] average value of grade of achievement in whole country;
[30] grade of achievement for each company; and
[31] grade of achievement for each region (each section).

The learning items having low grade of achievement can be easily discriminated by referring to FIG. 17 or Table 7. For example, the cause for the low grade of achievement is examined by analyzing each of the later-appearing educa-

TABLE 7

Analyzed Information (Every Designated Apparatus)

| [1] | | [2] | | | [3] | | | [4] | | | | [5] | | | | ←[29] |
|---|---|---|---|---|---|---|---|---|---|---|---|---|---|---|---|---|
| | | [6] | [7] | [8] | [9] | [10] | [11] | [12] | [13] | [14] | [15] | [16] | [17] | [18] | [19] | [20] | ←[30] |
| [21] | [22] | 189 | 50.0 | 57.8 | 182 | 70.0 | 78.0 | 77.7 | 160 | 85.0 | 88.5 | 89.1 | 137 | 90.0 | 90.0 | 90.1 | ←[31] |
| | [23] | 189 | 50.0 | 51.1 | 182 | 70.5 | 75.5 | 73.3 | 159 | 81.1 | 81.1 | 81.1 | 136 | 84.8 | 84.8 | 84.8 | |
| | [24] | 189 | 50.0 | 53.5 | 182 | 70.5 | 70.5 | 69.3 | 159 | 75.1 | 75.1 | 75.1 | 136 | 80.8 | 80.8 | 80.8 | |
| [25] | [26] ♦F3800/3900 R system | — | — | — | 65 | 45.5 | 40.5 | 40.5 | 100 | 70.5 | 70.5 | 68.5 | 136 | 75.0 | 75.0 | 70.0 | |
| | ☐F3800/3900 LAN system | — | — | — | 40 | 45.5 | 35.0 | 35.0 | 120 | 60.0 | 60.0 | 59.0 | 136 | 75.5 | 75.5 | 66.5 | |
| | ■F3830 UBT-2/2E | 189 | 50.0 | 55.4 | 180 | 70.5 | 70.5 | 73.2 | 160 | 85.8 | 88.8 | 83.8 | 134 | 90.5 | 90.0 | 91.5 | |
| | ☐F3940 UBT-G | — | — | — | 65 | 60.5 | 60.5 | 65.5 | 140 | 65.5 | 67.5 | 68.5 | 136 | 85.0 | 90.0 | 89.5 | |
| | [27] ■F3875 FACT-2 | 189 | 50.0 | 60.0 | 188 | 65.0 | 65.0 | 75.2 | 160 | 85.0 | 90.0 | 88.8 | 134 | 90.5 | 95.5 | 95.0 | |
| | ■F1509A12 RBC | 189 | 50.0 | 53.4 | 178 | 60.0 | 63.0 | 64.2 | 160 | 77.0 | 75.0 | 75.8 | 135 | 83.5 | 85.5 | 83.5 | |
| | ■F3815A PIM | 189 | 50.0 | 50.4 | 178 | 55.0 | 56.0 | 60.5 | 160 | 65.0 | 65.0 | 65.0 | 134 | 75.5 | 75.5 | 70.5 | |
| | [28] ■♦MODEM/ON-LINE | 189 | 35.0 | 30.2 | 178 | 40.0 | 45.0 | 35.2 | 160 | 70.0 | 70.0 | 48.0 | 134 | 85.5 | 85.5 | 59.5 | |

What is the cause for low grade of achievement?

T7 ——— T7'

Numbers [1] to [28] in Table 7 will be described as follows:

[1] state of achievement of skill in whole country (terminal device);
[2] time when education is finished;
[3] one year after entrance;
[4] two years after entrance;
[5] three years after entrance;
[6] total number;
[7] standard objective;
[8] grade of achievement;
[9] total number;
[10] standard objective;
[11] sectional objective;
[12] grade of achievement;
[13] total number;
[14] standard objective;

tional items as to the educational items having the low grade of achievement which are marked by ⊙ in FIG. 17.

FIGS. 19, 20A, 20B, 21A, 21B and 22 are flowcharts useful for explaining the operation of analysis means for each educational item in the embodiment of the present invention. The analysis means 18 for each educational item shown in FIG. 3B is preferably accomplished by a CPU (Central Processing Unit) of a computer, or the like.

A series of the operations of the analysis means 18 for each educational item will be explained with reference to each flowchart of FIGS. 19 to 22. The analysis data for each educational item as the result of analysis of the skill distribution nationwide is registered to the database 36 (FIG. 19) under the state where the individual attribute is added to the educational item list, as shown in FIGS. 19, 20A and 20B.

Here, in order to particularly examine the factors for the items (apparatus) having low grade of achievement by analysis of each section shown in FIGS. 15 to 18, the system which is the object of analysis is selected at step S81 in FIG.

19. At the next step S82, whether the object of analysis is (iii) the analysis object in accordance with the whole country, each company, each region, etc., or (iv) the analysis object of the achievement of the trainee himself, evaluation of the trainer, or the mean value of both, is designated, as to the analysis objects of the educational item list registered to the skill database 36 for the whole country. Further, at step S83, all the educational item lists of the object system are read on the basis of the individual attribute. At step S84, the objective and the grade of achievement for each learning item are added (a to i, . . . ).

At the subsequent step S85, the result of addition of a to i, . . . is divided by the number of sheets of the educational item lists (that is, the number of trainees) and each mean value (average value) is calculated. This calculation of the mean value is made for all trainees as shown in FIGS. 20A and 20B.

Figure 22:
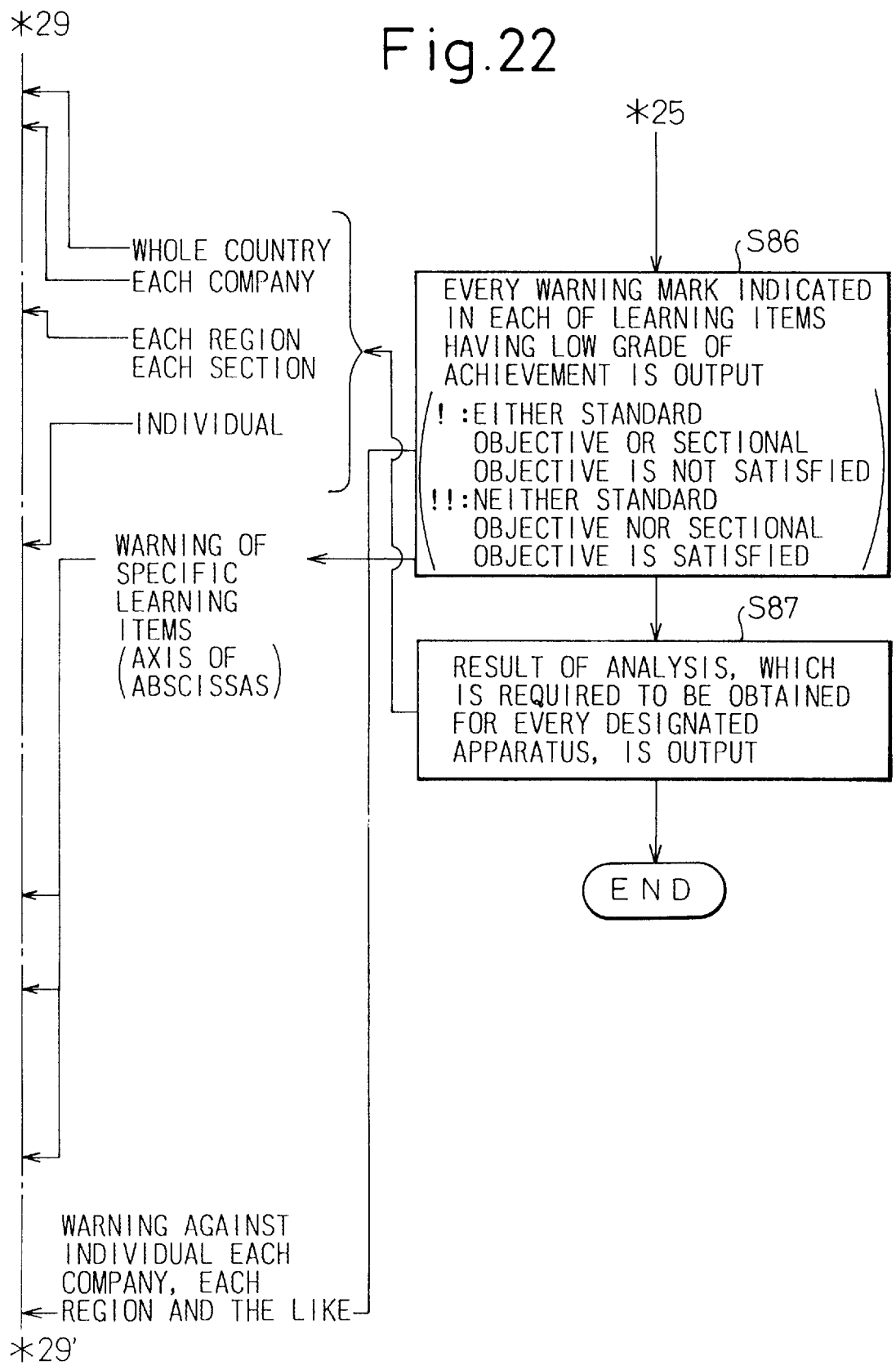
Figure 26B:
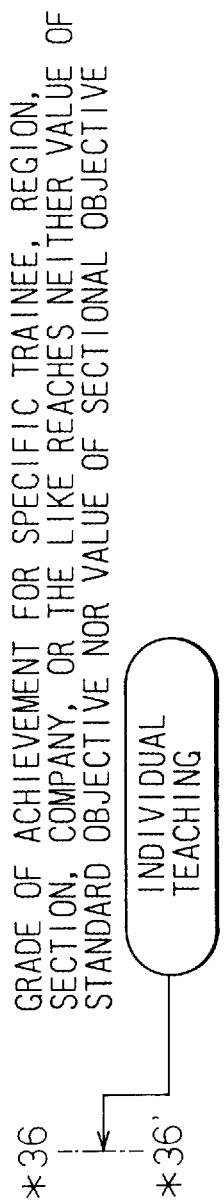

At step S86 of FIG. 22, warnings for specific learning items having a low grade of achievement are output. Here, the case where this warning is output is the case where the grade of achievement is lower than the objective reference, the case where it is lower than the sectional objective or the case where both of them are not satisfied. Further, at step S87, the result of analysis relating to the specific apparatuses specified by the object of analysis is output. FIGS. 21A and 21B and the following Tables 8 and 9 represent an example of the output of such analysis data about the specified apparatus.

① CEs who entered the company in 1993, state of achievement of skill for each company;
② S: region;
③ ranking No. 1;
④ ranking No. 2;
⑤ ranking No. 3;
⑥ ranking No. 65;
⑦ ranking No. 66;
⑧ ranking No. 67;
⑨ CEs who entered the company in 1993, state of achievement of skill for each region;
⑩ S: name of company;
⑪ No. 1 Osaka;
⑫ No. 2 Kyushu;
⑬ No. 3 Shikoku;
⑭ No. 65 Tokyo;
⑮ No. 66 Hokuriku;
⑯ No. 67 Nagano;
⑰ CEs who entered company in 1993, state of achievement of individual skill;
⑱ S: trainee (student);
⑲ ranking No. 1 Yamada;
⑳ ranking No. 2 Tsukahara;
㉑ ranking No. 3 Kojima;

TABLE 8

Analyzed Information of Specified Apparatus (No. 1)

| | ① | ② | ③ | ④ | ⑤ | | ⑥ | ⑦ | ⑧ | | | | |
|---|---|---|---|---|---|---|---|---|---|---|---|---|---|
| | ⑨ | | ⑩ | ⑪ | ⑫ | ⑬ | ... | ⑭ | ⑮ | ⑯ | | | |
| | ⑰ | | ⑱ | ⑲ | ⑳ | ㉑ | ... | ㉒ | ㉓ | ㉔ | ㉕ | ㉖ | ㉗ |
| | ㉞ | | | | | | | | | | ㉘ ㉙ | ㉚ ㉛ | ㉜ ㉝ |
| 1 | □ | ㉟ | 10 | 10 | 10 | ... | 10 | 5 | 0 | 475 | 9.5 | ●10 ↕ | ▲5 |
| 2 | □ | ㊱ | 10 | 10 | 10 | ... | 10 | 10 | 10 | 500 | 10.0 | ●10 | ●10 |
| 3 | □ | ㊲ | 10 | 5 | 10 | ... | 10 | 5 | 5 | 425 | 8.5 | ●10 ↕ | ●10 |
| 4 | □ | ㊳ | 10 | 10 | 10 | ... | 10 | 5 | 0 | 450 | 9.0 | ●10 ↕ | ●10 |
| 5 | □ | ㊴ | 10 | 10 | 10 | ... | 0 | 0 | 0 | 275 | 5.5 | ▲5 | ▲5 |
| 6 | □ | ㊵ | 10 | 10 | 10 | ... | 10 | 5 | 0 | 55 | 0.5 | ×0 | ×0 |
| 7 | □ | ㊶ | 10 | 5 | 10 | ... | 5 | 5 | 5 | 275 | 5.5 | ▲5 | ▲5 |
| 8 | □ | ㊷ | 10 | 10 | 10 | ... | 5 | 5 | 0 | 200 | 4.0 | ▲5 ↕ | ▲5 |
| 9 | □ | ㊸ | 10 | 10 | 10 | ... | 10 | 5 | 0 | 300 | 6.0 | ▲5 ↕ | ▲5 |
| 10 | □ | ㊹ | 10 | 10 | 10 | ... | 5 | 5 | 10 | 425 | 8.5 | ●10 | ▲5 |
| 11 | □ | ㊺ | 10 | 10 | 10 | ... | 5 | 5 | 0 | 425 | 8.5 | ▲5 | ▲5 |

Numbers 1 to 47 in the Table 8 will be described as follows:

㉒ ranking No. 48 Nakamura;
㉓ ranking No. 49 Tanaka;

㉔ ranking No. 50 Mita;
㉕ grade of achievement;
㉖ standard objective;
㉗ sectional objective;
㉘ total points;
㉙ average value;
㉚ objective;
㉛ warning;

㊼ grade of achievement for each region (each section); and

㊽ grade of achievement of individual skill.

TABLE 9

Analyzed Information of Specified Apparatus (No. 2)

| T8 | | | | | | | | | | | | | | | | T8' |
|---|---|---|---|---|---|---|---|---|---|---|---|---|---|---|---|---|
| 12 | □ | [1] | 10 | 10 | 10 | ... | 10 | 5 | 5 | 400 | 8.0 | ●10 | ↕ | ●10 | | |
| 13 | □ | [2] | 10 | 5 | 5 | ... | 5 | 5 | 0 | 275 | 5.5 | ▲5 | | ▲5 | | |
| 14 | * | [3] | 10 | 10 | 5 | ... | 5 | 5 | 0 | 50 | 1.0 | ×0 | | ×0 | | |
| 15 | * | [4] | 10 | 5 | 5 | ... | 5 | 5 | 0 | 450 | 9.0 | ●10 | ↕ | ●10 | ↕ ⇐ | • [18] |
| 16 | * | [5] | 10 | 10 | 5 | ... | 5 | 5 | 0 | 325 | 8.5 | ▲5 | | ×0 | | |
| 17 | * | [6] | 10 | 10 | 10 | ... | 5 | 5 | 0 | 375 | 7.5 | ▲5 | | ▲5 | | |
| 18 | □ | [7] | 10 | 5 | 10 | ... | 5 | 5 | 5 | 425 | 8.5 | ●10 | ↕ | ●10 | | • |
| 19 | □ | [8] | 10 | 10 | 5 | ... | 10 | 5 | 5 | 495 | 9.5 | ●10 | ↕ | ▲5 | | |
| 20 | ■ | [9] | 10 | 5 | 5 | ... | 5 | 5 | 5 | 450 | 9.0 | ●10 | ↕ | ▲5 | | |
| 21 | ■ | [10] | 10 | 5 | 10 | ... | 5 | 5 | 0 | 450 | 9.0 | ▲5 | | ▲5 | | |
| 47 | * | [11] | 10 | 5 | 10 | ... | 10 | 10 | 10 | 375 | 7.5 | ●10 | ↕ | ▲5 | | |
| 48 | * | [12] | 10 | 5 | 0 | ... | 5 | 0 | 0 | 175 | 3.5 | ▲5 | ↕ | ▲5 | ↕ ⇐ | |
| 49 | * | [13] | 10 | 5 | 5 | ... | 0 | 0 | 0 | 25 | 0.5 | ×0 | | ×0 | | |
| 50 | * | [14] | 5 | 5 | 5 | ... | 0 | 0 | 0 | 25 | 0.5 | ×0 | | ×0 | | |
| | | [15] | 425 | 405 | 385 | ... | 355 | 305 | 106 | — | 300.5 | 370 | | 350 | | |
| | | [16] | 42 | 40 | 38 | ... | 35 | 30 | 10 | | 30 | 37 | | 35 | | |
| | | [17] | | | | | ! | ! | !! | -- | ! | — | | — | | [19] |

㉜ objective;
㉝ warning;
㉞ P: learning item (problem);
㉟ construction of communication system (single direction/semi-double/full double communication);
㊱ synchronization system (start-stop synchronization/SYN synchronization/frame synchronization . . . );
㊲ transmission system (base band; D.C. transmission/amplitude/frequency . . . );
㊳ multiplexing system (frequency division multiplexing, time division multiplexing, pulse . . . );
㊴ transmission speed (data transmission speed, bit/sec=bit number/sec, . . . );
㊵ kind of line (ordinary circuit, public circuit, DOX-CS . . . );
㊶ difference of toll line and local line, grasp of maintenance field (M . . . );
㊷ communication network (construction, switchboard, cable, transfer apparatus, return . . . );
㊸ meaning of transmission loss (reception level/transmission level);
㊹ causes of deterioration of transmission quality (damping distortion, group delay distortion . . . );
㊺ establishment of link/open sequence (SEL→ACK→TEXT . . . );
㊻ grade of achievement for each company;

Numbers [1] to [19] in Table 9 will be described as follows:

[1] transmission efficiency (I/O selection and SA/UA . . . );

[2] transmission efficiency (transmission control characters, synchronization system, message format . . . )

[3] link sequence (DM=ROL→SNRM→UA=NSA→I→RR/R . . . );

[4] session sequence (ACTPU-ACTLU-INITIATE-BIND-SD . . . );

[5] transmission efficiency (I/O selection and SA/LU);

[6] transmission efficiency (P/F bit, SEQ-No., frame format, TH/RH . . . );

[7] kind of modem (base band MD, speech band MD . . . );

[8] cautions for differences of modulation systems and mutual connection of modems;

[9] model interface signal (SD, RD, ER, DR, RS, CS, CD, ST1, ST2, . . . );

[10] series of operations of modem interface (DTE-POWon→transmission of carrier→ . . . );

[11] basic operation (setting of protocol /FPD recording command/ . . . );

[12] analysis of circuit trace data at normal time (BC/AC . . . );

[13] analysis of circuit trace data at abnormal time (BC/AC . . . );

[14] specific function (trace by trigger function STOP . . . );

[15] sum of points column direction;

[16] all-inclusive grade of achievement;

[17] warning;

[18] improvement of educational lecture of CE and content of OJT, review of established objective; and

[19] object of individual teaching.

In FIGS. 21A and 21B or in Tables 8 and 9, the analyzed information for each educational item for the specific apparatus for which the grades of achievement are low, are described. More concretely, warning is output for each educational item in the row direction (i.e., in the axis of abscissas) of the analyzed information, and warning for each of the individual, the company and the region is output in the column direction (i.e., in the axis of ordinates). Accordingly, when the portions at which such warning is output are followed, the weak points of the trainees can be quickly reinforced.

FIGS. 23, 24, 25A, 25B, 26A and 26B are views showing a utilization example of the analyzed information of the present invention. Here, the drawings represent definite means for precisely responding to a warning when such warning is output to the educational items having the low grade of achievement.

First, the manager group can grasp at which level the skill of their own department exists throughout the whole company and can know which points must be reinforced in comparison with other departments in view of the analyzed results (FIGS. 23 and 24) of the whole educational items (apparatus). Accordingly, they can establish a precise training plan.

Secondly, all the educational items are output to the apparatus having the low grade of achievement and among them, which portions are particularly low, that is, the matters which must be followed, are clearly output from the analyzed results (FIGS. 25A, 25B, 26A and 26B) of the specific educational items (apparatus). Accordingly, precise measures for improvement can be taken in comparison with the prior art in which vague improvement has been attempted.

FIGS. 27A, 27B, 28A, 28B, 28C, 29, 30A and 30B are views showing the correlation between the functional portions in the embodiments of the educational system in the company according to the present invention. These drawings represent, collectively, how the functional portions that have been explained so far are linked with one another by using the educational system in the company. Such an educational system throughout the country can efficiently manage the education of the trainees by accomplishing EDP by using a computer.

Figure 27A:
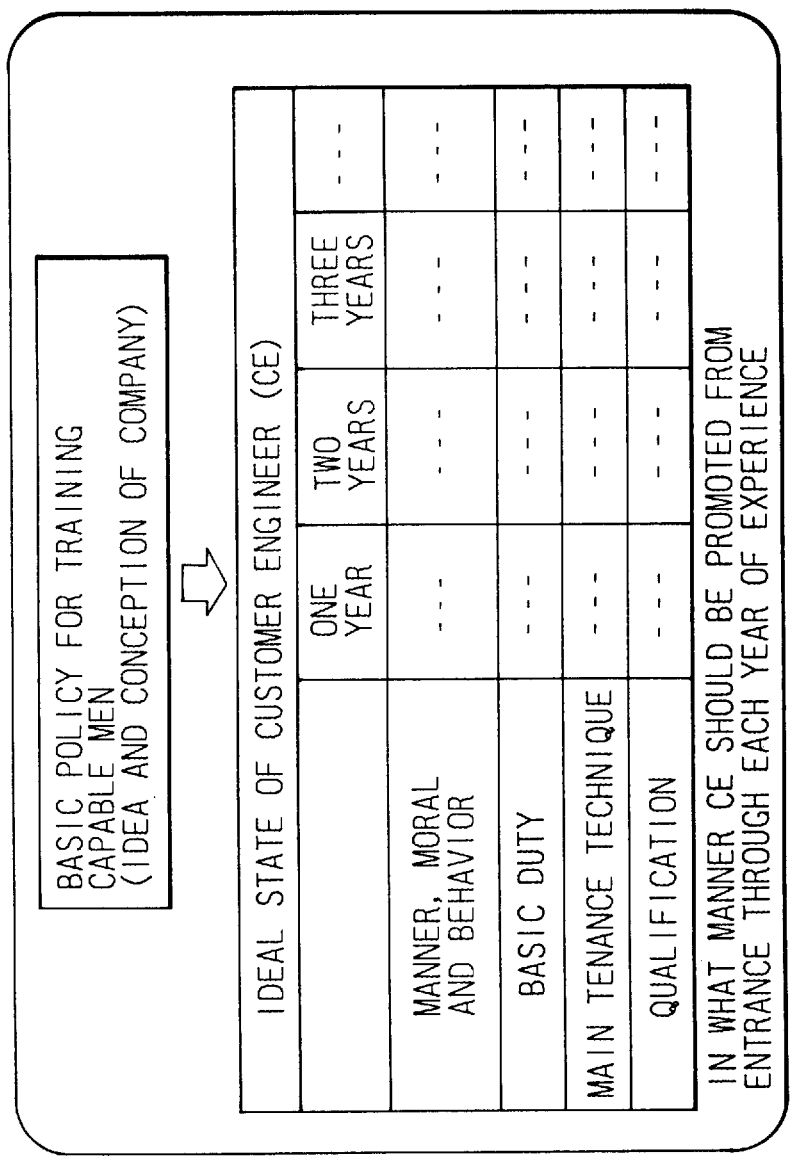

First, as shown in FIGS. 27A and 27B, the basic policy for training able men in the company is established on the basis of the idea and conception of the company. The objective reference of training personnel in the company based on the "ideal state" is established along this basic policy. Lecture design is made on the education side in accordance with this objective reference, and training of the trainees by OFF-JT is executed. In this case, the opinions of the field staff and the trainees are sufficiently taken into consideration on the format of the support/solution of problems, and evaluation of the grade of achievement with reference to the objective reference and the objective reference itself are reviewed.

Figure 28C:
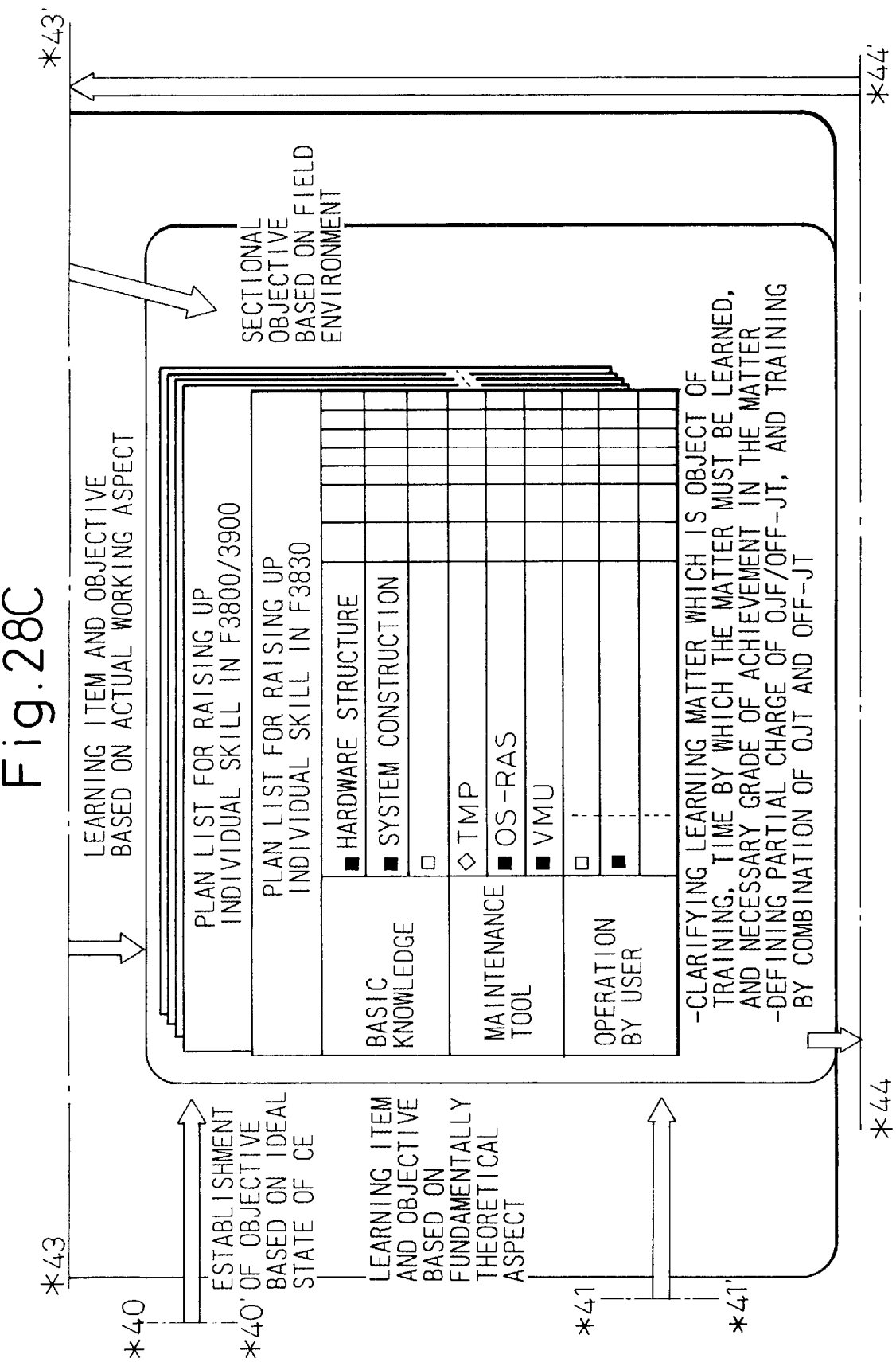

Further, the working list is made out on the field side in accordance with the same objective reference as shown in FIGS. 28B and 28C, and training of the trainees by OJT is carried out in accordance with this working list (FIG. 28A). However, this working list is made out by suitably combining the items extracted from the flow of the actual work and the learning items from the aspect of the basic principle on the education side.

Figure 29:
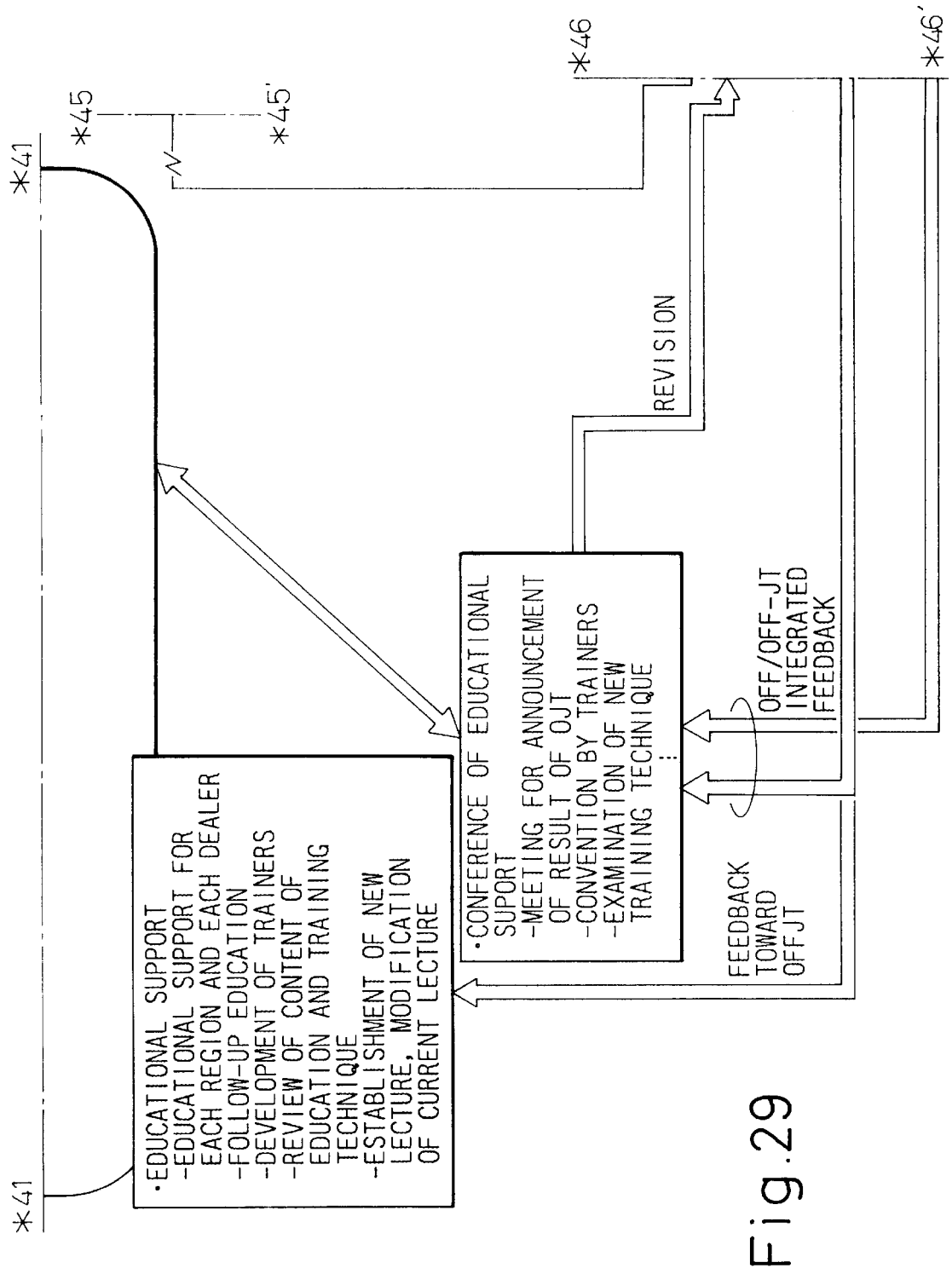

Furthermore, as shown in FIG. 29, OFF-JT and OJT are mutually communicated through the educational support for each region and for each dealer, the educational support of the trainers and the training support conference such as OJT result announcement meeting.

Figure 30B:
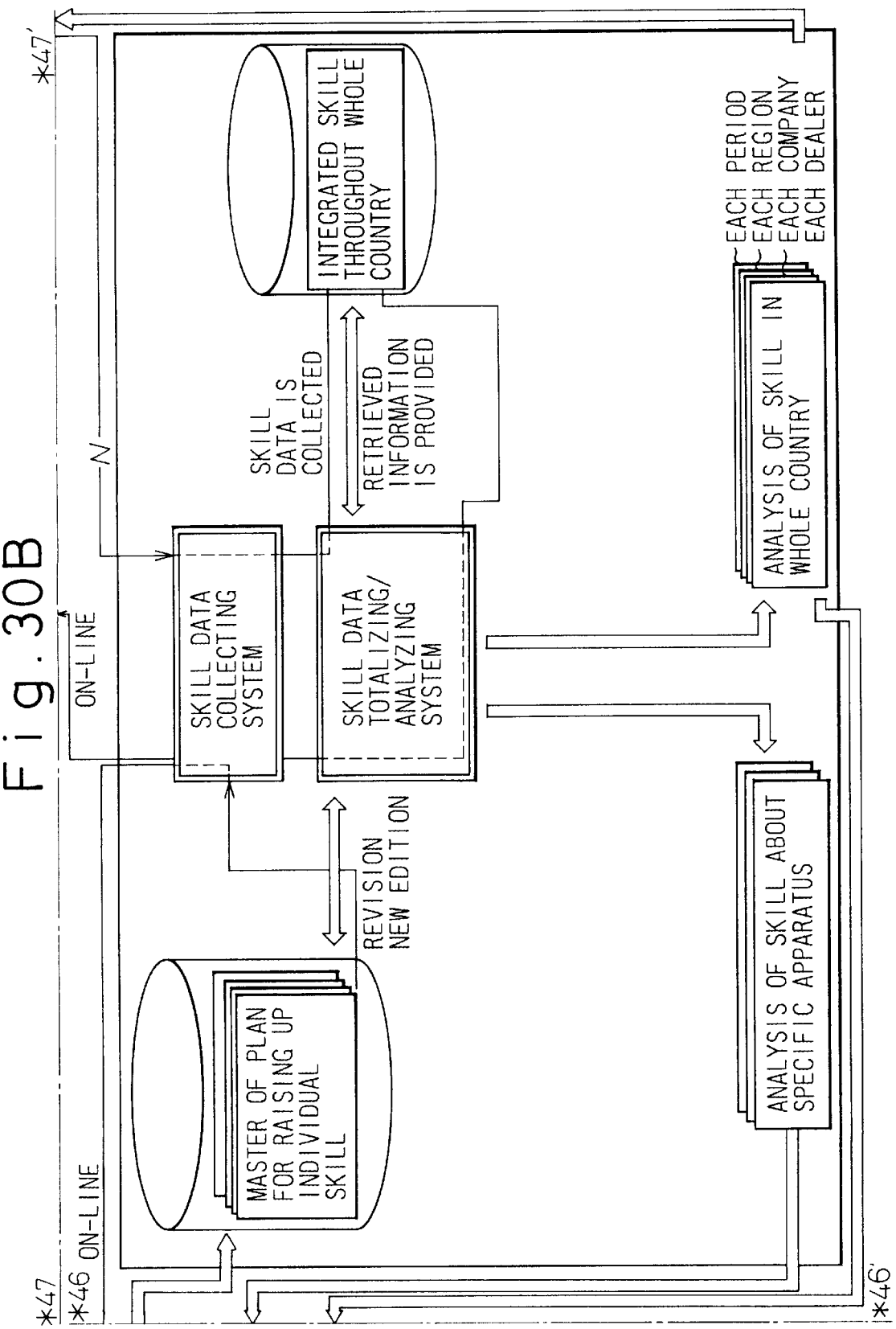

Further, as shown in FIGS. 30A and 30B, the manager group can know at which level the skill of their own department exists throughout the whole company and can examine which points must be reinforced in comparison with other departments, from the analyzed information of all the educational items executed in each branch or in each section. Therefore, the managers can establish a precise training plan. Further, all the learning items for the apparatus having low grade of achievement are output from the analyzed information of the specific items, and which portion among them is weak can be clearly output.

FIG. 31 is a block diagram showing an example of the educational system in-company to which the present invention is applied. The diagram conceptually represents the whole image of the educational system in-company which is established by the present invention.

In FIG. 31, the OFF-JT and OJT education objectives are set on the basis of standardized training technique 130 and the specific training objective 131. Further, the educational lecture 132 is presented in accordance with the education objectives so set, and field training 133 by the field trainers is carried out. Further, analyzed information by the skill analysis system 134 comprising an individual skill input mechanism 135 and a skill collection/analysis mechanism 134 is fed back to the individual, the section and the region. Accordingly, a precise measure for improvement can be taken in the company unlike the prior art according to which vague improvements have been attempted, and integrated training of personnel can be carried out without isolating OFF-JT and OJT from each other.

Figure 32A:
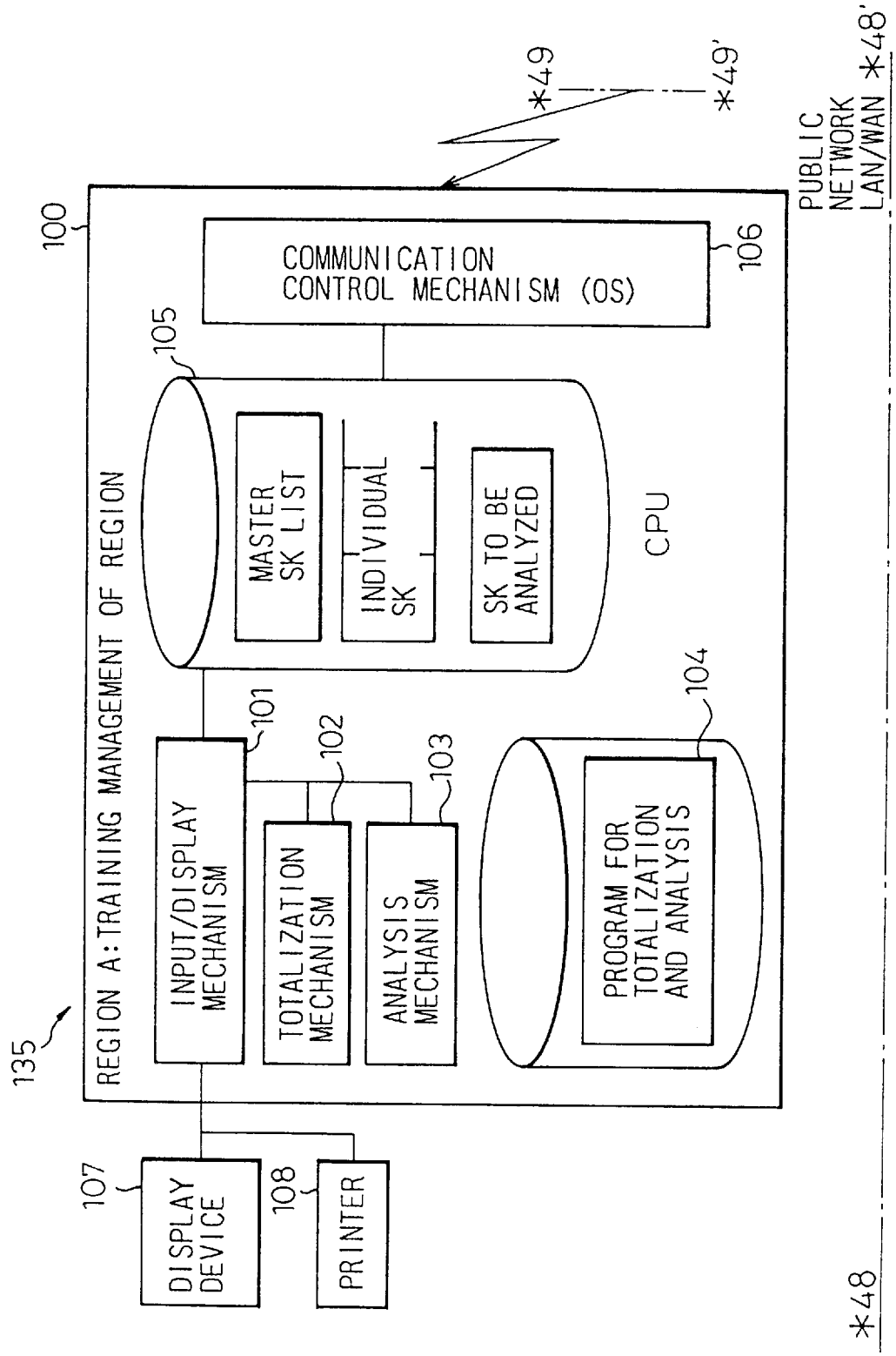

FIGS. 32A, 32B and 33 are block diagrams showing in detail the skill analysis system shown in FIG. 31. The diagrams show a definite example of the individual skill input mechanism 135 and the skill collection/analysis mechanism 136 for training personnel which is carried out throughout the whole country and in each section.

As shown in FIGS. 32A and 32B, the individual skill input mechanism 135 comprises training management systems 100, 110 for each region. This training management system collects the training management information established for each region by a CPU (Central Processing Unit) in each region and sends the information to the CPUs throughout the whole country. More specifically, various analyzed items of information are stored in the database 105 by using an input/display mechanism 101, a totalization mechanism 102, an analysis mechanism 103 and a totalization and analysis program 104 in the region A shown in FIG. 32A. In the region B shown in FIG. 32B, too, various analyzed information items are stored in the database 115 by using the input/display mechanism 111, the totalization mechanism 122, the analysis mechanism 113 and the totalization/analysis program 114. These analyzed information items can be displayed by the display devices 107, 117 and can also be printed by printers 108, 118.

The analyzed information temporarily held by the databases 105, 115 is collected in the CPUs 122 throughout the whole country inside the skill collection/analysis mechanism 136 shown in FIG. 33 through a communication control mechanism 121 from communication control mechanisms 106, 116. This CPU 122 is provided with the input/display mechanism 123, the totalization mechanism 124, the analysis mechanism 125 and the totalization/analysis program 126, and the analyzed information collected by the education management system 120 itself throughout the whole country is processed by the CPU 122. All the analyzed information inclusive of the analyzed information from each region can be displayed/input by the display device/input device 127 and can also be printed by the printer 128.

As described above, according to the present invention, the whole image of training personnel is first established by the first processing device in order to concentratedly manage the second processing device of each branch throughout the whole country or in each section. The reference relating to the objectives of achievement of a plurality of educational items are input on the basis of this whole image of training personnel, and the objective reference list, the educational item list and the working list are prepared. Such objective reference list, educational item list, etc., are offered as the standardized educational guideline to the second processing device of each company nationwide or each section. Accordingly, each company nationwide or each section can make clear the policy of training able men in the company without relying on the skill of the individual.

In this way, the present invention makes out the whole image of training personnel in advance and establishes the reference relating to the objectives of achievement of a plurality of educational items on the basis of this whole image. Accordingly, each company nationwide or each section can determine the objective of achievement of its own company or section on the basis of this reference. For this reason, for each company nationwide or for each section, it becomes clear which level it has reached; hence, the policy of training personnel can be made clear without depending on the skill of the individual.

Furthermore, the results of analysis of the grade of achievement on the basis of the grade of achievement input by the trainees and trainers of their own company or own section and the objectives of achievement of the educational plan list are fed back to both the field side and the education side. Therefore, OFF-JT and OJT can be linked with each other, and training of personnel can be carried out with large results under the common objectives.

While the present invention has been described as related to the preferred embodiments, it will be understood that various changes and modifications may be made without departing from the spirit and the scope of the invention as hereinafter claimed.

We claim:

1. An educational management system for carrying out management of education of a plurality of students, comprising:
    a first processing device, including:
        objective reference defining means for creating an objective reference list by inputting a reference relating to objectives of achievement of a plurality of educational items, and
        communication means for transmitting the objective reference list and an educational item list consisting of a plurality of the educational items; and
    a plurality of second processing devices, provided for the students, coupled to said communication means of said first processing device to receive the objective reference list and the educational item list, each of said second processing devices including educational plan list defining means for defining an educational plan list consisting of the objectives of achievement for each of the educational items, for displaying the objective reference list and the educational item list and for inputting the objective of achievement of each of the educational items.

2. An educational management system according to claim 1, wherein said educational plan list defining means includes:
    means for inputting a grade of achievement by the students and the leaders for each educational item of said educational plan list; and
    means for generating an integrated training plan list, for analyzing the grade of achievement based on the grade of achievement input by the students and the leaders and the objectives of achievement of said educational plan list, and for outputting the integrated training plan list based on the result of the analyzing.

3. An educational management system according to claim 2, wherein:
    said educational management system carries out management of education relating to a plurality of maintenance objects;
    each educational item of said educational plan list is classified for each said maintenance objects; and
    said means for generating the integrated training plan list analyzes the grade of achievement of the objective of achievement of said educational plan list for each of said maintenance objects.

4. An educational management system according to claim 2, wherein each grade of achievement, of the objective of achievement of said educational plan list, is expressed by achievement levels of a plurality of stages.

5. An educational management system according to claim 1, wherein:
    each of said second processing devices further includes:
        means for inputting a grade of achievement for each educational item of said educational plan list, and
        communication means for delivering the grade of achievement and the objective of achievement of said educational plan list to said first processing device; and
    said first processing device further includes analysis means for analyzing each educational item based on each objective of achievement of said educational plan list and the grade of achievement sent via said communication means in said first and second processing devices.

6. An education management system according to claim 5, wherein each grade of achievement, of the objective of achievement of said educational plan list, is expressed, based on analyzed information for each educational item obtained from said analysis means for each educational item.

7. An educational mangement system according to claim 1, wherein:
    each of said second processing devices includes:
        means for inputting a grade of achievement for each educational item of said educational plan list, and
        communication means for delivering the grade of achievement, the objectives of achievement of said educational plan list and a section of the students, to said first processing device; and
    said first processing device includes analysis means for carrying out an analysis for each section based on the objective of achievement of said educational plan list and the grade of achievement sent via said communication means in said first and second processing devices.

8. An educational management system according to claim 7, wherein each grade of achievement, of the objective of achievement of said educational plan list, is expressed, based on analyzed information for each section obtained from said analysis means for each section.

9. An educational management system, comprising:

processing means for carrying out management of education of a plurality of students, said processing means including:

objective reference defining means for creating an objective reference list by inputting a reference relating to objectives of achievement of a plurality of educational items, working list defining means for defining a working list composed of working items, educational item defining means for creating an educational item list by selecting at least one working item to be learned from among the working items of the working list, educational plan list defining means for defining an educational plan list consisting of the objectives of achievement for each of the educational items of the educational item list, analysis means for analyzing each educational item and each of the objectives of achievement of the educational plan list and a grade of achievement and outputting a result of the analyzing, and means for generating an integrated plan list based on the result of the analyzing.

10. An educational management system according to claim 9, wherein:

said educational management system carries out management of education relating to a plurality of maintenance objects; and said working list defining means and said educational item list defining means create multiple working and educational item lists, respectively, one for each of the maintenance objects.

11. An educational management system according to claim 9, wherein education by at least one of on-the-job training and off-the-job training is designated as given educational items to be learned, among the educational items, and to be selected by the educational item list defining means.

12. An educational management method, comprising:

defining an objective reference list and a working list responsive to inputting of objectives of achievement of a plurality of educational items in an educational item list and working items;

defining an educational plan list for inputting one of the objectives of achievement for each of the educational items;

analyzing each educational item and each of the objectives of achievement of the educational plan list and the grade of achievement; and generating an integrated plan list based on a result of the analyzing.

* * * * *

UNITED STATES PATENT AND TRADEMARK OFFICE
CERTIFICATE OF CORRECTION

PATENT NO. : 5,829,983

DATED : November 3, 1998

INVENTOR(S) : Kozaburo Koyama et al.

Page 1 of 2

It is certified that error appears in the above-identified patent and that said Letters Patent is hereby corrected as shown below:

Cols. 31-32, Please delete the chart of Table 9 and substitute therefore the following Table 9:

UNITED STATES PATENT AND TRADEMARK OFFICE
CERTIFICATE OF CORRECTION

PATENT NO. : 5,829,983

DATED : November 3, 1998

INVENTOR(S) : Kozaburo Koyama et al.

It is certified that error appears in the above-identified patent and that said Letters Patent is hereby corrected as shown below:

Table 9: Analyzed Information of Specified Apparatus (No. 2)

Signed and Sealed this

Eighteenth Day of May, 1999

Q. TODD DICKINSON

Attesting Officer   Acting Commissioner of Patents and Trademarks